US012098591B2

(12) United States Patent
Agrawal et al.

(10) Patent No.: US 12,098,591 B2
(45) Date of Patent: Sep. 24, 2024

(54) INSULATED GLASS UNITS WITH VARIABLE LIGHT TRANSMISSION STRUCTURES

(71) Applicant: Glass Dyenamics, Tucson, AZ (US)

(72) Inventors: Anoop Agrawal, Tucson, AZ (US); Susana J. Castillo, Rio Rico, AZ (US); Sahila Perananthan, Tucson, AZ (US); Christopher C. Angelo, Hillsborough, CA (US)

(73) Assignee: Glass Dyenamics, Inc., Tucson, AZ (US)

(*) Notice: Subject to any disclaimer, the term of this patent is extended or adjusted under 35 U.S.C. 154(b) by 0 days.

(21) Appl. No.: 18/130,791

(22) Filed: Apr. 4, 2023

(65) Prior Publication Data
US 2023/0243211 A1    Aug. 3, 2023

Related U.S. Application Data

(60) Division of application No. 17/705,948, filed on Mar. 28, 2022, now Pat. No. 11,649,670, which is a continuation-in-part of application No. 17/226,238, filed on Apr. 9, 2021, now Pat. No. 11,287,717.

(60) Provisional application No. 63/007,389, filed on Apr. 9, 2020.

(51) Int. Cl.
E06B 9/24        (2006.01)
G02F 1/1516      (2019.01)
G02F 1/155       (2006.01)
G02F 1/161       (2006.01)

(52) U.S. Cl.
CPC .......... E06B 9/24 (2013.01); G02F 1/15165 (2019.01); G02F 1/161 (2013.01); E06B 2009/2464 (2013.01); G02F 2001/1555 (2013.01)

(58) Field of Classification Search
None
See application file for complete search history.

(56) References Cited

U.S. PATENT DOCUMENTS

| | | | |
|---|---|---|---|
| 5,611,966 A | 3/1997 | Varaprasad et al. | |
| 6,141,137 A | 10/2000 | Byker et al. | |
| 6,266,177 B1 | 7/2001 | Allemand et al. | |
| 6,795,226 B2 | 9/2004 | Agrawal | |
| 6,853,472 B2 | 2/2005 | Warner et al. | |
| 7,009,751 B2 | 3/2006 | Tonar et al. | |
| 7,372,610 B2 | 5/2008 | Burdis et al. | |
| 8,400,704 B2 | 3/2013 | McCabe et al. | |
| 9,091,896 B2 | 7/2015 | Selles et al. | |
| 10,760,334 B2 | 9/2020 | Agrawal et al. | |
| 2008/0013153 A1 | 1/2008 | McCabe | |

(Continued)

FOREIGN PATENT DOCUMENTS

WO    2014-082092    *  5/2014

Primary Examiner — Ashok Patel
(74) Attorney, Agent, or Firm — Rothwell, Figg, Ernst and Manbeck, P.C.

(57) ABSTRACT

This disclosure includes variable light transmission panels (VLTPs) and their assembly into insulated glass units (IGUs), which can be incorporated into buildings. Disclosed windows provide uniform appearance from outside during the day when a number of such windows are incorporated in a building regardless of their state of light transmission. These disclosures may also be used to make windows which tint to different transmitted colors but during the day still appear to be uniform from outside.

19 Claims, 11 Drawing Sheets

(56) References Cited

U.S. PATENT DOCUMENTS

| | | |
|---|---|---|
| 2009/0116097 A1 | 5/2009 | McCabe |
| 2014/0085701 A1 | 3/2014 | Selles et al. |
| 2014/0205748 A1 | 7/2014 | Choi et al. |
| 2019/0196291 A1 | 6/2019 | Wang et al. |
| 2020/0017648 A1 | 1/2020 | Agrawal et al. |
| 2020/0019032 A1 | 1/2020 | Agrawal et al. |
| 2021/0408592 A1* | 12/2021 | Agrawal .............. C08K 5/0016 |

* cited by examiner

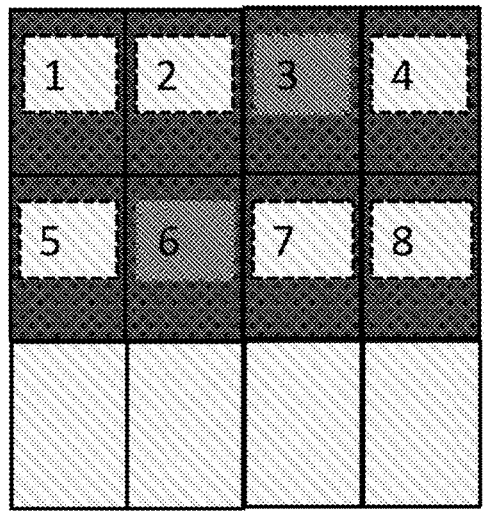 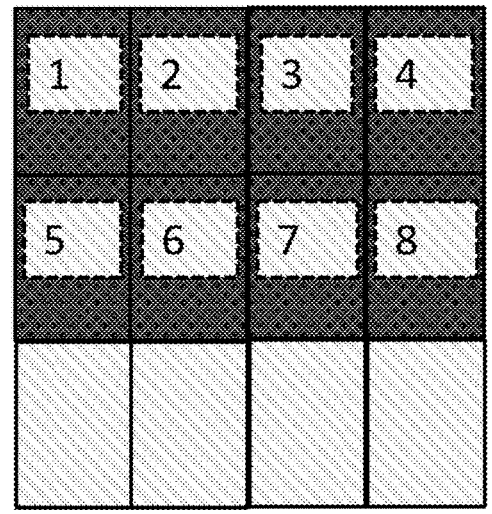
Building A (prior art)　　　　　　　　Building B
Figure 1
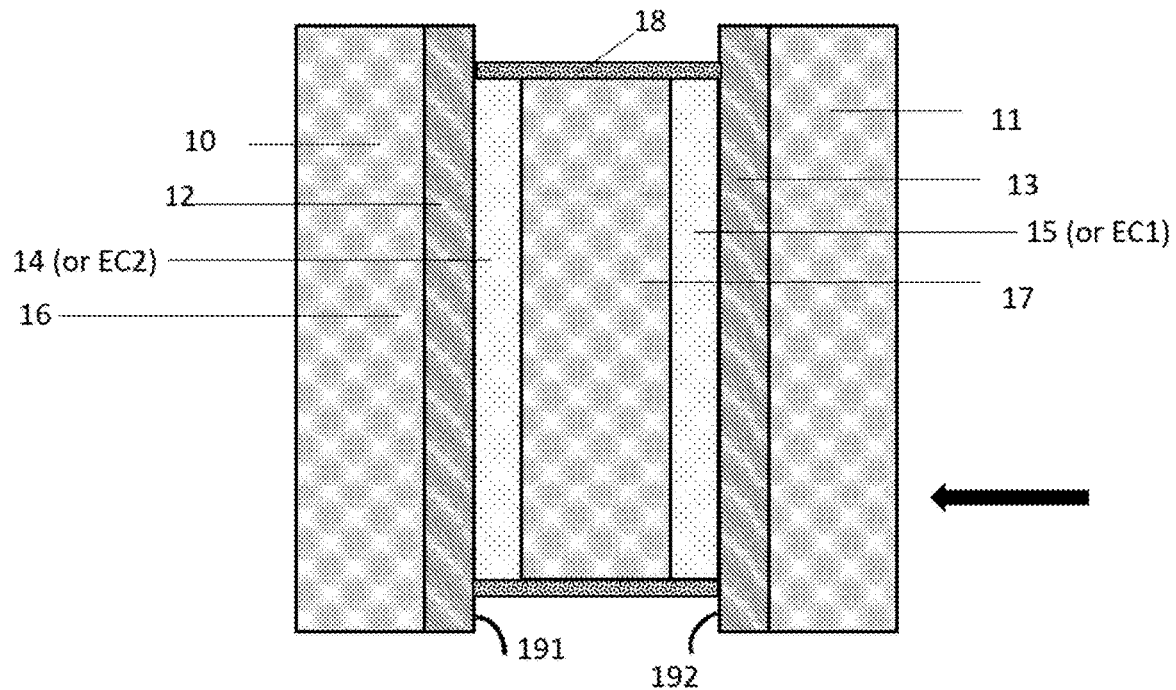
Figure 2a (prior art)

INSULATED GLASS UNITS WITH VARIABLE LIGHT TRANSMISSION STRUCTURES

CROSS-REFERENCE TO RELATED APPLICATIONS

This application is a divisional of U.S. application Ser. No. 17/705,948, filed on Mar. 28, 2022, which is a continuation-in-part of U.S. application Ser. No. 17/226,238, filed on Apr. 9, 2021, now U.S. Pat. No. 11,287,717, which claims priority benefit of U.S. provisional application 63/007,389 filed on Apr. 9, 2020, the entire contents of which are incorporated herein by reference.

FIELD OF THE INVENTION

This disclosure relates to variable transmission windows which are used for architectural and transportation applications. VLTPs may be fabricated using electrochromic and other technologies. In this disclosure, the appearance of such windows is addressed when the buildings and vehicles are viewed from outside.

BACKGROUND

The light transmission properties of variable light transmission panels (VLTPs) change by application of an electrical stimulus. In this invention, the principles of novelty will be explained using electrochromic (EC) technology although these principals will also be valid for other types of VLTPs such as those using liquid crystalline materials and suspended particles. When electrically controlled VLTP devices are fabricated using transparent substrates, these devices upon application of an electric voltage change their optical state, i.e., color, opacity, and/or transparency (light transmission or reflection). A user (or a user defined control system) can select and switch from one transmission state to the other. VLTP devices are referred to as "smart glass" or "smart windows" as the optical characteristics of the windows with these elements adapt to the weather or user defined conditions. Used in buildings, these smart windows may provide shade, glare reduction, energy savings, privacy, partitions and so forth. There is a great interest in the use of EC devices containing VLTPs for at least one of the above reasons in building windows, and in windows for transportation including cars, buses, trains, boats/ships and airplanes.

Used in construction of windows for residential and commercial buildings and in transportation, these windows with EC VLTPs result in energy efficient building envelopes and increased comfort by regulating the solar energy penetration through the windows. These windows include windows located within the door including transoms and sidelights. These windows may be fixed or movable, where the latter includes double-hung and casement windows and sliding windows and sliding glass doors. Building glass exteriors are designed by considering several parameters which include aesthetics, environment, location, etc., while also providing proper indoor daylighting, glare control so as to consume less energy for lighting, heating, ventilation and air-conditioning (HVAC). While use and characteristics of VLTP have been extensively investigated, but much attention has not been paid to its external appearance. For windows with VLTP panels such as EC technology where a user (or a person inside the building) makes a selection of the light transmission properties of these windows, this action inadvertently changes the exterior appearance of the window, i.e., windows in different optical states lead to differences in appearance which results in a checkerboard effect when such a building is viewed during the day. In most situations this is undesirable.

SUMMARY OF THE INVENTION

In a first aspect, the present disclosure includes an electrochromic variable light transmission panel (VLTP). In some aspects, a VLTP of the present disclosure may include (a) two transmissive substrates arranged in a parallel configuration; (b) the first substrate having two sides wherein the second side is coated with a coating stack comprising of at least two layers, followed by a coating of a transparent conductor and further followed by an EC layer; and (c) an electrolyte layer disposed between the two substrates, wherein the electrolyte layer contacts the said EC layer. In some aspects, a VLTP of the present disclosure may show a color difference $\Delta E_T^*$ of greater than 40 in transmitted color when measured in the bleached and the colored optical states, and in these optical states show a color difference $\Delta E_R^*$ of less than 6 when reflection is viewed from a side of the VLTP. In some aspects, the side of the VLTP is a side that faces the outside of a building.

In one aspect, the present disclosure includes an insulated glass unit (IGU) assembly comprising the VLTP of the present disclosure. In some aspects, the IGU assembly contains at least one low-e coated panel in addition to the VLTP; and the IGU show a color difference $\Delta E_T^*$ of greater than 40 in transmitted color when compared in the bleached and the colored optical states of the VLTP, and these optical states show a color difference $\Delta E_R^*$ of less than 8 when reflection is viewed from the first side of the VLTP.

In one aspect, the present disclosure includes a window including the VLTP, which further has a film bonded to the second substrate on the side that is not facing the electrochromic medium, and the said film having a low-e surface.

In one aspect, the present disclosure includes an electrochromic variable light transmission panel (VLTP) comprising a first transmissive substrate and a second transmissive substrate arranged in a parallel configuration, wherein the first transmissive substrate has a first side and a second side, wherein the second side is coated with a stack of coatings comprising at least two layers, followed by a coating of a transparent conductor, wherein the second transmissive substrate has a first side and a second side, wherein the first side of the second transmissive substrate is coated with a transparent conductor, wherein the substrates are disposed in an assembly such that an electrochromic medium is disposed between the conductive sides of the two substrates. In one aspect, the VLTP shows a color difference $\Delta E_T^*$ of greater than 40 in transmitted color when measured in the bleached and the colored optical states, and shows a color difference of $\Delta E_R^*$ of less than 6 when reflection is viewed from the first side of the first substrate.

In one aspect, the present disclosure includes an insulated glass unit (IGU) assembly having a VLTP, wherein the said IGU assembly comprises at least one low-e coated panel in addition to the said VLTP; and the said IGU assembly shows a color difference $\Delta E_T^*$ of greater than 40 in transmitted color when compared in the bleached state and the colored optical states of the VLTP, and in these optical states of the VLTP, the IGU assembly shows a color difference in reflected color $\Delta E_R^*$ of less than 8 when reflection is viewed from the first side of the VLTP.

In one aspect, the present disclosure includes an electrochromic variable light transmission panel (VLTP) comprising a first transmissive substrate and a second transmissive substrate arranged in a parallel configuration; wherein the first substrate comprises a first side and a second side, wherein the second side is coated with a stack of coatings comprising at least two layers, followed by a coating of a transparent conductor; wherein the second substrate comprises a first side and a second side, wherein the first side of the second substrate is coated with a transparent conductor; wherein the substrates are configured in an assembly such that an electrochromic medium is disposed between conductive sides of the first and second substrates; wherein the said VLTP shows a transmission ratio of greater than 2.5 at 550 nm when measured in the bleached and the colored states, and, in these optical states, shows $\Delta E_R^*$ of less than 6 when reflection is viewed from the first side of the first substrate.

In one aspect, the present disclosure includes an insulated glass unit (IGU) assembly comprising at least one low-e coated panel and a VLTP separated by a gap, wherein the VLTP comprises: a first transmissive substrate and a second transmissive substrate arranged in a parallel configuration; wherein the first substrate comprises a first side and a second side, wherein the second side is coated with a coating stack comprising at least two layers, followed by a coating of a transparent conductor and further followed by a EC layer; and an electrolyte layer disposed between the first and second substrates, wherein the electrolyte layer contacts the said EC layer; wherein the said IGU assembly shows a color difference $\Delta E_T^*$ of greater than 40 in transmitted color when compared in the bleached and the colored optical states of the VLTP, and in these optical states, shows a color difference $\Delta E_R^*$ of less than 8 when reflection is viewed from the first side of the first substrate.

In one aspect, the present disclosure includes an insulated glass unit (IGU) assembly comprising at least one low-e coated panel and a VLTP separated by a gap, wherein the VLTP comprises: a first transmissive substrate and a second transmissive substrate arranged in a parallel configuration; wherein the first transmissive substrate comprises a first side and a second side, wherein the second side is coated with a stack of coatings comprising at least two layers, followed by a coating of a transparent conductor; wherein the second transmissive substrate comprises a first side and a second side, wherein the first side is coated with a transparent conductor; wherein the first and second substrates are configured in an assembly such that an electrochromic medium is disposed between conductive sides of the first and second substrates; and the said IGU assembly shows a color difference $\Delta E_T^*$ of greater than 40 in transmitted color when compared in the bleached and the colored optical states of the VLTP, and, in these optical states, shows a color difference $\Delta E_R^*$ of less than 8 when reflection is viewed from the first side of the first substrate.

Other features and characteristics of the subject matter of this disclosure, as well as the methods of operation, functions of related elements of structure and the combination of parts, and economies of manufacture, will become more apparent upon consideration of the following description and the appended claims, all of which form a part of this specification.

BRIEF DESCRIPTION OF THE DRAWINGS

FIG. 1 illustrates a schematic representation of a building with windows containing VLTP panels made using prior art and of a building with VLTP panels as taught in the current invention;

FIGS. 2a and 2b illustrate schematics of a generic (prior art) EC (VLTP) devices;

FIG. 3 illustrates a schematic of an insulated glass unit (IGU) containing an EC VLTP of FIG. 2a;

DETAILED DESCRIPTION

Figure 2B:
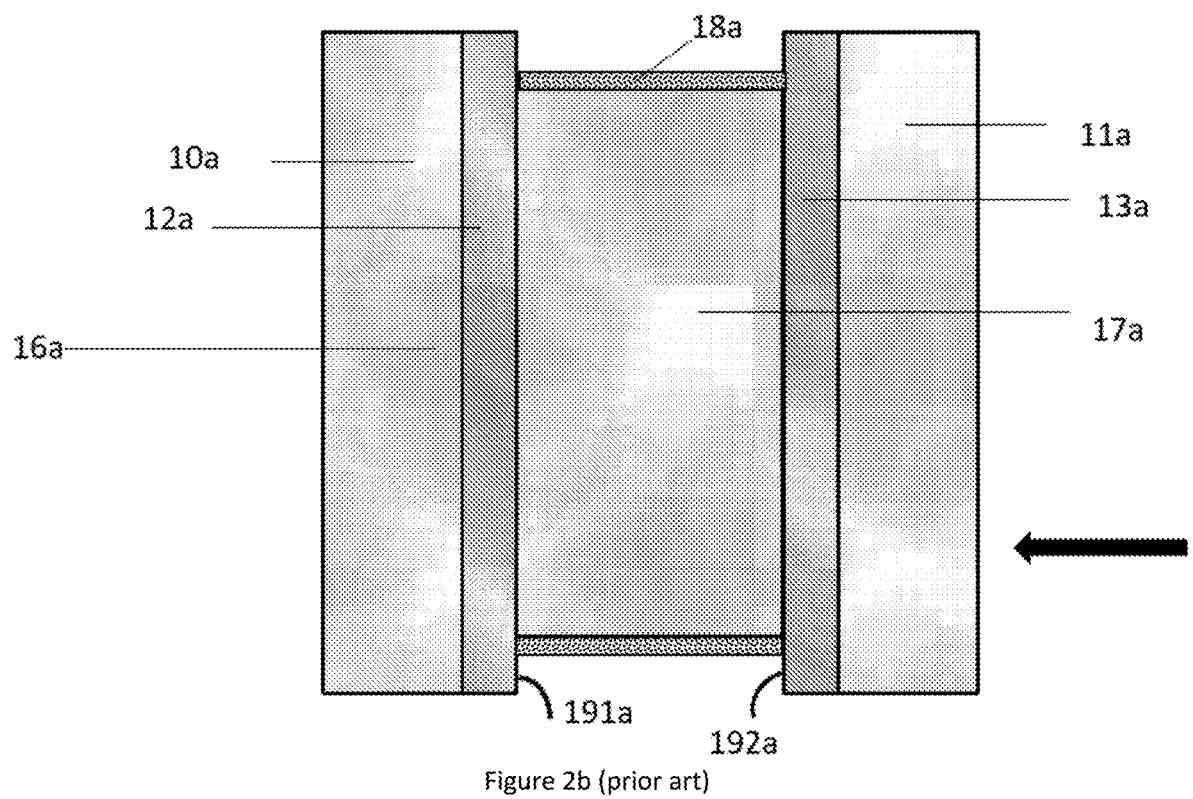

While aspects of the subject matter of the present disclosure may be embodied in a variety of forms, the following description is merely intended to disclose some of these forms as specific examples of the subject matter encompassed by the present disclosure. Accordingly, the subject matter of this disclosure is not intended to be limited to the forms or embodiments so described.

A first objective of this disclosure includes obtaining certain optical properties which result in desirable appearance of a building glass exterior when these EC devices (or VLTPs) are incorporated in the windows. These optical properties allow the external glass façade of these buildings to visually appear largely unchanged during the day even if the optical state of VLTP changes. The VLTPs are typically used in the buildings in an IGU configuration. Stated differently, according to the principles of this disclosure, when the various VLTPs in a building façade are in different optical states of light transmission, it is difficult to notice visual differences between them from the outside of the building for a casual viewer during the daytime. FIG. 1 shows a three storied building with windows having VLTP panels on the second and the third floors. Building A uses VLTP windows made using prior art, where a viewer standing outside of the building during the day notices that the windows 3 and 6 have a different optical appearance. This is caused by the users inside the building who decide to darken these windows, i.e., reduce light or optical transmission which is best suited to the activity that they are pursuing in the space dominated by that window. This then results in a checkered appearance as seen by an observer who is standing outside the building and is able to observe a number of windows at the same time. This is not a pleasing aesthetic and an architect or a building owner may want to avoid such an appearance. It is desirable for the occupants of the rooms with windows 3 and 6 to experience different light transmission, but from outside the glass of the windows should appear uniform during the day. A building which has windows made from the present invention appears uniform as seen for Building B in FIG. 1, even though the states of transmission for VLTP windows 3 and 6 are different from others, a casual observer outside may not be able to discern the difference.

Design aspects of the VLTPs, including characteristics of substrates used to fabricate the VLTPs result in certain optical properties that minimize the differences between the windows when seen from outside during the day, even if these panels are used in an IGU configuration where these panels are combined with an additional transmissive panel having a low-e coating by leaving a space filled with air or a low thermal conductivity gas.

Achieving the above features in windows with VLTP opens up many more novel aspects which have not been achieved in windows comprising VLTP systems installed in buildings. In one novel aspect, this allows an architect to match windows with VLTPs with those windows which do not have a VLTP element (e.g., a normal IGU window) and spandrels. This means that during the daytime an outside casual viewer will have difficulty in distinguishing which of these windows are those that have a VLTP element, and furthermore which of these VLTPs are in different optical states. This allows an architect to design a building which has a unified appearance from outside but uses certain windows which have VLTP elements and other windows or spandrel that do not have these elements (static windows and static spandrels). This may be desirable for many reasons, where the higher cost VLTP elements are only installed in select windows such as atriums and other common places or for certain occupants who prefer VLTP comprising windows; and windows with VLTP may not be installed on the north side of the building (in the northern hemisphere) where there is no direct solar glare; all of this can be done without detracting from the aesthetic appearance of the building. Windows with VLTP elements may even be replaced temporarily or permanently by static transmission windows or windows with VLTP of different transmitted color without causing a detraction in its external appearance. This may also be desirable for engineering, procurement, and construction contractors to enable more cost-efficient buildings.

A second related objective of the present disclosures includes windows with VLTP elements that provide building architects with external reflected and internal transmitted color combinations and options which were previously not feasible. For example, the windows with VLTP elements could appear a desired shade of bronze, blue, green, gray on the outside and appear similar or a vastly different color and hue from the inside (transmitted color). More specifically and functionally, these windows may darken to different internal transmitted colors (e.g., green, blue, brown and neutral, or any combination of colors, etc.), but with similar appearance from outside. This allows a building architect to select from various combinations of internal transmitted and external reflected colors, i.e., independently customizing the individual internal appearance (light transmission) and external appearance. This innovation provides architects a freedom to design windows for different buildings, and also provides architects with a wider freedom to design windows within the same building that may be customized for different occupants while keeping the same external appearance.

Electrochromic VLTPs which can be most effectively made by this disclosure contain two coated substrates separated by an electrolyte layer of above 10 and up to 2,000 microns in thickness. The front substrate refers to the substrate that faces the outside of the window system, i.e., it has an outdoor exposure. The uniform outdoor appearance is achieved by one or more of the following: (a) increasing the reflectivity from the first substrate which is achieved by introduction of a reflective coating, particularly including reflective coating stacks using interference which are placed on the substrate before the outside light enters EC medium; and (b) optionally combining reflective stacks with a tint in at least one of the coatings in this stack and/or the substrate itself, which would also impact the color of the reflected light. Any specific coating or electrolyte within the VLTP panel which changes its optical properties due to the application of voltage is called as variable light transmission medium (VLTM).

For the VLTP windows the use of interference stacks would be demonstrated in this disclosure to reflect part of the daylight to project uniform appearance. The transmitted color in the device is dominated by the remainder of the light entering the device so that it can be modulated by the color or the optical density of the EC medium that changes its color properties as it darkens upon the application of voltage.

The reflectivity of the interference stack on the front substrate is dependent on the thickness of the layers comprising this stack and also the refractive indices of the materials used to make these layers. In the EC devices of this disclosure, the interference stack is placed between the front substrate followed by the transparent conductor coating (TC). Since the interference coating stacks work by the reflection and phase changes of light passing through the various layers of different thicknesses and refractive indices, the TC coating, due to its thickness and RI properties, also influences the reflection performance of this stack. Thus, any optimization of the reflectivity from this stack must take into account the transparent conductor (TC), i.e., its refractive index and thickness. In addition, the conductivity of the TC for window devices is high as they are typically large devices, greater than 500 sq cm, and more generally greater than 800 sq cm. Minimum surface resistivity for these windows is about 20Ω/□(ohms per square), and generally in the range of about 2 to 20Ω/□. Since the resistivity decreases with increasing TC thickness, appropriate thickness of the TC that will give the required resistivity must be factored in.

In some types of EC devices, a thin EC coating is placed on top of the TC. Generally, if this coating is in the range of less than 1,000 nm (for example 50 nm to 1000 nm, and any range therein is encompassed by this disclosure) this will also influence the performance of the interference stack. In that case its thickness and refractive index (RI) both in the bleached and the colored state will be important. However, its thickness should be sufficient to provide reasonable electrochromic activity and should be optimized. In case such coatings of EC materials are used on the front substrate, those EC materials are preferred where the change in real part of the refractive index in the fully colored to fully bleached state within the visible wavelengths is less than 20%, and in another embodiment less than 10% so that its influence is small on the performance of the reflectivity of the reflective stack.

Interference coating stacks comprise at least two layers of dissimilar refractive index. These are used in many types of optical devices including optical communications and displays to optimize certain wavelength transmissions. For example, in rear-view EC mirrors for cars interference stacks are used for optimization of the display quality. Since these are primarily reflective devices and displays are mounted on the back of the mirrors, the optical emission from these displays is maximized (or increased) through the reflective layers for specific wavelengths by use of interference stacks. These interference stacks always contain a metallic reflectance layer, where the reflectivity of the metal layer is high. For example, these mirrors will have a reflectivity in the range of about 40 to 80% in clear state, which decreases to about 4-8% in the dark state. It is important that these mirrors have high reflectivity from the metallic layers so that clear images are seen in rear-view mirrors, and the display light can also be projected through these reflectors without giving double or ghost images. Examples of these rear-view mirrors can be found in U.S. Pat. Nos. 8,400,704 and 7,009,751.

Further, as discussed below, in one preferred embodiment, the EC device comprises an electrolytic EC medium that is in contact with the two TCs on the two opposing substrates. Examples of EC mediums that may be used in these devices may be found in U.S. Pat. No. 5,611,966. In another preferred embodiment a first EC coating in a thickness of less than about 1,000 nm is deposited following the TC on the front substrate, and an electrolyte which is in contact with the first EC coating. Examples of such electrolytes and EC coatings are found in U.S. Pat. Nos. 6,266,177 and 7,372,610. Furthermore, U.S. Pat. No. 10,760,334 discloses EC layer compositions in EC devices containing electrochromic material and conductive particles. Outdoor solar lighting (daylight) can vary substantially during the day and under bright conditions may vary from about 120,000 lux to about 10,000 lux, where the former number is achieved under direct sun, and the latter number where the sun is not direct. The other factors which influence the daytime solar intensity are cloud cover, time of the day, time of the year, thus the outside light intensity in the daytime in many instances can be lower than 10,000 lux, down to 2000 lux. Examples of indirect sun are north side of a building in Northern hemisphere (opposite in the southern hemisphere), under a shade or under cloudy but still bright sky conditions. Most office and task lightings range from about 100 to 500 lux. Thus, daylight entering into a window even with a 50% visible light transmission may be reflected from the bright colored objects inside the building and still would have a higher luminosity as compared to any added luminosity from the interior lighting. Thus if a substantial amount of light is reflected from a window with a VLTP element, prior to contacting the variable light transmission element present in the said VLTP, such windows will appear unchanged in appearance to an outside observer regardless of the optical state of the VLTP. A person in the interior of the building desires to see a large change in light transmission (appearance) so as to shade the interior as intended.

Color (or appearance) of an object can be established by measuring reflected and/or transmitted light using color coordinates. There are several coordinate systems used to measure color which are mathematically related. A commonly used three-coordinate system called "L*a*b*" will be used to teach the novelty of this innovation. The color difference in reflection or in transmission $\Delta E^*$ between two objects or between two windows (or between two different optical states of a VLTP) using this color system of coordinates is computed as given below.

$$\Delta E^* = \mathrm{Sqrt}\{(L_2^* - L_1^*)^2 + (a_2^* - a_1^*)^2 + (b_2^* - b_1^*)^2\}$$

Similarly, when an object darkens, the color shift (or change in hue) $\Delta E^*_H$ is represented by $$\Delta E^*_H = \mathrm{Sqrt}\{(a_2^* - a_1^*)^2 + (b_2^* - b_1^*)^2\}$$

Unless mentioned otherwise the colors when measured at narrow angles using D65 illuminant in the visible range use an observer which subtends an angular vision of two or ten degrees (e.g., see the standard test method ISO/CIE 11664-4:2019 [CIE LEAD], Colorimetry—Part 4: CIE 1976 L*a*b* color space; International Organization for Standardization, Geneva, Switzerland). $\Delta E_R^*$ refers to the color difference in reflection and $\Delta E_T^*$ refers to color change in transmission, and the color-shift or change in hue in reflection is given by $\Delta E_{R-H}^*$ and the same in transmission by $\Delta E_{T-H}^*$.

In the above equation $L_1^*a_1^*b_1^*$ and $L_2^*a_2^*b_2^*$ are the color coordinates of the light being observed from two objects or from the same object in different optical states. L* value ranges from 0 to 100, where decreasing L* value represents a darker object, which at value zero is black and devoid of any color. At L*=100 the color is white and is washed out of all colors. All L*, a* and b* values form a sphere, where the colors are most vivid when L*=50. At that point the maximum and minimum values of a* are +60 (red) to −60 (green) and b* also ranges from 60 (yellow) to −60 (blue). The maximum absolute values of a* and b* decrease as L value changes from 50 in either direction.

When two windows or two similar VLTPs, but in different optical states are observed in reflected light, the difference in color is given by $\Delta E_R^*$ and the color shift is given by $\Delta E_{R-H}^*$; when looking at transmitted light at these we can express these as $\Delta E_T^*$ and $\Delta E_{T-H}^*$ respectively. Where the subscripts R, T and H stand for reflection, transmission, and color-shift (hue) respectively. For example, a casual observer located outside during daytime is able to easily discern difference in two objects when $\Delta E_R^*$ from reflected colors is below a certain threshold value. Typically, a near color match where $\Delta E_R^*$ of about below 3 is good for certain embodiments, in some other embodiments a color match may be considered acceptable when $\Delta E_R^*$ is equal or below 6, and in some others a value of about 8 may also be acceptable where the hue differences are small, e.g., $\Delta E_{R-H}$ being less than 4. The above are the general teachings for $\Delta E_R^*$, but in some cases the threshold of $\Delta E_R^*$ may depend on where the locations of the two bodies are in the color sphere (i.e., the absolute values of L*, a*, b*) due to varying eye sensitivity. Thus, as described earlier that building windows having VLTP elements may be in different optical states or may color to different transmitted colors. Therefore, in various embodiments as will be discussed in this disclosure, the color match range in reflection (or $\Delta E_R^*$ range) is below 8, in another embodiment below 6, yet in another embodiment below 3. For practical considerations perfect match is difficult to achieve thus a match within 0.3 or above is acceptable, and in other embodiments a match above 1 is also good. Please note that these $\Delta E_R^*$ and $\Delta E_{R-H}^*$ considerations apply to VLTP panels when used as windows, the panels themselves or when these panels are integrated in an IGU. Integration of these VLTP panels in IGU in most cases increase $\Delta E_R^*$, thus the choice of Low-e glass to make this IGU is important.

In prior art windows with VLTP the change in transmission from the bleached state to the colored state will also cause a change in exterior appearance with a $\Delta E_R^*$ greater than the values stated above. In case the VLTP optical transmission is only changed a little, then one will not see a big difference in reflected colors, therefore one must define a minimum change in the transmitted light (or the degree of darkening) under which the reflected colors are measured and matched. Thus, for the above color matches to be meaningful in the reflected color, there should be a large change in the transmitted color. When the variable light transmission panels are colored to different depths which in initial stages would impact its reflectivity, it is important to establish minimum values of $\Delta E_T^*$ for which the change in reflective color $\Delta E_R^*$ is to be established. For samples where the minimum $\Delta E_T^*$ is exceeded, and $\Delta E_R^*$ is still within the desired range that sample would also be deemed to have met the criteria of reflective color change at the minimum value of $\Delta E_T^*$. The large change in transmitted color can also be defined as $\Delta E_T^*$ above 40 in one embodiment, above 50 in another embodiment and above 60 in yet another embodiment. Another way to express the transmitted color could be the ratio of transmitted light in the bleached to the colored state at 550 nm (which is close to the photopic peak, also called transmission ratio). The EC panels should show at least 2.5:1 in one embodiment and at least 5:1 in another embodiment or any range in between or at or beyond 10:1.

Published US patent application 20140085701 and U.S. Pat. No. 9,091,896 have attempted to address an issue with windows with EC VLTP elements so that the difference in reflected coloration as seen from the outside of the building are low. In particular, the attempt is to minimize the difference in color perception between a small angle observation and a large angle observation. This means that when an observer is standing close to a tall building the angle of the observer's vision of the windows at his height will be close to zero degrees (measured normal to the surface of the window) and when the observer looks at the upper stories, the angle subtended is large (see FIG. 8). These publications teach that by attaching (or laminating) an additional glass element with reflective coating to a VLTP element could minimize the color difference between these stories. However, even in this publication, the goal of achieving distinct transmitted colors or coloration density without impacting the outside reflected color was not achieved as taught by current embodiments, where this is being done by adding additional coatings and tuning the color of the front panel used to fabricate the VLTP.

Figure 8:
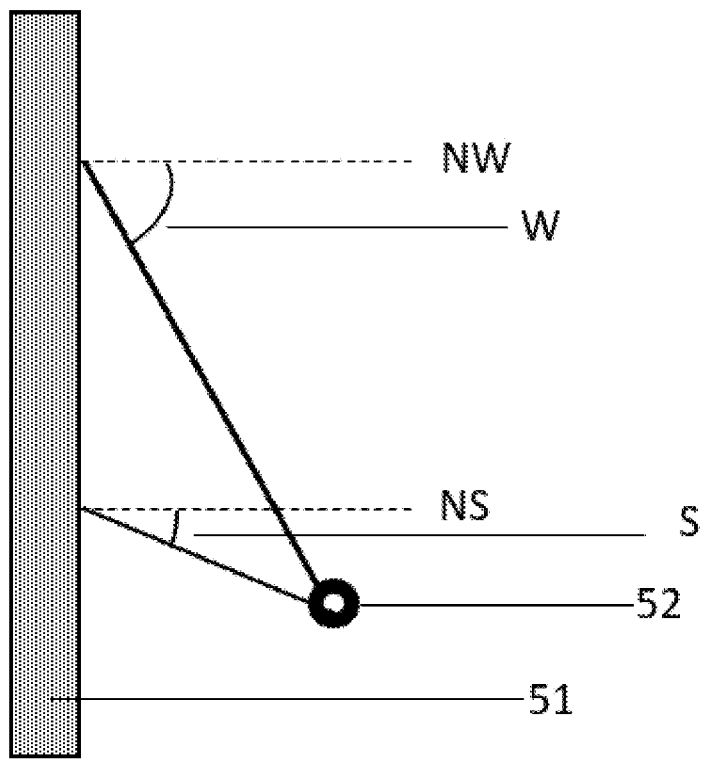
FIG. 8 illustrates a schematic view of the angular relationship between a viewer and the glass façade of a building.

In the present disclosure, even though different stories may appear to have a different color, the important advantage of this innovation is to have very little discernable difference between the windows which are colored and not colored when they subtend the same angle. In one embodiment the difference in reflectivity and color of the reflected light between different optical states should not be discernable by an observer during the day at small angles (typically 0 to 12 degrees between the observer and the glass (angle being measured normal to the glass, see FIG. 8). In another embodiment the difference in reflectivity and color of the reflected light between different optical states should not be discernable by an observer during the day at large angles (typically 30 to 45 degrees between the observer and the glass (angle being measured normal to the glass, see FIG. 8. FIG. 8 shows a side view of a building façade with windows as 51 which is being seen by an observer outside the building with the eye of the observer as 52. When the observer looks at the windows which are close to his eye level, then the angle is small as shown by S. The normal to the glass is shown as NS. When the observer looks at a window far on the left side or the right side or towards an upper story then the angle subtended is wider as indicated by W and the normal to the glass is shown as NW. Since these angles are different and a significant reflection comes from the coating stack, these colors may be different, but to an outside observer windows in different optical states and next to each other making about the same angle should look similar in appearance. The inclusion of an appropriate interference layer as taught in the current disclosure, and the optional tint of the front substrate or one or more layers of the interference stack, all prior to the light entering the EC medium, can also result in small but acceptable change in color between the low and the wide angles, while still providing little visual difference between VLTP windows from the outside regardless of their optical state.

In buildings where glass with EC VLTPs is installed, it is still easy to discern the difference during daytime between the windows with colored EC elements and those which are not colored. The above publication does not address the issue of uniform window appearance that are close together and at about the same angle of observation or even at different angles of observation. Although the color teachings of the present disclosure may be also achieved by laminating an extra sheet of glass with the optical properties taught herein on a VLTP containing window system so that the optical state of the VLTP may be masked at small angle or at a large angle, however that is not a preferred method due to increase in weight, increase in total thickness reasons and additional manufacturing steps required for incorporating additional glass.

FIGS. 2a and 2b show a typical EC element which are used for fabricating VLTPs. FIG. 2a shows a pair of clear transparent substrates 10 and 11 both of which are coated with transparent coatings 12 and 13 respectively which are electrically conductive (transparent conductors or TC). These are further coated with two redox layers 14 and 15, at least one of which has EC properties, which may also be referred to as EC2 and EC1 coatings respectively, assuming that both are electrochromic. These coatings may be selected from inorganic materials or comprise a polymeric matrix which itself is electrochromic or may have electrochromic additives. In one embodiment, the polymeric matrix may be intrinsically conductive or have non-electronically conductive dyes along with electrically conductive nanoparticles (e.g., carbon nanotubes). These coated substrates are assembled together in a parallel configuration using an electrolyte layer 17 of uniform thickness which may be a prefabricated polymer film, or a liquid electrolyte or a liquid electrolyte formulation at the time of assembly that is polymerized after introducing it into place between the two coated substrates. The perimeter sealant to protect the electrolyte (17) and the EC1 (15) and EC2 (14) is shown as 18. Power is applied on the two opposing conductive substrates shown as 191 and 192 to change the optical properties. When this VLTP is incorporated in an IGU, substrate 11 faces the outside of the building. EC1 and EC2 are considered as EC mediums VLTMs within the VLTP panel. When these prior-art panels are used to make windows and integrated with IGUs, a large difference is observed between two such windows which are in different optical states and when these are viewed from the outside during the daytime. An example of an EC device with this type of construction shown in FIG. 2a is in published US patent application 2020/0019032 (Agrawal, Jan. 16, 2020).

FIG. 2b shows another prior-art device where an electrolyte layer 17a containing EC materials may be used to form an EC medium (VLTM) instead of the three layers 14, 15 and 17 in FIG. 2a. As in the prior device this may be a pre-fabricated film that is laminated, a liquid, or a liquid converted to a solid by polymerization after it is placed between the coated substrates described below. For electrochromic devices, these electrolytes have at least one anodic and one cathodic dye (or they may be bridged in a single molecule), for color control more than two dyes may be used (for example, one cathodic dye and 2 to 5 or more anodic dyes, more than one bridged dye or bridged dye with additional anodic or cathodic dyes). In this figure clear substrates are shown as 10a and 11a, and the transparent conductive coatings as 12a and 13a, sealant as 18a and the powering leads as 191a and 191b. In another variation a VLTP panel made of liquid crystalline material or a suspended particle medium would also have the construction as shown in FIG. 2b where the VLTM 17a is replaced by a medium containing the liquid crystal or the suspended particle material. In a thermochromic VLTP panel, no transparent conductors are required, and a film containing thermochromic VLTM would be laminated between the substrates 10a and 11a of FIG. 2b, but will not have the coatings 12a and 13a. In all of these types of prior art panels, during daylight hours, differences are seen by casual observers when the windows are in different states.

Other prior-art EC devices that have the same problem are made by sequentially depositing all of the layers as thin coatings on a single substrate 11, which comprise of layer 13, 15, 17, 14 and then 12 (e.g., see published US patent application 20140085701) after which an encapsulation layer may be deposited and/or this may be further laminated using a polymeric film and a glass sheet to provide protection to the coatings.

Figure 3:
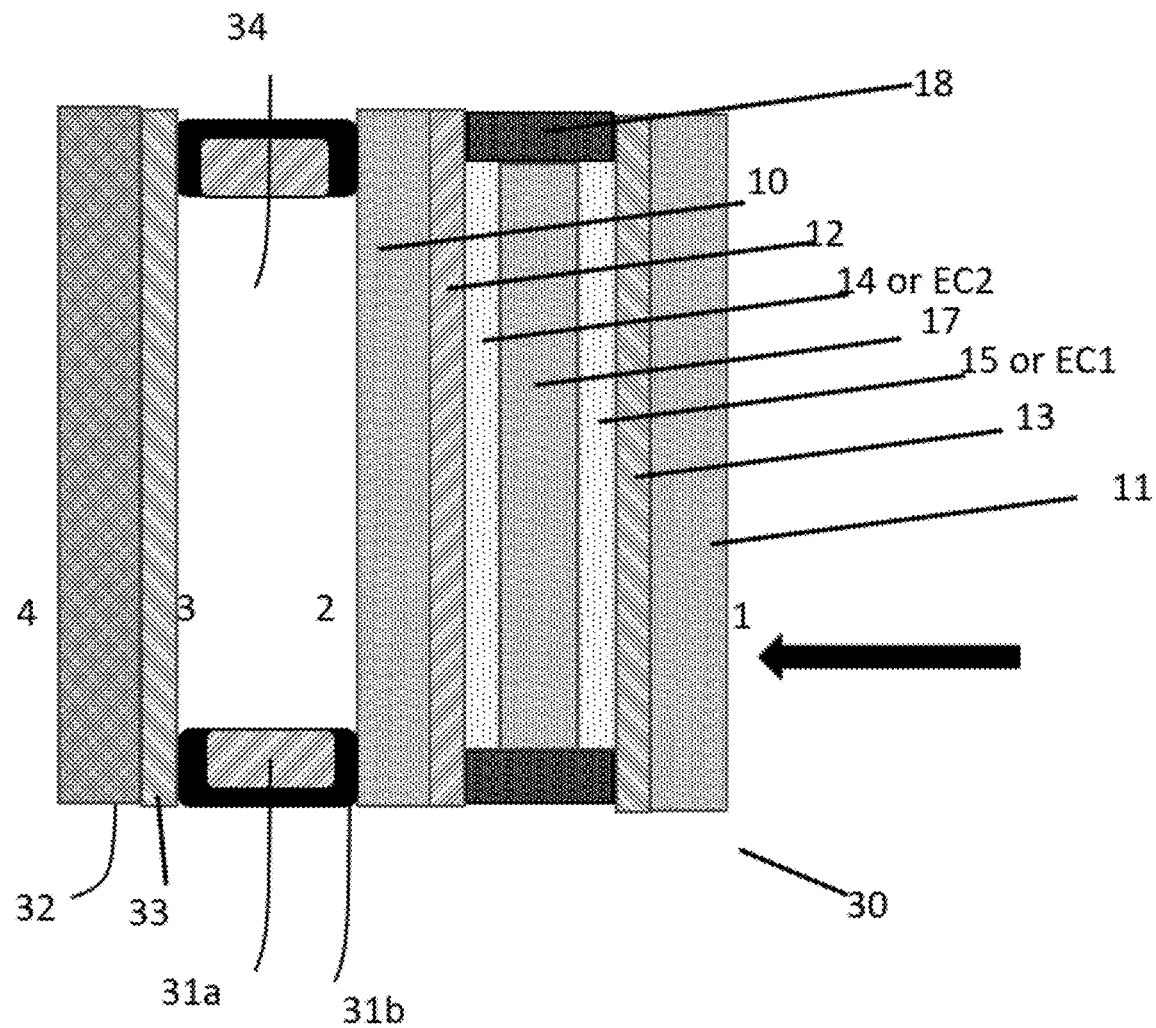
Figure 7:
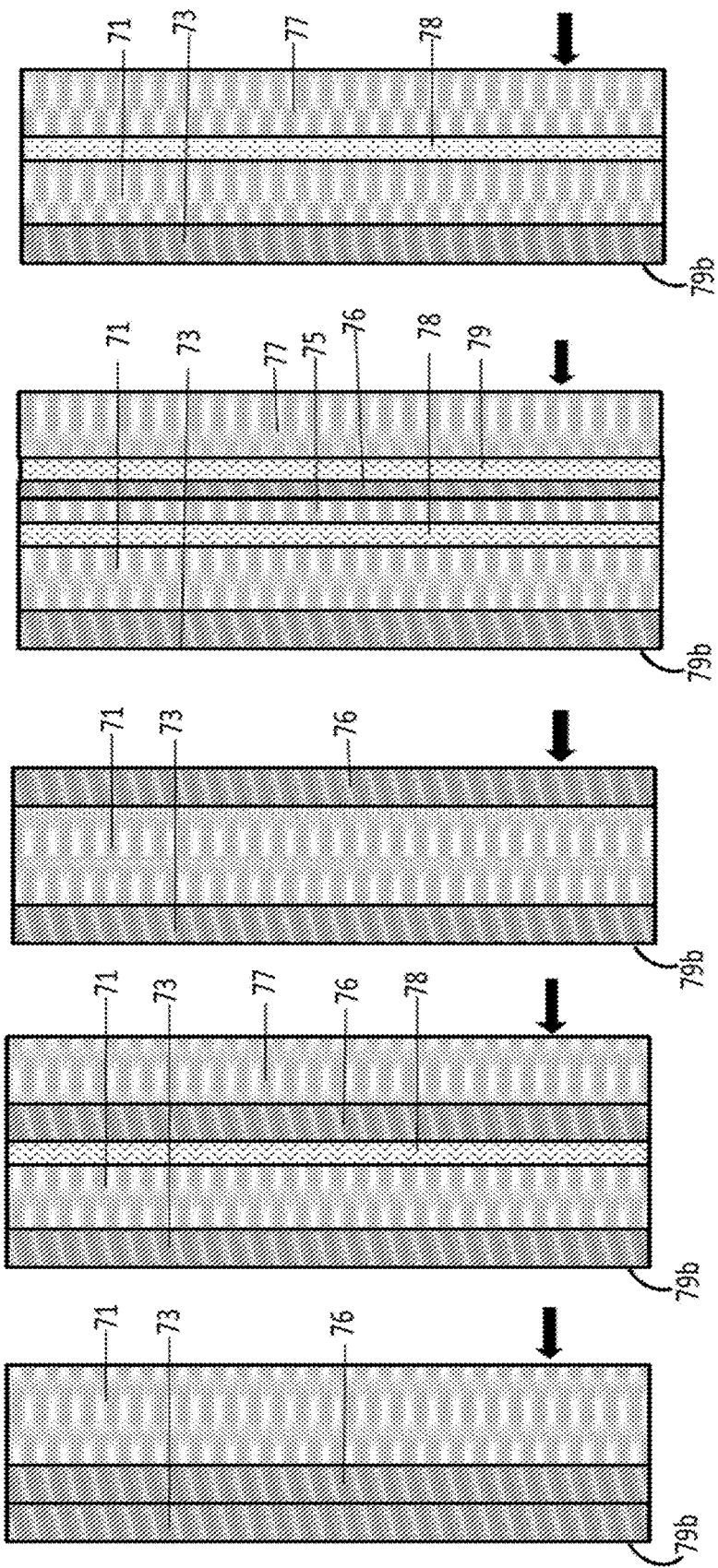
FIGS. 7a-7e show schematics of the front glass substrates and the transparent conductive coatings for use in EC devices using the teachings of the present disclosure.

FIG. 3 shows a VLTP panel which has been integrated into an insulating glass unit (IGU). The components 11-18 comprise an EC VLTP panel, and the same numbering system is used as in FIG. 2a. The powering leads 191 and 192 are not shown in FIG. 3 to simplify the drawing. The IGU is made by assembling the VLTP panel 30 with another transparent substrate 32, typically glass which is coated with a low-e coating 33. These are put together using an edge (peripheral) spacer 31a made out of metal or plastic which is bonded using adhesive 31b. Desiccants are typically added to these spacers. The gap 34 is evacuated or filled with a gas such as air, argon, krypton, etc. If the cavity is evacuated, then spacers are put throughout the cavity (not shown) so that the glass does not collapse due to the outside ambient air pressure. Typically, this gap is about 2 mm or less when the cavity is evacuated, otherwise it typically varies from about 5 to 20 mm when it contains a gas. The four principal surfaces of this IGU are labelled from 1 through 4. Surface 1 faces outside the building and surface 4 faces inside. Surfaces 3 and 2 face the interior gap 34 of the IGU. There may be other variations in the IGU construction, such as the low-e coating which is shown on surface 3, may be deposited on surface 4 or surface 2. There may be additional substrates which may be inserted in the gap 34 and they may also have a low-e coating, e.g., see FIGS. 7 to 9 in published US patent application 2020/0019032. In some literature, the surface of each panel of glass is numbered, for example, the interface between 15 and 17 being 2, and then between 14 and 17 being 3 and so on, so that the surface facing the gap 34 is Surface 4 rather than Surface 2 as shown. However, in the surface convention used in this disclosure, the entire VLTP panel, including any other films and laminates, is taken as a monolith, meaning that Surface 1 faces outside and Surface 2 faces the air (or gas) gap 34.

Also, the present disclosure includes embodiments in which the IGUs have additional panels in the air-gap (e.g., triple panel IGUs (which are not shown)). This means that there are two air or gas gaps on either side of this middle panel. These air gaps may be connected or both of them are isolated from each other. In addition, one of the surfaces (facing the gap) of the middle panel may also have a low-e coating, and in some cases the middle panel is quite thin (i.e., about or less than 1.7 mm down to about 0.5 mm).

Diffused reflectance arises from paper or mediums with polymer dispersed liquid crystal media. Specular reflections arise from smooth metal coatings and also when light travels from one clear medium to another clear medium with a different refractive index (RI). For example, unpolarized light traveling from air to standard clear-soda-lime glass (with an RI of 1.5) at normal incidence is reflected in an amount of about 4% and another 4% of the remaining light (3.84%) is reflected as it exits the other side into the air. Further, of the remaining light being transmitted through the glass, 3.84% of light is reflected of which 3.7% exits the front surface of the glass, making the total reflection from the front substrate to be about 7.7%. This neglects higher order reflections and absorption by glass. In this disclosure, unless mentioned otherwise refractive index ("RI") always refers to the real part of the refractive index "n" in the complex notation n+ik is used, "k" refers to light absorption and is related to tint.

For example, an IGU window unit constructed of two panels where one of them is a VLTP is shown in FIG. 3. Some proportion of the incoming light from outside will be reflected from each surface/interface where there is a change in refractive index and will contribute to the total reflectivity.

When windows with VLTP elements are mounted on buildings, the solar light striking these windows is reflected from not only the various surfaces and interfaces of the entire window, but may also be reflected from the surfaces inside the building if these are bright (or highly reflective) and are close to the window such as light colored drapes. A substantial amount of this light is transmitted back through the window with all reflected components contributing to the overall color and appearance.

When a window with prior-art VLTP element transitions from a clearer or lighter (bleached optical state) to a darker optical state, then the darker state would largely block out the transmission of the reflected light coming from the inside glass element(s) of the IGU leading to a substantial net reflectivity change (usually reduction) which may be in the range of about 25 to 50% as discussed in more detail below. In addition, the color change will be further influenced by any of the reflected light passing towards the front (or to the outside of the building) through the VLTM within the VLTP and taking the hue due to the light absorbance of the VLTM as it passes through.

In a standard (prior art) IGU comprising a VLTP, the reflectivity is about 14 to 16% when the VLTP is in the bleached or the clear state and it typically reduces to about 10% to 11% when the VLTP goes to a darkest state. This means that there is a net reflectivity change of 29% when the reflectivity changes from 14% to 10% ((14−10)/14) or a net reflectivity change of 31% when the reflectivity change is from 16 to 11% ((16−11)/16). Such net changes are substantial and result in a visible change in the appearance from outside when two windows are compared in the two optical states. It is this net reflectivity change which needs to be reduced, and further any color change of the reflected light should be reduced, which may all be expressed as a change in reflected color.

In one embodiment, the front substrate of a VLTP which is present in an IGU and faces outside should reflect enough daylight from substrate 11, 11a in FIG. 2a, 2b or 3, so that this reflection dominates the human perception as compared to the other reflections which originate from the interior surfaces. This means that the product of the daylight intensity multiplied by the reflectivity from this front substrate must exceed any other reflected image when weighted by the photopic response of the eye. For computing the intensity of this image, a D65 illuminant source may be used instead of daylight.

The advantages achieved by the invention of the present disclosure includes use of a first glass substrate in the VLTP with certain reflectivity obtained from the coatings deposited on it. The first substrate may be clear or permanently tinted (i.e. colored substrate). The desired reflectivity is achieved from this substrate and the reflective coatings stacked thereon, wherein the reflective coatings stack comprises a number of transparent alternating coatings with different refractive indices. This stack is also referred as interference stack. The more intense outdoor light during the day results in a specular image of the outdoors (e.g., sky, outdoor landscape and other buildings nearby). Further, the visible light reflectivity of this coated substrate exceeds the specular reflectivity of any of the inboard substrates and coatings or coating stacks on those substrates. To keep the figures simple, these coatings are collectively shown as a single coating as layer 26, 26a and 26b in FIGS. 4, 5 and 6 respectively. In the devices with the reflective coating stack, the reflectivity in the bleached state will be higher which will lead to smaller changes in net reflectivity. In one embodiment, the absolute reflectivity observed through the substrate where the coated side is facing away from the light source for a combination substrate/reflective stack/TC as compared to substrate/TC should be higher and in a range of 4% to 25%. This means prior to constructing an EC device, if this reflection is measured at 8% for Substrate/TC then for substrate/reflective stack/TC it should be in a range of 12% (8%+4%) to 33% (25%+4%) in the same wavelength region. The reflection is typically measured at equal intervals of wavelength (e.g., 5 nm) and then it is summed up in the desired range using the equation $\Sigma(\lambda_i R_i)/\Sigma \lambda_i$, where at each wavelength $\lambda_i$ the reflectivity is $R_i$. The interference stack properties should be so selected such that it will lead to higher reflectivity from the surface of the VLTP panel or the IGU panel when observed from the outside. When this reflectivity is higher, this dominates the visual perception of an outside observer regardless of the state of the optical coloration or the darkness of the EC medium. Thus, this change will also lead to lower net reflectivity change in an IGU that contains the VLTP with the reflective stack.

In an embodiment, this reflectivity increase may be throughout the visible spectrum or it can also acquire a certain color either caused by the color of one or more of the coatings in the interference coating stack and/or by further adding a substrate tint. The means that the overall reflectivity from the substrate with the reflective layer will decrease as some of the light will be absorbed by any permanent tints. However, the reflectivity has to be compared with the same substrate tint but with and without the interference stack. This means that in certain embodiments, the above reflectivity numbers are not achieved in the entire visible spectral range (from 380 to 740 nm) but rather in a range of narrow wavelength regions which have a range of about at least 200 nm span, and in another embodiment this span is 100 nm. These ranges may be contiguous or may comprise several regions adding up to the above wavelength spans. For example, in the first case when the range is 200 nm, the higher reflectivity may be in the wavelength range of 540-740 nm; or in a second case higher reflectivity is between the range of 450 to 550 nm and again between 580 to 680 nm again totaling 200 nm. Strong reflectivity even in a limited wavelength range masks minor reflectivity changes at other wavelengths. Therefore, increased reflectivity of 4 to 25% in the visible range would encompass increased reflectivity in a wavelength range which is at least one of 100 nm, or 200 nm, or the entire visible range as discussed above.

When the interference layer itself uses one or more tinted layers, then the increased reflectivity is compared only for those wavelengths where light is not absorbed as long as the wavelength ranges are as specified above. Tint in a transparent interference layer material is defined where its refractive index coefficient "k" in complex notation n+ik is equal to or more than 0.1 in the visible range (i.e., between 380 to 740 nm) for at least in a span of 100 nm range within this visible region. Since, each of the films used in the interference layer are generally less than about 100 nm, their "k" values have to be quite high to provide appreciable tint. Clear coatings will have "k" less than 0.03 in the visible region. When conflicting values of refractive index are available from different sources of a given material, the reference value must be that which is from the software "Essential Macleod".

Permanent substrate tinting in one embodiment means that the substrate optical transmission percentage should be reduced by at least 10% or lower compared to an equivalent thickness substrate. As a specific example, the transmission of the non-tinted substrate and the permanently tinted substrate (both of which are not coated and the same thickness), is measured at 400, 450, 500, 550, 600, 650 and 700 nm. If, at any of these wavelengths, the difference in percent transmission is greater than 10, then the substrate is tinted, e.g., the non-tinted substrate may have a transmission of 80% at each of these wavelengths, and the tinted substrate will have to have a transmission of at least 70% or less at any of these wavelengths. Permanent tint may also be added by adding a colored reflective layer. Tinting the second substrate that forms the VLTP (substrate 10, 10a in FIGS. 2a, 2b and 3 and substrate 20 in FIG. 4, etc.), may be useful for providing certain indoor light transmission characteristics, but is less impactful in reducing the change in reflectivity as observed from the outside. In one embodiment, the front substrate is tinted, and its tint is similar to the color that EC medium it contacts colors to, to further reduce the change in reflectivity. Similar tint means that the peak optical absorption of the front substrate and the EC medium is within 50 nm of each other.

There are also restrictions (building codes) on the amount of light which may be specularly reflected from the building (or automotive) glass as that may distract vehicle drivers nearby or create high intensity spots due to building's concave curvature. These restrictions vary between different places and are also influenced by the building design (height, glass surface area, convex vs concave building shape, etc.), geographic orientation and the color of reflected light.

The RI of soda-lime glass, a most widely used glass substrate for a variety of building and automotive applications is about 1.525 at 550 nm. The transparent materials (which may also have some color tint) for the reflective stack are generally selected from metal oxides, metal nitrides, metal oxynitrides, metal carbides and metal oxycarbides. The more preferred material choices are oxides, oxynitrides and nitrides. Some specific examples of these materials are $SiO_2$, $Al_2O_3$, $SnO_2$, fluorine doped $SnO_2$, $In_2O_3$, $In_2O_3/SnO_2$ (ITO), $Sb_2O_5$, $TiO_2$, $Fe_2O_3$, $CoO$, $CuO$, $Mn_2O_3$, $ZnO$, $ZrO_2$, $Ta_2O_5$, $WO_3$, $NiO$, $Si_3N_4$, $SiO_xN_y$, $TiN$, and $TiO_xN_y$, and mixtures of these. Also stoichiometries that deviate from the above may also be used and are represented by the above compositions. The thickness of each of the layers in a stack typically ranges from about 10 nm to 100 nm of the different RI materials. RI differences amongst the coatings (or with the substrate) adjacent to each other will typically vary in a range of about 0.35 to 1.4, in another embodiment this range is 0.5 to 1.3, and in another embodiment this range is 0.8 to 1.3. RI is dependent on wavelengths, and if not specifically mentioned this is taken at 550 nm for comparison, as that is close to the photopic vision. Thus, a soda-lime glass substrate may comprise a reflective stack of coatings selected from a higher refractive index material (e.g., tin oxide at 1.85, titania ($TiO_2$) at 2.6, etc.) followed by a lower RI material, such as silica ($SiO_2$) (RI=1.46) and this sequence may be repeated with the same or different thicknesses. The reflective stack is followed by a transparent conductor, which could be Indium/tin oxide or fluorine doped tin oxide as transparent conductors (RI in the range of about 1.85 to 2). Thus, the thickness of the transparent conductor (TC) will influence the reflectivity. Since the increasing thickness of TC increases conductivity, the optimization of the stack will include a balance of all properties. For some of the VLTPs as discussed above, a thin EC layer (less than 1,000 nm in thickness) may be deposited on the transparent conductor. In this case, the influence of the EC layer also needs to be considered on the reflectivity, which means that the reflective stack materials, thicknesses and/or number of layers will have to be adjusted to get to a desired reflectivity.

Since the EC layer colors (or darkens) upon the application of voltage, the thin films of the EC materials deposited are preferably those where the change in the real part of the refractive index "n" is low. An example is tungsten oxide, in which "n" changes from 1.97 in the clear state to 1.85 in the colored state (see Von Rottkay, K., et al, *Optical indices of electrochromic tungsten oxide*, Thin Solid Films 306 (1997) p-10-16). Thus, the stack reflectivity prior to the light entering the EC medium will not change much when tungsten oxide colors.

The stack thicknesses and layering can be predetermined by knowing the refractive index of materials (both "n" and "k") as a function of wavelength in the visible spectrum, where "n" is the real part of the refractive index and "k" relates to the absorption component or the imaginary part in the complex number notation of refractive index. Many companies provide software for modelling optical properties of these materials, e.g., see "Essential Macleod" software from the Thin Film Center (Tucson, AZ). According to the present disclosure, color imparting coatings may be used within the reflective stack to control the color of reflected light, colored coatings have an increasing "k" value in the wavelengths in which they absorb or are colored. Some transparent coatings that can impart color from the above list are oxides containing, $Fe_2O_3$, CoO, CuO and $Mn_2O_3$ or using sub-stoichiometric oxides.

For those VLTPs which do not have a transparent conductor, the reflective stack is present on the inner side of the first (front) substrate that contacts the variable light transmission medium, such as a thermochromic film.

Although the reflectivity changes must be measured in complete EC (VLTP) panels, or after these are integrated within an IGU. However, the impact of change on reflectivity by coloring the EC layer deposited on a substrate having a transparent conductor (TC) with and without a reflective stack below the TC can be determined by making half cells. For example, taking the substrate 11 and coating it with the transparent conductor 13 and EC1 layer 15 (FIG. 2a) and measuring the reflectivity from the uncoated side (e.g. see arrow in FIG. 2a) both when the EC1 layer is colored and it is bleached. The EC1 layer can be colored and bleached in a liquid electrolyte containing other passive electrodes and then removing the substrates with EC1 for measurement. The same is repeated for samples which are identical except that they have a reflective stack below the transparent conductor. A minimum level of coloration in going from bleached to a colored state for a half cell will be a light transmission ratio of at least 2.5 and in another embodiment at least 5 and yet in another embodiment 10. Depending on the color to which this material changes to, this could be at any wavelength in the visible region, for tungsten oxide this may be selected as 550 nm. These are not complete devices, however, they may be used to roughly establish a first level of viability, if the color change will cause the reflective change to be small, while at the same time the transmissive color change is large. This color change should be preferably measured when the EC1 layer is in contact with a medium having a refractive index similar to the electrolyte (see 17 in FIG. 2a) being used. For example, this measurement may be made in contact with a liquid which is similar to the refractive index of the electrolyte. In most polymeric and liquid electrolytes, this is in the range of about 1.4 to 1.55. Since the RI is wavelength dependent, the average numbers at 550 nm may be taken. The reflectivity color change $\Delta E_R^*$ in the two states should be less than 6 in one embodiment, and less than 3 in another embodiment. Since the reflectivity difference from the coatings is being established, a black background (light absorbing) should be used to measure this, otherwise, reflections from the background will interfere with this measurement. These small reflectivity changes are only defensible when these are accompanied by large changes in transmission such as the numbers given above for half cells. The same measurements are then repeated for half cells where a reflective stack is present below the transparent conductor.

For complete EC and other devices (or VLTP panels of any kind) the bleached state and the colored state are selected at the extreme range of their optical modulation which they would be exhibiting for a given product.

Figure 4:
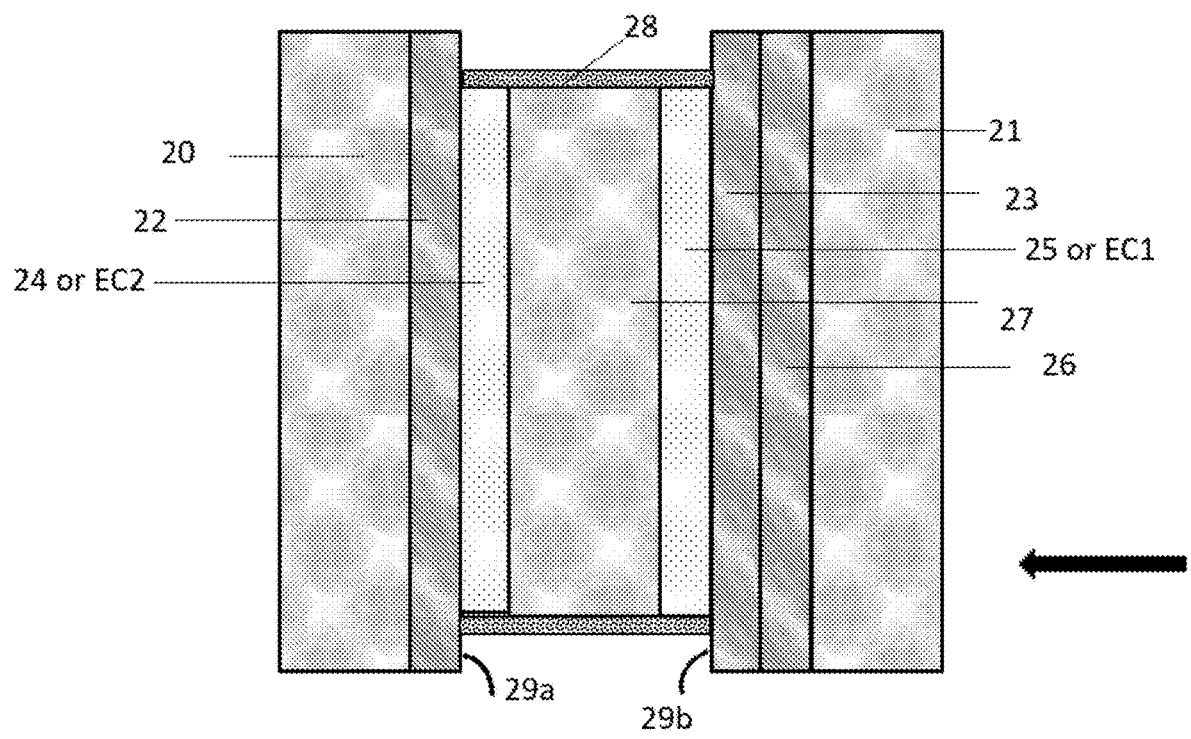
FIG. 4 illustrates schematics of several types of EC (VLTP) devices made using the teachings of the present disclosure.

FIG. 4 shows an EC VLTP construction according to the present embodiments shown in FIG. 4. This figure shows a pair of transparent substrates 20 and 21 both of which are coated with transparent coatings 22 and 23, respectively, which are electrically conductive (transparent conductors or TC). The reflective stack is represented by a single layer 26 in FIG. 4, although this stack includes at least two or more layers as discussed earlier. These are further coated with two redox layers 24 and 25, at least one of which has EC properties. In some embodiments, both have EC properties and may be referred to as EC2 (layer 24) and EC1 (layer 25) coatings, respectively. These are assembled together in a parallel configuration using an electrolyte layer 27 of uniform thickness which may be a prefabricated polymer film. A perimeter sealant 28 to protect the electrolyte and the EC1 and EC2 is shown. Power is applied on the two opposing conductive substrates as shown as 29a and 29b to change the optical properties. The reflective layer stack (26) increases the reflection of daylight and is termed as reflective or reflection enhancing layer(s). The present disclosure advantageously includes selecting the coatings composition and their thicknesses so that daylight is reflected from the first substrate (21) including the thin film stack (in this device this stack comprises layers 23, 25 and 26). When the EC medium colors (e.g., layer 25 along with layer 24), the impact on the amount of reflection or a change in its color is not noticeable by an observer who is standing outside of the building and watching the building under daylight conditions.

When an external observer views a building, which have VLTP panels in various states of coloration, it is important that such differences are not seen from outside. According to the present disclosure, the reflective color differences seen during daytime are as small as possible. In one embodiment, these color differences measured as $\Delta E_R^*$ are less than 8 for windows which are in different optical states, usually this is established by going the extreme of colored and bleached states and measuring the reflectivity. These changes may be measured in an IGU where such VLTPs are incorporated. In another embodiment, this color difference $\Delta E_R^*$ is less than 6, and in another embodiment less than 3. While the changes in the reflected color are small, the change in transmitted color and/or the optical transmission change at 550 nm must be large. In one embodiment, the small changes in reflectivity as characterized above must be shown when the transmitted color change of the VLTP or the IGU that has these panels are large. The large color changes in transmission may be shown by $\Delta E_T^*$ exceeding 40 and in another embodiment exceeds 50 and in a further embodiment 60. In case the transmission change is not measured by change in color but rather a change in transmission, the change in transmission ratio of the VLTPs or the IGUs containing these VLTPs should be equal to or greater than 2.5 at 550 nm (ratio of % transmission in bleached state divided and the % transmission in the colored state). 550 nm is typically used as it represents the peak of photopic response, i.e., eye sensitivity. In another embodiment the transmission ratio change is at least 5, and yet in another embodiment this ratio must change by at least 10.

In one embodiment as shown in FIG. 4, EC devices can be made with the same reflected color and different transmitted color. In this device, the second EC layer 24 on the second substrate is separated from the first substrate 21 (and all of the coatings on it) using a thick electrolyte layer 27 (thickness greater than 10 µm). This separation eliminates interference of the reflections coming from these substrates, which means that the light coming from the second EC layer (transmitted or reflected) will not cause any coherent optical interference from the light being reflected from the front substrate and also will be much lower in intensity as compared to the high reflectivity emanating from the front substrate.

Figure 6:
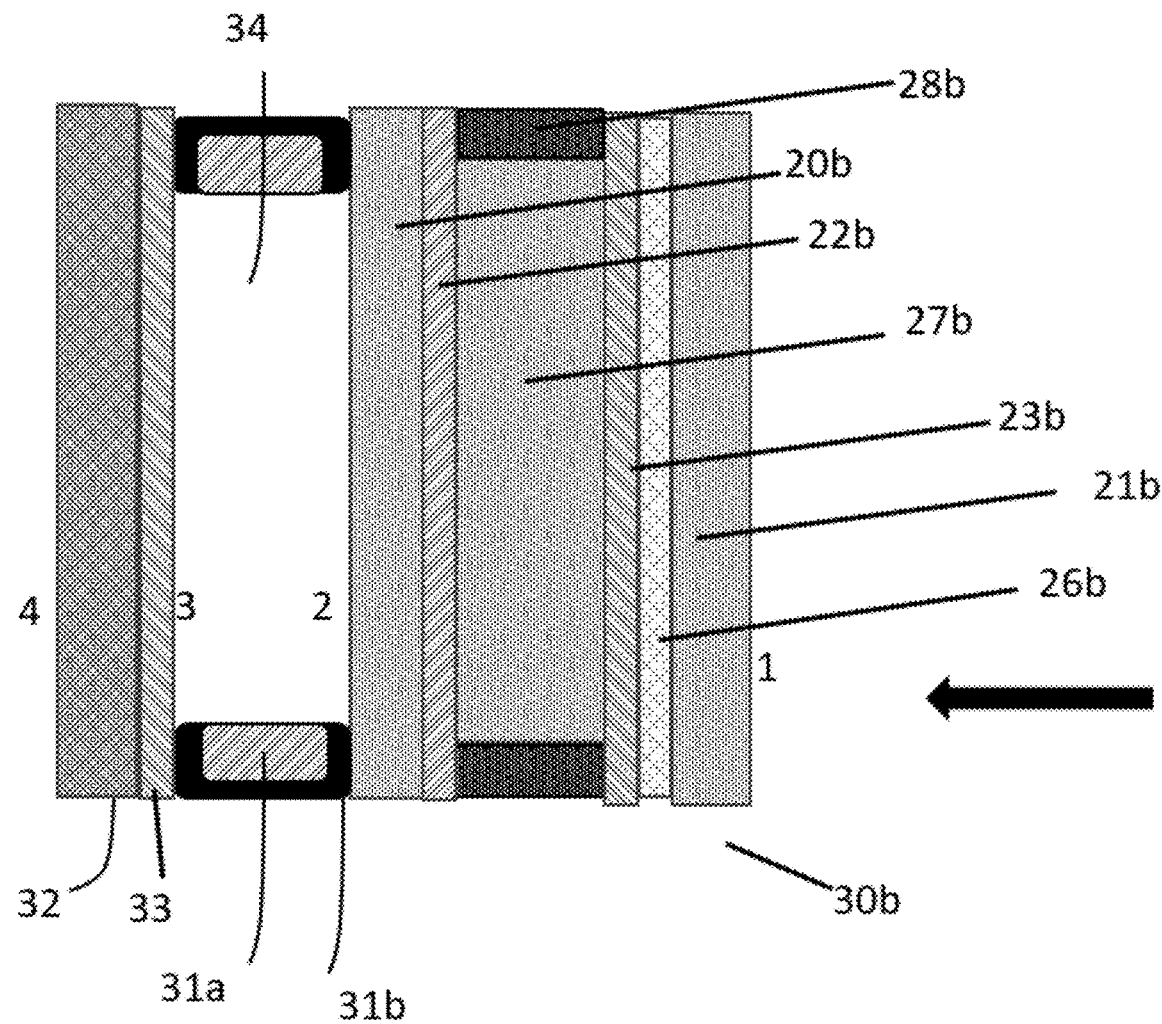
FIG. 6 illustrates a schematic of an insulated glass unit (IGU) containing an EC VLTP of FIG. 2b which is modified according to the present disclosure.

Another way of achieving this is shown by a different type of an EC device as shown in FIG. 6. FIG. 6 shows an EC device incorporated into an IGU. IGU is formed another clear substrate 32 that has a low-e coating 33. The EC device 30b and the substrate 32 are separated by a gap 34 which is filled with a gas as discussed earlier. 31a is a peripheral spacer gasket that keeps the substrates apart and is bonded in place by an adhesive 31b. The device comprises two clear substrates 20b and 21b, where 21b is coated with a reflective stack 26b followed by a TC 23b. Substrate 20b is coated with a TC 22b and these are then assembled in a parallel configuration where the TC coatings contact a thick electrolyte (typically greater than 10 microns in thickness). 28b is a perimeter sealant. The electrolyte is also an electrochromic medium as this has redox dyes. Since, the reflective layer increases the reflectivity prior to the light entering the EC medium, these devices also show reduced color change in reflection as the EC device colors. In many IGUs, it is desirable that substrate 32 is tempered for increasing strength and safety so that if the glass were to break, injuries to the occupants are minimized as tempered glass breaks in small pieces without having sharp corners. This is particularly done for windows which are placed in commercial buildings and also in residential buildings in swinging windows and in doors (that is for the windows that are present in the doors). Further, tempering may also be performed for the VLTP (or EC in this case) forming glasses like 11 or 11 and 10 so that the chances of window breakage is minimized in case these windows heat-up due to large absorption of the solar radiation (which gets converted to heat, particularly when the VLTP element is in the dark state).

Another way of forming a high efficiency EC device for single pane windows or automotive glass is to bond a film with a low-e surface on to the inside facing surface of an EC panel. These films may be on polymer substrates. As an example, the films should have a low-e coating with emissivity of 0.2 or lower in one embodiment and 0.1 or lower in another embodiment. Typically a low emissivity of as low as 0.02 may be achieved on these films. For example, low-e may include a low emissivity of 0.3 to 0.01 in one aspect, or 0.2 to 0.02, or any number or range within the disclosed ranges. These films may be polymeric or non-polymeric and may have an adhesive for bonding. Ecolux™ 70 from Saint Gobain Performance Plastics (San Diego, CA) and Thinsulate™ Climate Control 75™ from 3M (St. Paul MN) are polyester films with a low-e coating. For some EC products a UV protective film may be applied on the outside surface of the EC panel. Examples are Sentinel Plus OX 80, Sentinel Plus OX 50, Sentinel Plus SS 45, SX80, SX50, SS45 and SS25 all from Saint Gobain Performance Plastics; Prestige Exterior 90, Prestige Exterior 70, Prestige Exterior 50, Prestige Exterior 40, Prestige Exterior 20, Safety S70 Exterior from 3M; and Exterior Bronze 35 from XPEL Technologies (San Antonio, TX).

For a given EC device (for example, the type of tint on the front substrate, the type of interference layer or its absence, the type of EC material (i.e., its color in the bleached and colored states), the selection of the low-e glass is highly important in ensuring that the $\Delta E_R^*$ is not compromised. For an IGU comparing a VLTP panel, in first embodiment, the $\Delta E_R^*$ should be about equal to or less than 3, 6 or 8 (as discussed earlier in three embodiments), and in second embodiment the selection of low-e glass should be made so that the increase in value of $\Delta E_R^*$ should not be more than 2 when the EC panel is integrated into the IGU and in third embodiment this should not be more than 4. As an example, according to the second embodiment, if the $\Delta E_R^*$ of the EC panel from the colored to the bleach state is 2, then the $\Delta E_R^*$ of the IGU should not exceed 4 upon coloration of the EC device; and according to the third embodiment this number would be 6. In those window applications where IGU constructions are not used the above number apply for the EC panels, or EC panels with UV blocking or solar-light modulating films, and/or films with low-e surfaces. In this case the reflectivity for establishing color difference from outside is measured from the surface of the VLTP panel or the film surface that faces outside.

In another embodiment both $\Delta E_R^*$ and $\Delta E_{R-H}^*$ are considered. The $\Delta E_R^*$ considerations are listed above, and in this embodiment $\Delta E_{R-H}^*$ are added and this should be equal to or less than 4 for the EC panel or the IGU.

Examples of EC devices where thick electrolytes are used and also have an EC layer 24 are provided in U.S. Pat. No. 6,853,472 and published US patent applications 2020/0019032, 2020/0017648, 2019/0196291 and 2014/0205748. The first two published applications describe devices where the EC layer 24 comprises of conductive particles and dyes (typically organic and organometallic redox dyes with EC properties) and EC layer 25 can be a thin inorganic coating of an EC material, such as tungsten oxide containing material. The dyes in EC layer 24 may be selected to provide different colors. Examples of dyes in the electrolyte (such as those described in FIG. 2b) can be found in U.S. Pat. No. 6,141,137 (Byker), where several anodic and cathodic dyes are incorporated into a thick electrolyte.

Figure 5:
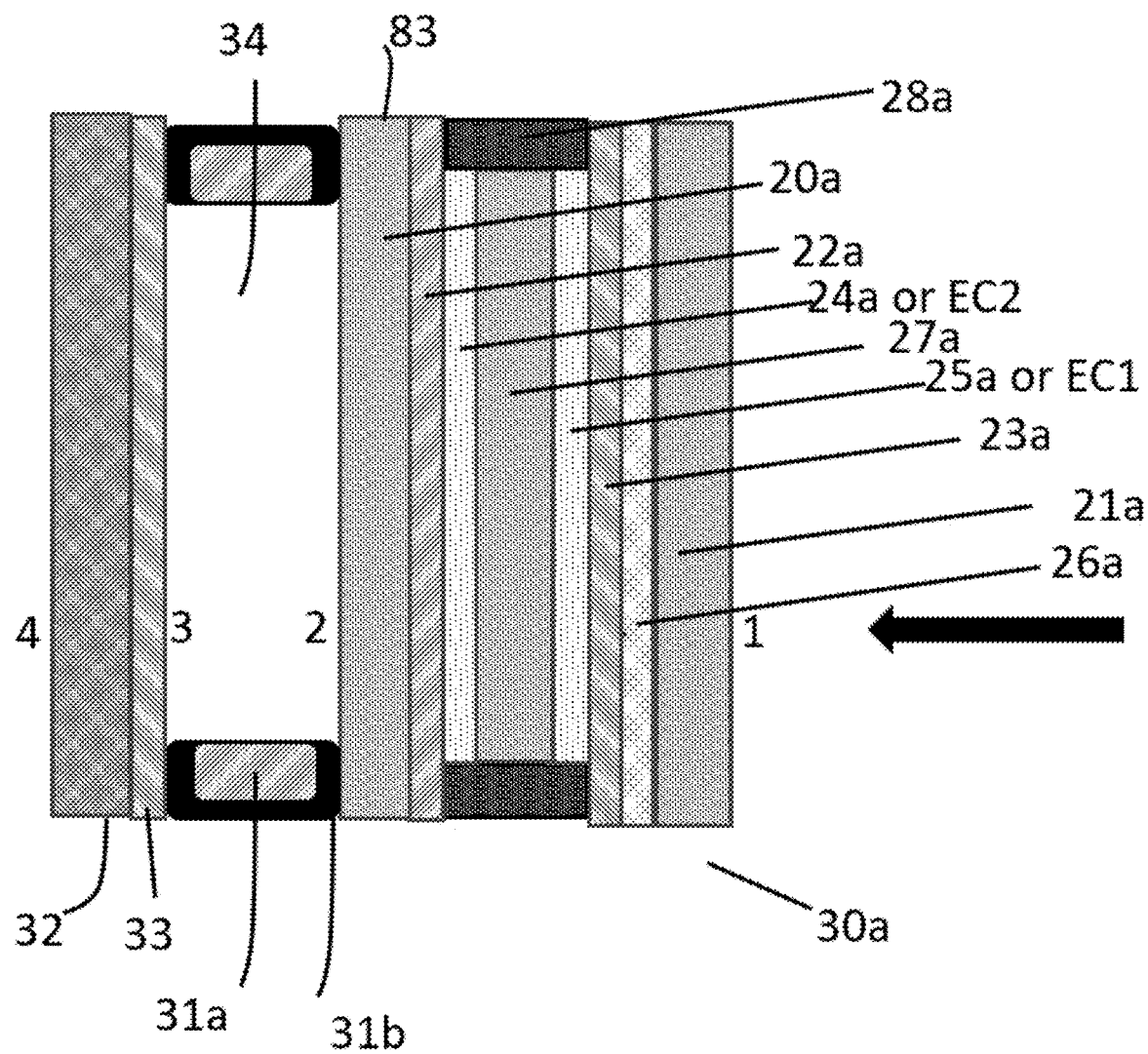
FIG. 5 illustrates a schematic of an insulated glass unit (IGU) containing an EC VLTP of FIG. 4.

FIGS. 4, 5 and 6 show the EC devices formed using the present invention and their incorporation in the IGU. There may be other ways of configuring the substrate with the transparent conductor (TC) that faces the outside and achieve the color aspects as discussed herein. These are shown in FIGS. 7a-7e. These embodiments will be discussed in reference to FIG. 4 which shows an EC device or the VLTP panel (without the IGU). FIG. 7a shows the structure of the outside glass used to form the EC device as in FIG. 4. This means that the outside glass in FIG. 4 shown as 21, interference layer 26 and the transparent conductor 23 are respectively similar to 71, 76 and 73 shown in FIGS. 7a-7e. The EC layer or the EC medium or any VLTP medium contacts the transparent conductor (TC). To form a VLTP device, a VLTP medium contacts surface shown as 79b (FIGS. 7a-7e). In FIG. 4, the EC medium "EC1" is deposited or contacts the transparent conductor 23. As usual, the thick arrow shows the outside facing surface of the device.

The other variations shown in FIGS. 7b-7e will be explained in reference to FIG. 7a. In order to keep the labelling consistent in all of these figures, label 73 always is the transparent conductor (TC) which contacts the VLTP medium, 71 is the substrate on which the transparent conductor 73 is deposited, and the interference layer to provide the reflectivity when present is shown as 76. It is to be understood that for each case the characteristics of the interference layer or the color of the layer may have to be fine-tuned to get the desired effects, in other words, the characteristics of the interference layer(s) (i.e., if the interference layer comprises of multiple layers) if optimized for the embodiment shown in FIG. 7a may not be optimum for FIG. 7b and so on. Even if the same materials are used to form these layers their thicknesses and colors may be different to get an equivalent amount of reflectivity and color.

FIG. 7b shows that the substrate 71 and the TC is shown as 73, which is laminated to another substrate 77, wherein the latter has the interference layer 76 deposited on it. The lamination material 78 is typically a polymeric film (also called an interlayer) which may be made out of clear copolymers. Some examples of these copolymer films are fluoropolymers, thermoplastic polyurethane, polyvinyl butyral (PVB), acrylic, polyester, polyurea, polycarbonate, polyvinyl acetate, or combinations thereof. The light absorption and reflection characteristics and the thicknesses of the materials 77, 76, 78 and 71 may be adjusted which result in the desired reflectivity. In general, the interlayer thickness is from about 100 to about 2,000 μm. A variation of this theme is where the reflective stack 76 is deposited on the substrate 71 so that it contacts the interlayer 78. In another variation of this theme, substrate 77 may be rigid (e.g., glass) or may be a polymeric film which is flexible and generally in a range of about 25 to 250 μm in thickness. In case a flexible film such as polyester or polycarbonate is used with an interference layer 76, the interlayer 78 may be replaced by an adhesive layer (e.g., a pressure sensitive adhesive) that is formed on top of the interference layer and protected by a release film. This release film is removed prior to bonding this assembly on the surface of 71. The use of a flexible film also provides the capability to use the reflective properties for retrofit applications.

In FIG. 7c, the interference layer 76 is deposited on the first side of the substrate 71, since TC is deposited on the second side. In this case layer(s) 76 are not protected from the elements and may include a hard or a weather/scratch-resistant coat.

FIG. 7d shows another variation where the interference stack 76 is deposited on a substrate 75 (third substrate). This substrate may be rigid (e.g., glass) or a flexible polyester or polycarbonate film as discussed earlier. This is laminated using two interlayers 78 and 79 between the substrates 71 (first substrate) and 77 (second substrate). In a further variation of this theme, the interference stack 76 may be deposited on any side of the third substrate 75, that is facing the substrate 77 (which is shown) or facing substrate 71. In another embodiment, a flexible substrate 75 with an interference layer may also be used, where one side of this film has an adhesive layer, i.e., equivalent to layer 78 to bond to substrate 71 and is then laminated using a film 79 to the substrate 77.

FIG. 7e shows another variation where substrate 77 is laminated to substrate 71 using an interlayer 78 (or layer 78 is an adhesive layer). The color of the interlayer, adhesive or the substrate 77 is selected so that the impact of the reflected light coming from the EC device is low. In this case, typically the color of one of these is intense so that the transmission of the visible light through the stack shown in FIG. 7e is less than about 50%.

In another embodiment, at least one of the interlayers or the adhesives or the flexible (polymeric) film used in the embodiments or together when used together has high UV blockage. This means that the optical absorbance of the radiation in the wavelength range of 290 to 390 nm should be at least two (this also means that UV in this range is attenuated by 99%). In another embodiment this range is extended from about 290 nm to 400 nm. Yet in another embodiment the UV is attenuated in the range of 290 to 400 nm by at least 90%. (optical absorbance of 1) This attenuation is measured at any wavelength in the stated regions. For example, such laminating interlayers of PVB are available as Saflex™ and Saflex™ UV (Eastman, Kingsport, TN); PVB (Trosifol™, Trosifol™ UV Extra Protect) and ionoplast interlayers (Sentryglas®) from Kurraray, Japan; UA01 UB03 from Sekisui Chemicals. Flexible polyester films with pressure sensitive adhesives in different colors, reflection, transmission and Low-e surfaces are available for example from Saint Gobain (Malvern, PA), 3M (St. Paul, MN) and XPEL Technologies (San Antonio, TX) for a variety of applications related to the buildings and transportation.

Even though buildings may have VLTP panels, these may be supplemented by blinds, which may be used to reduce the direct solar glare at certain times during the day or to provide privacy at night by changing a clear vision to a hazy or a translucent vision by scattering light. Depending on the color, these blinds may still reflect quite a bit of the incoming light from the outside. Thus, it is preferred that the drape color (or the side of the drape facing the window) should be darker in color. These drapes may be integrated within the IGUs so that they are placed within the air/gas space of an IGU such as in the region 34 of FIGS. 3, 5 and 6. For example, drapes integrated with passive IGU window units are available as Blink™ from ODL (Zeeland, MI). These drapes may also be outside the IGUs to mitigate the above situations.

These drapes (e.g., roller shades) may be woven or knitted structures having an openness factor between 0.5 and 10%, and in another embodiment having an openness factor between 2 to 5% and in another embodiment between 5 and 10%. Such fabrics for drapes will be collectively termed as open fabrics or as sheer fabrics. The visible light transmittance of these fabrics may range from 2 to 25% and in another embodiment between 5 to 20%. The solar transmission is in the range of 10-30% and solar reflection in the range of 30 to 70%. The solar transmission, reflection and the visible transmission properties may be determined using test method EN14500:2008 (test method available from SAI Global Standards, Chicago, IL). Since light color fabrics result in maximum contrast when drawn, it is important to test the impact of light-colored shades on the VLTP window systems. A preferred color of these fabrics for drapes that are not visible from outside are darker with L* values below 30. The drapes may also have dark colors that face outside and light, white and off-white colors (L value >70) facing inside. The same may be used for drapes placed within the gas space of the IGU as described earlier. Both light and dark fabrics can reduce direct solar glare combined with the transmission change of the VLTP panels. The light colored drapes provide superior privacy and the dark colored drapes provide superior vision to the outside view. More details on fabrics and their use to block glare and provide privacy is found in KONSTANTZOS, Iason, et. al., *Daylight Glare Evaluation when the Sun is Within the Field of View Through Window Shades*, Proceedings of 4th International High Performance Buildings Conference at Purdue, Jul. 11-14, 2016 (Purdue e-Pubs, Purdue University, West Lafayette, IN).

The present disclosure includes the following non-limiting aspects:

Aspect 1. An electrochromic variable light transmission panel (VLTP) comprising:
(a) a first transmissive substrate and a second transmissive substrate arranged in a parallel configuration;
(b) wherein the first transmissive substrate comprises a first side and a second side, wherein the second side of the first substrate is coated with a coating stack comprising at least two layers, followed by a coating of a transparent conductor and further followed by an electrochromic (EC) layer;
(c) and an electrolyte layer disposed between the first and second transmissive substrates, wherein the electrolyte layer contacts the said EC layer;
wherein the said VLTP shows a color difference $\Delta E_T^*$ of greater than 40 in transmitted color when measured in the bleached and the colored optical states, and shows a color difference $\Delta E_R^*$ of less than 6 when measured in the bleached and the colored optical states when reflection is viewed from the first side of the first substrate.

Aspect 2. The electrochromic VLTP as in aspect 1, wherein the $\Delta E_R^*$ is less than 3.

Aspect 3. The electrochromic VLTP as in aspect 1, wherein a second transparent conductor layer is deposited on the second substrate followed by a layer of a second EC material, wherein the second EC material contacts the said electrolyte.

Aspect 4. The electrochromic VLTP as in aspect 1, wherein the coating stack comprises materials which have different refractive indices.

Aspect 5. The VLTP in aspect 3, wherein the composition of the second EC material deposited on the second transmissive panel is selected from an inorganic metal oxide and a polymeric composition.

Aspect 6. The VLTP in aspect 5, wherein the polymeric composition comprises electrically conductive nanoparticles.

Aspect 7. An insulated glass unit (IGU) assembly comprising the VLTP of aspect 1, wherein the said IGU assembly contains at least one low-e coated panel in addition to the said VLTP; and the said IGU assembly shows a color difference $\Delta E_T^*$ of greater than 40 in transmitted color when compared in the bleached and the colored optical states of the VLTP, and shows a color difference $\Delta E_R^*$ of less than 8 when reflection is viewed from the first side of the VLTP when compared in the bleached and the colored optical states of the VLTP.

Aspect 8. The VLTP as in aspect 1, wherein $\Delta E_{R-H}^*$ is less than 4.

Aspect 9. A IGU assembly as in aspect 7, wherein $\Delta E_{R-H}^*$ is less than 4.

Aspect 10. A window comprising the VLTP of aspect 1, further comprising a film bonded to the second substrate on the side that is not facing the electrolyte layer, and the said film has a low-e surface.

Aspect 11. An electrochromic variable light transmission panel (VLTP) comprising
(a) a first transmissive substrate and a second transmissive substrate arranged in a parallel configuration;
(b) wherein the first transmissive substrate comprises a first side and a second side, wherein the second side is coated with a stack of coatings comprising at least two layers, followed by a coating of a transparent conductor;
(c) wherein the second transmissive substrate comprises a first side and a second side, wherein the first side of the second transmissive substrate is coated with a transparent conductor;
(d) wherein the substrates are disposed in an assembly such that an electrochromic medium is disposed between sides coated with the transparent conductors on the two substrates;
wherein the said VLTP shows a color difference $\Delta E_T^*$ of greater than 40 in transmitted color when measured in the bleached and the colored optical states, and shows a color difference of $\Delta E_R^*$ of less than 6 when reflection is viewed from the first side of the first substrate.

Aspect 12. The VLTP of aspect 11, wherein the electrochromic medium is an electrolyte which has electrochromic properties Aspect 13. The VLTP of aspect 11, wherein at least one electrochromic coating is deposited on one of the said transparent conductors.

Aspect 14. The VLTP as in aspect 11, wherein $\Delta E_{R-H}^*$ is less than 4.

Aspect 15. A window comprising a VLTP of aspect 11, further comprising a film bonded to the second side of the second substrate, wherein the said film has a low-e surface.

Aspect 16. The VLTP in aspect 11, wherein the composition of the EC layer deposited on the second transmissive panel is selected from an inorganic metal oxide and polymeric composition.

Aspect 17. An insulated glass unit (IGU) assembly comprising the VLTP of aspect 11, wherein the said IGU assembly comprises at least one low-e coated panel in addition to the said VLTP; and the said IGU assembly shows a color difference $\Delta E_T^*$ of greater than 40 in transmitted color when compared in the bleached state and the colored optical states of the VLTP, and in these optical states of the VLTP, the IGU assembly shows a color difference in reflected color $\Delta E_R^*$ of less than 8 when reflection is viewed from the first side of the VLTP.

Aspect 18. The IGU assembly as in aspect 16, wherein $\Delta E_{R\text{-}H}^*$ is less than 4.

Aspect 19. An electrochromic variable light transmission panel (VLTP) comprising
  (a) a first transmissive substrate and a second transmissive substrate arranged in a parallel configuration;
  (b) wherein the first substrate comprises a first side and a second side, wherein the second side is coated with a stack of coatings comprising at least two layers, followed by a coating of a transparent conductor;
  (c) wherein the second substrate comprises a first side and a second side, wherein the first side of the second substrate is coated with a transparent conductor;
  (d) wherein the substrates are configured in an assembly such that an electrochromic medium is disposed between conductive sides of the first and second substrates;
wherein the said VLTP shows a transmission ratio of greater than 2.5 at 550 nm when measured in the bleached and the colored states, and, in these optical states, shows $\Delta E_R^*$ of less than 6 when reflection is viewed from the first side of the first substrate.

Aspect 20. the electrochromic VLTP as in aspect 19, wherein the electrochromic medium has electrolytic properties.

Aspect 21. The electrochromic VLTP as in aspect 19, wherein the first substrate comprises soda-lime glass and the stack of coatings comprises at least two of $SiO_2$, $Al_2O_3$, $SnO_2$, $Sb_2O_5$, $TiO_2$, $Fe_2O_3$, CoO, CuO, $Mn_2O_3$, ZnO, $ZrO_2$, $Ta_2O_5$, $Si_3N_4$, $SiO_xN_y$, TiN, and $TiO_xN_y$, and mixtures thereof, and wherein each of the two layers in the stack comprises at least one of $SiO_2$, $Al_2O_3$, $SnO_2$, $Sb_2O_5$, $TiO_2$, $Fe_2O_3$, CoO, CuO, $Mn_2O_3$, ZnO, $ZrO_2$, $Ta_2O_5$, $Si_3N_4$, $SiO_xN_y$, TiN, and $TiO_xN_y$.

Aspect 22. The electrochromic VLTP as in aspect 19, wherein a layer in the stack that contacts the first substrate has a higher refractive index as compared to the first substrate.

Aspect 23. The electrochromic VLTP as in aspect 19, wherein each layer in the stack has a thickness of 5 to 100 nm.

Aspect 24. The electrochromic VLTP as in aspect 19, wherein
  a) the first substrate is tinted,
  b) at least one of the coatings in the stack is tinted, or
  c) both a) and b).

Aspect 25. An insulated glass unit (IGU) assembly comprising at least one low-e coated panel and a VLTP separated by a gap, wherein the VLTP comprises:
  (a) a first transmissive substrate and a second transmissive substrate arranged in a parallel configuration;
  (b) wherein the first substrate comprises a first side and a second side, wherein the second side is coated with a coating stack comprising at least two layers, followed by a coating of a transparent conductor and further followed by a EC layer;
  (c) and an electrolyte layer disposed between the first and second substrates, wherein the electrolyte layer contacts the said EC layer;
wherein the said IGU assembly shows a color difference $\Delta E_T^*$ of greater than 30 in transmitted color when compared in the bleached and the colored optical states of the VLTP, and in these optical states, shows a color difference $\Delta E_R^*$ of less than 8 when reflection is viewed from the first side of the first substrate.

Aspect 26. An insulated glass unit (IGU) assembly comprising at least one low-e coated panel and a VLTP separated by a gap, wherein the VLTP comprises
  (a) a first transmissive substrate and a second transmissive substrate arranged in a parallel configuration;
  (b) wherein the first transmissive substrate comprises a first side and a second side, wherein the second side is coated with a stack of coatings comprising at least two layers, followed by a coating of a transparent conductor;
  (c) wherein the second transmissive substrate comprises a first side and a second side, wherein the first side is coated with a transparent conductor;
  (d) wherein the first and second substrates are configured in an assembly such that an electrochromic medium is disposed between conductive sides of the first and second substrates;
  and the said IGU assembly shows a color difference $\Delta E_T^*$ of greater than 30 in transmitted color when compared in the bleached and the colored optical states of the VLTP, and, in these optical states, shows a color difference $\Delta E_R^*$ of less than 8 when reflection is viewed from the first side of the first substrate.

Aspect 27. A method of making an electrochromic variable light transmission panel (VLTP) having a color difference $\Delta E_T^*$ of greater than 40 in transmitted color when measured in the bleached and the colored optical states, and a color difference $\Delta E_R^*$ of less than 6 when measured in the bleached and the colored optical states when reflection is viewed from the first side of the first substrate, comprising:
  providing a first and a second transmissive substrate, each having a first side and a second side, respectively, and arranged in a parallel configuration so that the second side of the first transmissive substrate faces the first side of the second transmissive substrate;
  coating at least two coating layers on the second side of the first transmissive substrate;
  coating a first transparent conductor layer over the at least two coating layers; and
  coating a second transparent conductor on one side of the second transmissive substrate
disposing an electrochromic material between the two transparent conductors.

Aspect 28. The method of aspect 27, wherein the said electrochromic material is dispersed in an electrolyte, and the said electrolyte contacts the two transparent conductors.

Aspect 29. The method of aspect 28, further comprising an EC layer deposited on the transparent conductor of the first substrate.

Aspect 30. The method of aspect 29, further comprising: coating a second transparent conductor layer on the first side of the second substrate, followed by coating a second EC layer over the transparent conductor layer on the second substrate, wherein the second EC material contacts the electrolyte layer.

Aspect 31. The method of aspect 27, further comprising: bonding a low-e film to the second side of the second substrate.

Aspect 32. The method of aspect 27, wherein the EC layer is disposed in the VLTP as a prefabricated polymer film.

Aspect 33. The method of aspect 27, wherein the $\Delta E_R^*$ is less than 3.

Aspect 34. The method of aspect 27, wherein the first substrate comprises soda-lime glass and the at least two coating layers are independently selected from $SiO_2$, $Al_2O_3$, $SnO_2$, $Sb_2O_5$, $TiO_2$, $Fe_2O_3$, CoO, CuO, $Mn_2O_3$, ZnO, $ZrO_2$, $Ta_2O_5$, $Si_3N_4$, $SiO_xN_y$, TiN, and $TiO_xN_y$, and mixtures thereof.

Aspect 35. The method of aspect 34, wherein one or both of the at least two layers coated on the first substrate has a higher refractive index as compared to the first substrate.

Aspect 36. The method of aspect 27, wherein each layer in the at least two coating layers independently has a thickness of 5 to 100 nm.

Aspect 37. The method of aspect 27, wherein at least one of the first substrate and one of the coatings in the at least two coating layers is tinted.

Aspect 38. The method of aspect 27, further comprising: providing an additional transparent panel arranged in a parallel configuration to the VLTP and separated by a gap.

Aspect 39. The method of aspect 38, wherein the additional transparent panel comprises a glass substrate coated with a low-e coating.

Aspect 40. The method of aspect 38, wherein the gap between the additional transparent panel and the VLTP is spaced apart by a spacer.

Aspect 41. The method of aspect 38, wherein the gap is evacuated or filled with a gas selected from air, argon, or krypton.

Aspect 42. The method of aspect 41, wherein the additional transparent panel and the VLTP comprise an insulated glass unit (IGU), and wherein the VLTP is configured to face outside of a building.

Aspect 43. The method of aspect 40, wherein the spacer comprises a material selected from metal or plastic.

Aspect 44. The method of any one or combination of aspects 38-43, wherein the gap is in the range of 2 mm to 20 mm.

Aspect 45. The method of aspect 39, wherein the low-e coating is disposed on the side of the additional transparent panel facing the VLTP.

Aspect 46. The method of aspect 42, wherein the IGU shows a color difference $\Delta E_T^*$ of greater than 30 in transmitted color when compared in the bleached and the colored optical states of the VLTP, and, in these optical states, shows a color difference $\Delta E_R^*$ of less than 8 when reflection is viewed from the first side of the first substrate.

EXAMPLES

All of the optical modelling reported in the following examples was carried out by using "Essential Macleod" software obtained from the Thin Film Center in Tucson, AZ Unless reported otherwise all of the refractive index data were obtained from the libraries in this software. In this example, the impact on optical reflectivity was modelled by introducing an interference stack comprising of a two-layer stack of $TiO_2$ and $SiO_2$; $Si_3N_4$ and $SiO_2$; and a four-layer stack of $TiO_2/SiO_2/TiO_2/SiO_2$. All of these coatings are optically clear, and all of the substrates used were also clear, i.e., were not tinted. The interference stack was introduced between the glass substrate (soda-lime glass) and the transparent conductor ITO in a thickness of 120 nm. Unless mentioned otherwise, the RI properties of the polymer used (Table 1) in all of the modelled examples is the same. We found that in the modelling the impact of change in the polymer refractive index in steps down to average value of 1.4 (from the one used with an average value of 1.55), had a minor impact on the results with no changes in trends which are discussed below.

TABLE 1

| | | Refractive index of Polymer | | | | | |
|---|---|---|---|---|---|---|---|
| Wavelength, nm | 400 | 450 | 500 | 550 | 600 | 650 | 700 |
| RI | 1.5708 | 1.5601 | 1.5545 | 1.5499 | 1.5485 | 1.5466 | 1.5452 |

In all of the examples with modelling results (Examples 1 through 4), only half cells were modelled to observe the changes possible to the reflectivity coming from the front substrates and an EC medium in contact with it. In Examples 2 to 3, a thin EC film of tungsten oxide was used that contacted the TC on the front substrate i.e., substrate 21a, interference stack 26a, TC 23a and the EC medium 25a in contact with a polymeric medium 27a which is a thick electrolyte (see FIG. 5). 28a is a perimeter sealant. In Example 4, the configuration of the EC half-cell resembles to the one shown in FIG. 6 which is substrate 21b, interference stack 26b, TC 23b and the thick EC medium 27b, which is also an electrolyte.

Example 1: Reflectivity Change by Incorporation of an Interference Stack

The sequence of the modelled stacks is shown in Table 2. The reflectivity was modelled from the glass side. As seen, there is a considerable increase in reflectivity at all wavelengths when the interference stack was introduced

TABLE 2

Change in reflectivity by introducing interference stack ($TiO_2$(45 nm)/$SiO_2$(35 nm)/)

| Wavelength (nm) | Glass/ITO(120 nm)/ polymer | | Glass/$TiO_2$(45 nm)/ $SiO_2$(35 nm)/ ITO(120 nm)/polymer | |
|---|---|---|---|---|
| | % T | % R | % T | % R |
| 400 | 87.8 | 8.2 | 72.8 | 23.5 |
| 450 | 91.6 | 4.8 | 77.7 | 19.1 |
| 500 | 92.2 | 4.7 | 75.4 | 22.0 |
| 550 | 91.8 | 5.5 | 77.3 | 20.4 |
| 600 | 91.4 | 6.1 | 81.7 | 16.1 |
| 650 | 91.4 | 6.3 | 85.8 | 12.0 |
| 700 | 90.0 | 5.8 | 86.5 | 9.3 |

Example 2: Impact of Interference Stack on the Transmission Color and Reflected Color of a Substrate with Electrochromic Tungsten Oxide In this example the substrates from Example 1 were further modelled by incorporating a 400 nm thick tungsten oxide. The change in color in transmission was modelled using the colored and the bleached state of tungsten oxide. The RI values in the two states for tungsten oxide were obtained from Von Rottkay, K., et al (1997). The results in Table 3 show that in both cases (with and without the interference layers) the transmission color change due to the changes in the optical properties of tungsten oxide is large and similar at 40.9 and 41, whereas there is a large reduction in reflected color from 19.3 to 9.2 when the interference layer was incorporated. All of these calculations were done at normal angle.

TABLE 1

Impact of reflectivity at normal angle w and w/o stack

| Sample | Transmission Bleached | | | Transmission Colored | | | | Reflectance Bleached | | | Reflectance Colored | | | |
|---|---|---|---|---|---|---|---|---|---|---|---|---|---|---|
| | L* (T) | a* (T) | b* (T) | L* (T) | a* (T) | b* (T) | $\Delta E_T^*$ | L* (R) | a* (R) | b* (R) | L* (R) | a* (R) | b* (R) | $\Delta E_R^*$ |
| Glass/ITO(120 nm)/ WO3(400 nm)/ polymer | 96.0 | −1.4 | 1.7 | 57.0 | 0.7 | −10.3 | 40.9 | 32.0 | 5.3 | −4.2 | 17.7 | −3.2 | 5.6 | 19.3 |
| Glass/TiO2(45 nm)/ SiO2(35 nm)/ ITO(120 nm)/WO3 (400 nm)/polymer | 92.7 | 0.8 | 9.2 | 54.4 | 1.8 | −5.5 | 41.0 | 45.7 | −3.5 | −20.9 | 41.1 | −11.2 | −18.9 | 9.2 |

Table 4 lists the transmission and reflectivity changes as a function of the wavelength. This table shows that the change in reflection averaged at all wavelengths is higher both in the colored and in the bleached state when the interference stack is introduced, respectively, and the change in relative reflectivity at 550 nm is 56.5% ((6.9−3)/6.9) when the stack is not present and 35% ((19.8−12.8)/19.8) when the reflective stack is present.

TABLE 4

Percentage Transmission and reflection of WO3 coating with and without interference stack

| Wavelength (nm) | Glass/ITO(120 nm)/WO3 (400 nm)/polymer | | | | Glass/TiO$_2$(45 nm)/SiO$_2$(35 nm)/ITO(120 nm)/ WO3(400 nm)/polymer | | | |
|---|---|---|---|---|---|---|---|---|
| | Bleached | | Colored | | Bleached | | Colored | |
| | % T | % R | % T | % R | % T | % R | % T | % R |
| 400 | 78.8 | 11.7 | 29.1 | 1.9 | 52.9 | 40.4 | 22.8 | 22.8 |
| 450 | 87.8 | 8.1 | 32.5 | 2.2 | 63.8 | 33.1 | 26.5 | 20.1 |
| 500 | 90.2 | 6.5 | 28.2 | 1.4 | 85.2 | 11.6 | 23.3 | 18.5 |
| 550 | 90.2 | 6.9 | 24.6 | 3.0 | 77.7 | 19.8 | 22.1 | 12.8 |
| 600 | 88.7 | 8.4 | 23.1 | 2.4 | 90.4 | 6.7 | 22.2 | 6.3 |
| 650 | 92.2 | 5.2 | 22.7 | 1.3 | 83.4 | 14.3 | 21.7 | 5.8 |
| 700 | 91.1 | 4.8 | 22.3 | 0.8 | 80.2 | 16.1 | 21.1 | 6.2 |

Table 5 shows the calculations for the same stack at normal angle and at 30 degrees (off-normal angle). These results show that the difference in the bleached and the colored states at both angles is small, i.e., 9.2 vs 10.3, the relative difference between the two is 12% ((10.3−9.2)/9.2).

TABLE 5

Normal and off-angle comparison of color for
Glass/TiO$_2$(45 nm)/SiO$_2$(35 nm)/ITO(120 nm)/WO$_3$(400 nm)/polymer

| Normal Angle | | | | | | | Off angle (30°) | | | | | | |
|---|---|---|---|---|---|---|---|---|---|---|---|---|---|
| Reflectance Bleached | | | Reflectance Colored | | | | Reflectance Bleached | | | Reflectance Colored | | | |
| L* (T) | a* (T) | b* (T) | L* (T) | a* (T) | b* (T) | ΔE$_R$* | L* (R) | a* (R) | b* (R) | L* (R) | a* (R) | b* (R) | ΔE$_R$* |
| 45.7 | −3.5 | −20.9 | 41.1 | −11.2 | −18.9 | 9.2 | 30.1 | 9.9 | −17.6 | 28.1 | 1.5 | −23.2 | 10.3 |

Example 3: Impact of Interference Stack where TiO$_2$ is Replaced by Si$_3$N$_4$ on the Transmission and Reflection Properties of a Substrate with Electrochromic Tungsten Oxide In this example, Si$_3$N$_4$ was substituted for TiO$_2$ in the interference stack. Table 6 shows that the reflectivity level achieved is higher when TiO$_2$ is used, although the use of Si$_3$N$_4$ also enhances the reflectivity as compared to the situation when no stack is used (see Table 4 for data with no stack).

TABLE 6

Comparison of Si3N4 Vs TiO2 in the interference stack

| | Glass/TiO2(45 nm)/SiO2(35 nm)/ITO (120 nm)/WO3(400 nm)/polymer | | | | Glass/Si3N4(45 nm)/SiO2(45 nm)/ITO (120 nm)/WO3(400 nm)/polymer | | | |
|---|---|---|---|---|---|---|---|---|
| Wavelength | Bleached | | Colored | | Bleached | | Colored | |
| (nm) | % T | % R | % T | % R | % T | % R | % T | % R |
| 400 | 52.9 | 40.4 | 22.8 | 22.8 | 62.4 | 30.0 | 25.9 | 12.6 |
| 450 | 63.8 | 33.1 | 26.5 | 20.1 | 72.9 | 23.7 | 29.3 | 11.8 |
| 500 | 85.2 | 11.6 | 23.3 | 18.5 | 89.8 | 6.9 | 25.5 | 10.8 |
| 550 | 77.7 | 19.8 | 22.1 | 12.8 | 82.7 | 14.6 | 23.2 | 8.3 |
| 600 | 90.4 | 6.7 | 22.2 | 6.3 | 91.9 | 5.1 | 22.9 | 3.1 |
| 650 | 83.4 | 14.3 | 21.7 | 5.8 | 88.9 | 8.6 | 22.5 | 2.2 |
| 700 | 80.2 | 16.1 | 21.1 | 6.2 | 84.9 | 11.2 | 21.9 | 2.4 |

Table 7 compares the change in color for these two cases. It is seen that although there is not much difference in color comparing the bleached state and the colored state in transmission (ΔE$_T$* values are 41.0 and 41.4) but the use of titanium oxide is able to suppress the color change in reflection more effectively as seen by the ΔE$_R$* values. These color values without stack are in Table 3.

TABLE 7

Comparison of color change when Si3N4 and TiO2 are used in the stack

| | Normal Angle | | | | | | | | | | | | | |
|---|---|---|---|---|---|---|---|---|---|---|---|---|---|---|
| | Transmission Bleached | | | Transmission Colored | | | | Reflectance Bleached | | | Reflectance Colored | | | |
| Sample | L* (T) | a* (T) | b* (T) | L* (T) | a* (T) | b* (T) | ΔE$_T$* | L* (R) | a* (R) | b* (R) | L* (R) | a* (R) | b* (R) | ΔE$_R$* |
| Glass/TiO2(45 nm)/ SiO2(35 nm)/ ITO(120 nm)/WO3 (400 nm)/polymer | 92.7 | 0.8 | 9.2 | 54.4 | 1.8 | −5.5 | 41.0 | 45.7 | −3.5 | −20.9 | 41.1 | −11.2 | −18.9 | 9.2 |

TABLE 7-continued

Comparison of color change when Si3N4 and TiO2 are used in the stack

| | Normal Angle | | | | | | | | | | | | | |
|---|---|---|---|---|---|---|---|---|---|---|---|---|---|---|
| | Transmission Bleached | | | Transmission Colored | | | | Reflectance Bleached | | | Reflectance Colored | | | |
| Sample | L* (T) | a* (T) | b* (T) | L* (T) | a* (T) | b* (T) | ΔE$_T$* | L* (R) | a* (R) | b* (R) | L* (R) | a* (R) | b* (R) | ΔE$_R$* |
| Glass/Si3N4(45 nm)/ SiO2(45 nm)/ ITO(120 nm)/WO3 (400 nm)/polymer | 94.5 | 0.3 | 6.3 | 55.7 | 1.7 | −7.7 | 41.4 | 39.0 | −2.5 | −18.6 | 32.2 | −14.2 | −14.6 | 14.1 |

Example 4: Impact of Interference Stack where Multiple Layers of TiO$_2$/SiO$_2$ are Used and their Impact on the Transmission and Reflection Properties of a Substrate with Electrochromic Tungsten Oxide The interference stack in this case between the glass and the transparent conductor comprised of TiO$_2$ (45 nm)/ SiO$_2$ (35 nm) in one case and in the other case the stack was TiO$_2$ (40 nm)/SiO$_2$ (10 nm)/TiO$_2$ (10 nm)/SiO$_2$ (40 nm). As seen from the results in Table 8, the relative change in transmission color (i.e., the % change between the two ΔE$_T$* values) from bleached to the colored state was rather modest, but was significant in terms of reducing the reflection color change, where the latter stack was superior.

TABLE 8

Comparison of optical properties of different interference stacks with SiO2 and TiO2

| | Normal Angle | | | | | | | | | | | | | |
|---|---|---|---|---|---|---|---|---|---|---|---|---|---|---|
| | Transmission Bleached | | | Transmission Colored | | | | Reflectance Bleached | | | Reflectance Colored | | | |
| Sample | L* (T) | a* (T) | b* (T) | L* (T) | a* (T) | b* (T) | ΔE$_T$* | L* (R) | a* (R) | b* (R) | L* (R) | a* (R) | b* (R) | ΔE$_R$* |
| Glass/TiO2(45 nm)/ SiO2(35 nm)/ ITO(120 nm)/WO3 (400 nm)/polymer | 92.7 | 0.8 | 9.2 | 54.4 | 1.8 | −5.5 | 41.0 | 45.7 | −3.5 | −20.9 | 41.1 | −11.2 | −18.9 | 9.2 |
| Glass/TiO2(40 nm)/ SiO2(10 nm)/TiO2 (10 nm) SiO2(40 nm)/ITO (120 nm)/WO3 (400 nm)/polymer | 92.0 | 5.3 | 8.9 | 53.2 | 0.9 | −6.8 | 42.1 | 47.9 | −17.0 | −19.1 | 44.7 | −19.9 | −13.9 | 6.7 |

Table 9 shows the impact of transmission and reflection at various wavelengths for the two stacks. This shows that the average reflectivity is in a similar range, but the reflected color is different.

TABLE 9

Comparison of the two stacks with different configuration with SiO2/TiO2 on EC properties

| | Glass/TiO2(45 nm)/SiO2(35 nm)/ ITO(120 nm)/WO3(400 nm)/polymer | | | | Glass/TiO2(40 nm)/SiO2(10 nm)/TiO2(10 nm) SiO2(40 nm)/ITO(120 nm)/WO3(400 nm)/polymer | | | |
|---|---|---|---|---|---|---|---|---|
| | Bleached | | Colored | | Bleached | | Colored | |
| Wavelength (nm) | % T | % R | % T | % R | % T | % R | % T | % R |
| 400 | 52.9 | 40.4 | 22.8 | 22.8 | 55.3 | 37.7 | 23.3 | 20.9 |
| 450 | 63.8 | 33.1 | 26.5 | 20.1 | 64.3 | 32.7 | 25.9 | 22.0 |
| 500 | 85.2 | 11.6 | 23.3 | 18.5 | 83.0 | 13.9 | 22.8 | 20.1 |
| 550 | 77.7 | 19.8 | 22.1 | 12.8 | 73.4 | 24.2 | 20.7 | 18.2 |
| 600 | 90.4 | 6.7 | 22.2 | 6.3 | 87.4 | 9.8 | 21.3 | 10.0 |
| 650 | 83.4 | 14.3 | 21.7 | 5.8 | 85.5 | 12.0 | 21.3 | 7.2 |
| 700 | 80.2 | 16.1 | 21.1 | 6.2 | 78.7 | 17.7 | 20.9 | 7.0 |

Table 10 compares the properties of using the stack $TiO_2$ (40 nm)/$SiO_2$ (10 nm)/$TiO_2$ (10 nm)/$SiO_2$ (40 nm) at normal angle and at 30 degrees. The results show that the difference in $\Delta E_R^*$ between the two cases is larger as compared to when the stack was a two-layer stack $TiO_2$ (45 nm)/$SiO_2$ (35 nm) (see Table 5). The relative difference at the two angles is 31% ((8.8−6.7)/6.7). This compares to 12% in Table 5. This result shows that although use of increasing the number of layers (e.g., two vs four layers) and optimizing them can reduce the reflectivity changes from bleached to colored at small angles, but such windows will show a larger color difference at off/angle.

TABLE 10

Normal and off-angle comparison when using stack TiO2(40 nm)/SiO2(10 nm)/TiO2(10 nm)/SiO2(40 nm)

| Normal Angle | | | | | | | Off angle (30°) | | | | | | |
|---|---|---|---|---|---|---|---|---|---|---|---|---|---|
| Reflectance Bleached | | | Reflectance Colored | | | | Reflectance Bleached | | | Reflectance Colored | | | |
| L* (T) | a* (T) | b* (T) | L* (T) | a* (T) | b* (T) | $\Delta E_R^*$ | L* (R) | a* (R) | b* (R) | L* (R) | a* (R) | b* (R) | $\Delta E_R^*$ |
| 47.9 | −17.0 | −19.1 | 44.7 | −19.9 | −13.9 | 6.7 | 33.4 | 1.8 | −19.5 | 33.2 | −6.6 | −16.9 | 8.8 |

Example 5: Impact of Interference Stack on the Transmission Color and Reflected Color of a Substrate in Contact with a Thick Electrochromic Medium As compared to the above two examples, the configuration of the EC half-cell with the interference stack resembles the one shown in FIG. 6 which is substrate 21b, interference stack 26b, TC 23b and the thick EC medium 27b which is also an electrolyte. When no interference stack is present, the half-cell is like a prior-art cell shown in FIG. 2b with a substrate 11a, TC 13a and in contact with a thick electrolytic medium 17a (thickness greater than 10 μm). The results show that although in both cells the color change in transmission is small, a very large reduction is seen in the color change in reflection $\Delta E_R^*$ (from 18.9 to 5.1) as the cell optical state is changed from bleached to colored. The dye absorption constant was selected to give the same amount of coloration as tungsten oxide in Example 2.

TABLE 11

Impact on transmission and reflection changes by using a stack for an EC system with a thick EC medium

| | Normal Angle | | | | | | | | | | | | | |
|---|---|---|---|---|---|---|---|---|---|---|---|---|---|---|
| | Transmission Bleached | | | Transmission Colored | | | | Reflectance Bleached | | | Reflectance Colored | | | |
| Sample | L* (T) | a* (T) | b* (T) | L* (T) | a* (T) | b* (T) | $\Delta E_T$ | L* (R) | a* (R) | b* (R) | L* (R) | a* (R) | b* (R) | $\Delta E_R^*$ |
| Glass/ITO(120 nm)/Dye(300 um) | 99.7 | −6.4 | 10.8 | 34.3 | 1.4 | −13.9 | 67.5 | 28.1 | 0.6 | 7.9 | 10.8 | 8.0 | 9.6 | 18.9 |
| Glass/TiO2(40 nm)/SiO2(10 nm)/ITO(120 nm)/Dye(300 um)/ | 90.5 | −1.7 | 11.9 | 31.6 | 3.1 | −12.7 | 64.1 | 51.9 | −11.1 | −0.9 | 47.1 | −12.6 | −2.0 | 5.1 |

Example 6: Fabrication and Testing of Half Cells

The following half-cell samples were made as shown in Table 12. The substrate in all cases was standard soda-lime glass. The first substrate refers to one of the substrates used to fabricate the EC cells which will be on the front of the window, i.e., placed in the window such that it is on the outside with the side with the reflective layer facing inwards. All of the substrates with or without reflective coatings were obtained from Nippon Sheet Glass (NSG) (Toledo, OH). Stack 1 and Stack 2 refer to two types of reflective stacks provided by NSG. In Stack 2, one of the coatings in the reflective stack also provided a gold/brown tint, coatings in stack 1 were clear coatings containing $TiO_2/SiO_2$. Please note that in the sample names "NRC" stands for no reflective (interference) coating, "RC1" stands for reflective coating Type 1, and "RC2" for reflective coating Type 2.

TABLE 12

Details for the first substrate used to fabricate EC devices

| Sample | Substrate tint | Reflective stack | Substrate thickness, mm | TC* | TC resistivity Ω/□ | Tungsten Oxide thickness, nm |
|---|---|---|---|---|---|---|
| Clear-NRC[#] | Clear | No | 2.3 | TEC™15 | 15 | 400 |
| Blue-RC1 | Tinted | Stack1 | 6 | ITO | 10 | 360 |
| Gray-RC1 | Tinted | Stack1 | 6 | ITO | 10 | 360 |
| Brown-Gold-RC2 | Bronze Tinted | Stack2 | 6 | ITO | 12 | 360 |
| Gold-RC2 | Clear | Stack2 | 6 | ITO | 12 | 360 |

*TC = Transparent conductor, [#]Clear non reflective glass is thinner glass as compared to others
ITO = Indium/tin Oxide,
TEC™15 was obtained from NSG, Toledo, OH These substrates were evaluated for reflectivity, transmission, transmitted color and the reflected color with the glass side (uncoated side) facing the light source using Ultrascan® XE instrument (made by Hunter Lab, Reston, VA). For all measurements a D65 illuminant and 2-degree observer was used. For reflectivity measurements, a black felt background was used to measure reflectivity. The felt was soaked in propylene carbonate (RI=1.42). These measurements were made when the tungsten oxide was in the bleached state and then when tungsten oxide was colored in a liquid electrolyte cells containing propylene carbonate and 0.025M lithium salt (lithium bis-(trifluoromethanesulfonyl)imide). For coloration, platinum counter electrode and a silver wire dipped in a solution of $AgNO_3$ in acetonitrile was used for a reference electrode using coloring potential of −0.9V and bleaching a potential of 0.2V was used against the reference applied for 2 minutes for the partially colored state. The same setup was used applying −1.3 V for 3 minutes for the fully colored state. The measurements of percentage transmission (% T) measured at normal incidence are shown in Table 13. In addition, color was measured both in transmission and reflection for these half cells. The latter was measured from the non-coated side. Table 14 shows the difference in color in going from bleached to partially colored and also in going from bleach to the fully colored state.

TABLE 13

% Transmission values in bleached, partially colored and fully colored state

| Sample | State of Sample | % T Wavelength, nm | | | | | | |
|---|---|---|---|---|---|---|---|---|
| | | 400 | 450 | 500 | 550 | 600 | 650 | 700 |
| Clear-NRC | Fully colored | 22.71 | 17.14 | 7.9 | 2.93 | 1.02 | 0.38 | 0.15 |
| | Partially colored | 35.96 | 35.77 | 24.87 | 13.75 | 6.71 | 3.14 | 1.57 |
| | Bleached | 50.64 | 67.19 | 69.96 | 69.45 | 67.49 | 70 | 65.65 |
| Gray-RC1 | Fully colored | 7.95 | 7.52 | 5.03 | 4.32 | 2.87 | 2.4 | 2.91 |
| | Partially colored | 16.93 | 17.21 | 11.76 | 10.36 | 6.27 | 4.98 | 5.79 |
| | Bleached | 27.48 | 31.54 | 25.5 | 35.05 | 28.86 | 23.9 | 34.97 |

TABLE 13-continued

% Transmission values in bleached, partially colored and fully colored state

| Sample | State of Sample | % T Wavelength, nm | | | | | | |
|---|---|---|---|---|---|---|---|---|
| | | 400 | 450 | 500 | 550 | 600 | 650 | 700 |
| Blue-RC1 | Fully colored | 10.86 | 12.04 | 8.14 | 5.36 | 2.92 | 2.03 | 1.98 |
| | Partially colored | 24.75 | 31.99 | 23.4 | 18.94 | 9.8 | 6.91 | 6.74 |
| | Bleached | 33.57 | 45.48 | 40.91 | 42.64 | 31.14 | 21.44 | 24.74 |
| Brown Gold-RC2 | Fully colored | 1.98 | 3.14 | 3.18 | 3.93 | 4.17 | 3.7 | 3.86 |
| | Partially colored | 4.58 | 6.83 | 6.15 | 7.34 | 6.29 | 5.01 | 5.01 |
| | Bleached | 7.71 | 12.74 | 13.9 | 28.66 | 31.05 | 23.96 | 36.76 |
| Gold-RC2 | Fully colored | 3.15 | 5.89 | 5.8 | 5.36 | 4.68 | 3.78 | 3.26 |
| | Partially colored | 6.22 | 13.44 | 13.88 | 15.89 | 12.82 | 10.17 | 9.06 |
| | Bleached | 9.81 | 20.25 | 29.87 | 42.97 | 56.41 | 36.72 | 44.85 |

TABLE 14

Comparison between $\Delta E_T^*$ and $\Delta E_R^*$ between bleached, partially colored and fully colored half cells

| | $\Delta E^*$ | | | |
|---|---|---|---|---|
| | Reflection, $\Delta E_R^*$ | | Transmission, $\Delta E_T^*$ | |
| Half Cell Sample | Bleached vs Partially Colored | Bleached vs Fully Colored | Bleached vs Partially Colored | Bleached vs Fully Colored |
| Clear-NRC | 8.93 | 8.96 | 57.31 | 80.63 |
| Gray-RC1 | 2.28 | 4.67 | 31.88 | 41.58 |
| Blue-RC1 | 1.64 | 3.19 | 24.44 | 43.75 |
| Brown Gold-RC2 | 1.75 | 5.74 | 38.24 | 41.86 |
| Gold-RC2 | 3.91 | 8.97 | 39.84 | 56.27 |

As expected and desired, large color differences are seen in color values when measured in transmission. Gray-RC1, Blue-RC1 and Brown-Gold-RC2 samples showed a surprisingly small change in color in reflection. The blue colored glass also has a color spectrum that is close to the color spectrum of colored tungsten oxide in the visible region. The Gold-RC2 sample showed significant color in deeply colored state, which shows that the shift in the reflective spectra can be sensitive to the degree of coloration, particularly when it contrasts with the color of the colored EC coating.

Example 7

The tungsten oxide substrates used in Example 6 were used to assemble EC cells using a TEC™15 substrates of thickness 2.2 mm as counter electrode as shown in FIG. 2a with the exception that these cells did not have an EC2 layer, i.e. the counter electrode did not have the EC2 coating. Electrolyte was a 300 µm thick layer containing a redox dye species in propylene carbonate, that is the electrolyte has electrochromic properties. The electrolyte also comprised of lithium bis(trifluoromethanesulfonyl)imide, polymethyl methacrylate to increase viscosity and UV stabilizers. Different dye mixtures were used—Dye-B the composition which resulted in a blue appearance in transmission when the cell colored and Dye-N the composition which resulted in more neutral appearance. Table 15 below provides the details on the sample construction; all samples have tungsten oxide coatings as shown in Table 12. In Table 15, "S1" refers to this set of samples in this batch to distinguish these from a different batch of samples.

TABLE 15

EC cell (or panels) details made using front substrates in Table 12

| Sample ID | First Substrate* color | First substrate Reflective stack | Counter electrode, or type of second substrate | Dye type in electrolyte |
|---|---|---|---|---|
| S1-Clear-NRC-N | Clear | No | TEC ™15 | Dye-N |
| S1-Clear-NRC-B | Clear | No | TEC ™15 | Dye-B |
| S1-Blue-RC1-N | Blue Tinted | Stack1 | TEC ™15 | Dye-N |
| S1-Blue-RC1-B | Blue Tinted | Stack1 | TEC ™15 | Dye-B |
| S1-Bluegreen-RC1-N | Bluegreen Tinted | Stack1 | TEC ™15 | Dye-N |
| S1-Bluegreen-RC1-B | Bluegreen Tinted | Stack1 | TEC ™15 | Dye-B |
| S1-Gray-RC1-N | Gray Tinted | Stack1 | TEC ™15 | Dye-N |
| S1-Gray-RC1-B | Gray Tinted | Stack1 | TEC ™15 | Dye-B |
| S1-Brown-Gold-RC2-N | Bronze Tinted | Stack2 | TEC ™15 | Dye-N |
| S1-Brown-Gold-RC2-B | Bronze Tinted | Stack2 | TEC ™15 | Dye-B |
| S1-Gold-RC2-N | Clear | Stack2 | TEC ™15 | Dye-N |
| S1-Gold-RC2-B | Clear | Stack2 | TEC ™15 | Dye-B |

*Substrate details are listed in Table 1.

The cells were measured in the bleached state and then colored using 1.3 V applied for 3 minutes and measured in transmission to calculate color difference between the bleached and the colored states as shown Table 16. The color differences are large in a range of about 40 to 80 units. In addition, $\Delta E_{T-H}^*$ numbers show the shift in the transmitted light hue as the EC panel transitions from the fully bleached to the colored state. In many instances this change may not be important depending on the degree of illumination provided by this window, and in some cases it is desirable that this be small so that the incoming light does not acquire a different hue and change the visual perception of the objects. $\Delta E_{T-H}^*$ less than 15 are desirable and in another embodiment numbers less than 10 and yet in another embodiment numbers less than about 5. This number or the transmitted light color can be substantially altered even if the same tungsten oxide is used, by changing the color of the dye.

TABLE 16

Color in Transmission of cells for colored and bleached state and color difference

| Sample | Bleached | | | Colored | | | $\Delta E_T^*$ | $\Delta E_{T-H}^*$ |
| --- | --- | --- | --- | --- | --- | --- | --- | --- |
| | L* | a* | b* | L* | a* | b* | | |
| S1-Clear-NRC-N | 82.5 | −3.2 | 5.0 | 23.8 | −0.3 | 8.5 | 58.9 | 4.6 |
| S1-Clear-NRC-B | 83.5 | −3.8 | 11.0 | 30.7 | 7.2 | −46.4 | 78.8 | 58.4 |
| S1-Blue-RC1-N | 60.3 | −0.6 | 3.5 | 16.5 | 3.3 | 6.7 | 44.1 | 5.1 |
| S1-Blue-RC1-B | 59.6 | −2.2 | 6.8 | 19.4 | 8.6 | −35.8 | 59.6 | 44.0 |
| S1-Bluegreen-RC1-N | 65.1 | −9.4 | −4.7 | 15.8 | 1.4 | 4.1 | 51.2 | 14.0 |
| S1-Bluegreen-RC1-B | 65.5 | −10.1 | −1.8 | 25.7 | 5.8 | −41.2 | 58.2 | 42.5 |
| S1-Gray-RC1-N | 56.9 | 1.0 | 27.9 | 15.4 | 5.0 | 17.6 | 43.0 | 11.0 |
| S1-Gray-RC1-B | 56.4 | 6.5 | 29.4 | 28.8 | −3.4 | −3.7 | 44.2 | 34.6 |
| S1-Brown-Gold-RC2-N | 70.7 | 2.8 | 32.4 | 21.1 | 4.4 | 20.3 | 51.1 | 12.2 |
| S1-Brown-Gold-RC2-B | 69.6 | 1.9 | 35.4 | 19.9 | −2.4 | −23.6 | 77.3 | 59.1 |

The same cells were measured in reflection (Table 17), and the color changes in reflection ($\Delta E_R^*$) are substantially smaller for the cells which had the reflective coatings, all below 6 and some below 3. This shows that even though there are vast differences in the color change in transmission as seen in Table 16 ($\Delta E_T^*$), the change in reflected color is small for cells with the interference stack (less than 6 when colored). Substrates with no reflective layer (Samples S1-Clear-NRC-N and S1-Clear-NRC-B) show a high value of $\Delta E_R^*$. For the clear glass with "N" coloring dye, even though $\Delta E_{R-H}^*$ is small (1.5), but $\Delta E_R^*$ is high (11.1). Since the latter number is high, this would still be seen by a casual observer outside during the daytime as a very different appearance. For most desirable characteristics both $\Delta E_{R-H}^*$ and $\Delta E_R^*$ should be small. Limitations in reflectivity on $\Delta E_R^*$ have been discussed earlier, and for $\Delta E_{R-H}^*$ these should be less than 5 in one embodiment and less than 3 in another embodiment.

reflection change $\Delta E_R^*$ is large for clear cell ranging from 11 to 14 for the two dyes, whereas for all the cells with reflective layer this number is smaller than 6 and for some smaller than 3.

In addition, this table also compares the colored state of cells with neutral coloring and the blue coloring dyes. The tungsten oxide used for the blue coloring cell is the same as the neutral coloring cell for each type of substrate. It is interesting to note that in the colored state there are large differences in transmitted color but the reflected color differences are much smaller (all less than 6). This also shows that the reflectivity is dominated in these cells by the front substrate. The presence of reflective coatings substantially lowers the color difference in reflection. As an example, comparing cells S1-Blue-RC1-N and S1-Blue-RC1-B,s both with a blue tinted substrate and the interference coating but with different dye result in small differences in reflected

TABLE 17

Color in Reflection of EC cells for colored and bleached states and color difference

| Sample | Bleached | | | Colored | | | $\Delta E_R^*$ | $\Delta E_{R-H}^*$ |
| --- | --- | --- | --- | --- | --- | --- | --- | --- |
| | L* | a* | b* | L* | a* | b* | | |
| S1-Clear-NRC-N | 39.5 | −1.0 | 0.1 | 28.5 | 0.5 | 0.5 | 11.1 | 1.5 |
| S1-Clear-NRC-B | 39.6 | −1.0 | 3.4 | 28.5 | 1.2 | −4.9 | 14.1 | 8.6 |
| S1-Blue-RC1-N | 31.1 | −2.4 | −1.2 | 28.5 | −2.5 | −0.2 | 2.9 | 1.1 |
| S1-Blue-RC1-B | 31.2 | −2.1 | −1.2 | 28.6 | −1.5 | −2.0 | 2.9 | 1.1 |
| S1-Bluegreen-RC1-N | 32.4 | −6.8 | −0.7 | 35.7 | −7.3 | −5.0 | 5.4 | 4.3 |
| S1-Bluegreen-RC1-B | 31.5 | −5.4 | −4.2 | 35.1 | −7.6 | −4.9 | 4.4 | 2.4 |
| S1-Gray-RC1-N | 39.7 | 3.4 | 14.6 | 38.5 | −0.8 | 12.6 | 4.8 | 4.7 |
| S1-Gray-RC1-B | 40.5 | 3.1 | 11.7 | 39.4 | 1.4 | 10.6 | 2.3 | 2.0 |
| S1-Brown-Gold-RC2-N | 51.6 | −4.7 | 23.8 | 53.2 | −2.4 | 25.2 | 3.1 | 2.7 |
| S1-Brown-Gold-RC2-B | 51.8 | −2.6 | 23.5 | 53.7 | −4.8 | 24.9 | 3.3 | 2.7 |

Table 18 condenses the data on color change from Tables 16 and 17, for reflection and transmission. First, this data shows that for a given cell, whether it is blue coloring (B) or neutral coloring (N) there is a large color difference $\Delta E_T^*$ between bleached and colored states (range 43-79). However, the color but with a high difference in transmitted color. This shows that even though to an outside observer the colors of these two panels in the colored state will appear to be similar, but a person inside the building would see a significant difference in the light spectrum being transmitted.

TABLE 18

Comparison between $\Delta E_T^*$ and $\Delta E_R^*$ of colored and bleached states of cells using both dye compositions

| Sample | $\Delta E_R^*$ (Reflection) | | | $\Delta E_T^*$ (Transmission) | | |
|---|---|---|---|---|---|---|
| | Bleached vs Colored | Dye-N vs Dye-B Bleached | Dye-N vs Dye-B Colored | Bleached vs Colored | Dye-N vs Dye-B Bleached | Dye-N vs Dye-B Colored |
| S1-Clear-NRC-N | 11.1 | 3.4 | 5.5 | 58.9 | 6.1 | 55.8 |
| S1-Clear-NRC-B | 14.1 | | | 78.8 | | |
| S1-Blue-RC1-N | 2.9 | 0.3 | 2.1 | 44.1 | 3.8 | 42.9 |
| S1-Blue-RC1-B | 2.9 | | | 59.6 | | |
| S1-Bluegreen-RC1-N | 5.4 | 3.9 | 0.7 | 51.2 | 3 | 46.6 |
| S1-Bluegreen-RC1-B | 4.4 | | | 58.2 | | |
| S1-Gray-RC1-N | 4.8 | 3.1 | 3.1 | 43 | 5.8 | 26.6 |
| S1-Gray-RC1-B | 2.3 | | | 44.2 | | |
| S1-Brown-Gold-RC2-N | 3.1 | 2.2 | 2.5 | 51.1 | 3.4 | 44.3 |
| S1-Brown-Gold-RC2-B | 3.3 | | | 77.3 | | |

The transmission and reflection data as a function of wavelength are shown in Tables 19 and 20, to show both the extent of coloration and reflection. This table also shows % T ratios of the cells in bleached to color state at 550 nm, which is a measure of the extent of coloration. There are several values above 5 which provided low change in reflected color as seen in Table 18. For the blue tinted substrates with both the dyes the contrast value (% T bleached/% T colored) at 550 nm exceeds 10.

TABLE 19

Transmission spectra for cells in the colored and bleached states

| Sample | State of Sample | % T Wavelength, nm | | | | | | | Bleach to Color ratio at 550 nm |
|---|---|---|---|---|---|---|---|---|---|
| | | 400 | 450 | 500 | 550 | 600 | 650 | 700 | |
| S1-Clear-NRC-N | Colored | 5.5 | 2.65 | 0.65 | 6.95 | 3.93 | 1.63 | 0.88 | 9.1 |
| | Bleached | 22.33 | 57.53 | 59.41 | 62.96 | 60.72 | 57.94 | 55.12 | |
| S1-Clear-NRC-B | Colored | 0.55 | 29.14 | 17.34 | 4.47 | 1.52 | 3.42 | 5.7 | 14.4 |
| | Bleached | 34.73 | 51.58 | 59.12 | 64.42 | 64.01 | 62.78 | 61.57 | |
| S1-Gray-RC1-N | Colored | 3.23 | 1.45 | 0.39 | 3.46 | 2.39 | 1.58 | 1.64 | 8.7 |
| | Bleached | 12.97 | 25.14 | 27.2 | 30.03 | 28.66 | 24.85 | 30.76 | |
| S1-Gray-RC1-B | Colored | 0.3 | 13 | 6.8 | 2.16 | 0.7 | 1.97 | 5.73 | 14.2 |
| | Bleached | 19.41 | 22.93 | 24 | 30.58 | 27.3 | 23.93 | 31.99 | |
| S1-Blue-RC1-N | Colored | 2.88 | 1.62 | 0.4 | 3.47 | 2.02 | 1.12 | 1.02 | 10.4 |
| | Bleached | 13.85 | 36.01 | 41.51 | 36.26 | 29.4 | 21.42 | 21.39 | |
| S1-Blue-RC1-B | Colored | 0.6 | 20.16 | 12.06 | 3.47 | 1.05 | 2.05 | 4.3 | 10.9 |
| | Bleached | 24.27 | 33.95 | 39.8 | 37.65 | 29.8 | 21.78 | 22.93 | |
| S1-Bluegreen-RC1-N | Colored | 9.27 | 6.1 | 2.56 | 10.7 | 7.64 | 4.75 | 3.46 | 4.9 |
| | Bleached | 25.48 | 45.85 | 52.23 | 52.23 | 48.97 | 37.34 | 32.61 | |
| S1-Bluegreen-RC1-B | Colored | 5.17 | 29.33 | 24.61 | 14.14 | 7.8 | 8.17 | 8.92 | 3.6 |
| | Bleached | 30.56 | 41.81 | 51.96 | 50.77 | 49.59 | 37.9 | 32.79 | |
| S1-Brown-Gold-RC2-N | Colored | 0.7 | 0.56 | 0.2 | 2.65 | 2.72 | 1.9 | 1.65 | 10.3 |
| | Bleached | 3.31 | 11.64 | 14.37 | 27.32 | 28.48 | 26.29 | 33.46 | |
| S1-Brown-Gold-RC2-B | Colored | 0.8 | 6.65 | 6.88 | 5.85 | 4.49 | 5.66 | 8.15 | 3.9 |
| | Bleached | 5.57 | 9.32 | 15.9 | 22.58 | 33.31 | 25.84 | 29.61 | |
| S1-Gold-RC2-N | Colored | 1.16 | 1.09 | 0.45 | 4.48 | 4.32 | 2.87 | 2.27 | 8.7 |
| | Bleached | 5.25 | 17.54 | 31.6 | 39.01 | 54.22 | 41.14 | 40.76 | |
| S1-Gold-RC2-B | Colored | 0.07 | 8.53 | 6.85 | 2.26 | 0.95 | 2.83 | 6.78 | 17.3 |
| | Bleached | 6.74 | 15.4 | 27.7 | 39.04 | 51.22 | 39.71 | 42.22 | |

TABLE 20

Reflection spectra for cells in the colored and bleached states

| Sample | State of Sample | % R Wavelength, nm | | | | | | |
|---|---|---|---|---|---|---|---|---|
| | | 400 | 450 | 500 | 550 | 600 | 650 | 700 |
| S1-Clear-NRC-N | Colored | 7.69 | 5.09 | 5.95 | 5.42 | 5.73 | 6.17 | 5.62 |
| | Bleached | 9.84 | 9.68 | 12.03 | 10.95 | 10.72 | 11.05 | 16.53 |

TABLE 20-continued

Reflection spectra for cells in the colored and bleached states

| Sample | State of Sample | % R Wavelength, nm | | | | | | |
|---|---|---|---|---|---|---|---|---|
| | | 400 | 450 | 500 | 550 | 600 | 650 | 700 |
| S1-Clear-NRC-B | Colored | 7.5 | 6.39 | 6.43 | 5.34 | 5.43 | 5.95 | 5.46 |
| | Bleached | 12.41 | 8.53 | 11.28 | 11.05 | 11.07 | 11.62 | 18.9 |
| S1-Gray-RC1-N | Colored | 5.65 | 5.39 | 5.93 | 5.94 | 5.14 | 5.14 | 5.53 |
| | Bleached | 7.3 | 7.61 | 6.41 | 7.62 | 5.55 | 6.88 | 10.44 |
| S1-Gray-RC1-B | Colored | 5.89 | 6 | 6.21 | 5.8 | 5.16 | 5.6 | 6.25 |
| | Bleached | 7.57 | 7.51 | 6.59 | 7.57 | 5.66 | 7.07 | 10.64 |
| S1-Blue-RC1-N | Colored | 9.61 | 12.29 | 8.78 | 10.85 | 6.11 | 6.72 | 7.69 |
| | Bleached | 6.77 | 6.96 | 8.24 | 8.01 | 5.93 | 5.33 | 4.99 |
| S1-Blue-RC1-B | Colored | 9.22 | 11.7 | 9.22 | 10.14 | 5.95 | 6.69 | 7.53 |
| | Bleached | 6.2 | 7.77 | 8.6 | 7.05 | 5.58 | 5.45 | 5.21 |
| S1-Bluegreen-RC1-N | Colored | 8.7 | 8.5 | 10.94 | 9.93 | 7.85 | 7.01 | 6.29 |
| | Bleached | 12.64 | 15.52 | 12.39 | 15.01 | 8.48 | 11.16 | 11.68 |
| S1-Bluegreen-RC1-B | Colored | 7.25 | 9.5 | 11.25 | 8.96 | 6.93 | 7.42 | 6.64 |
| | Bleached | 10.82 | 13.64 | 12.79 | 13.82 | 8.46 | 11.26 | 11.42 |
| S1-Brown-Gold-RC2-N | Colored | 5.71 | 6.45 | 7.98 | 11.14 | 11.1 | 10.35 | 11.75 |
| | Bleached | 5.46 | 6.51 | 8.61 | 11.29 | 12.39 | 15.78 | 16.8 |
| S1-Brown-Gold-RC2-B | Colored | 7.16 | 7.28 | 9.04 | 11.07 | 12.02 | 12.23 | 12.38 |
| | Bleached | 7.24 | 7.7 | 9.57 | 11.85 | 12.64 | 16.17 | 16.95 |
| S1-Gold-RC2-N | Colored | 6.21 | 10.71 | 14.94 | 23.81 | 20.52 | 31.68 | 31.35 |
| | Bleached | 6.5 | 8.85 | 15.37 | 20.96 | 21.44 | 19.22 | 19.02 |
| S1-Gold-RC2-B | Colored | 6.89 | 11.29 | 14.18 | 25.56 | 19.4 | 30.7 | 32.16 |
| | Bleached | 6.82 | 9.7 | 15.4 | 20.76 | 21.76 | 23.13 | 21.18 |

Example 8: Impact of Glass Tint and Interference Stack on Light Reflectivity and Transmission for an EC Device Another set of EC cells (or EC panels) were made (Set 2) similar to the ones made in Example 7, in terms of the device construction and the type of the tungsten oxide used. The electrolyte also used the two dyes as above, one of which resulted in a blue coloring cell and the other one resulted in more neutral coloring cell. The electrolyte comprised of propylene carbonate, lithium bis(trifluoromethanesulfonyl) imide, and contained polymethyl methacrylate to increase viscosity and UV stabilizers. The substrates were selected as in Table 21, all of which were 6 mm in thickness for the front substrate and 2.2 mm for the rear substrate. The substrates with the tint and/or the interference coatings were obtained from NSG, and then ITO was deposited on them as explained in Example 7. Description of the substrates used, and other EC cell details are in Table 21. In the sample detail "S2" refers to the second set of the samples, the color refers to the overall color of the substrate, "B" stands for a blue coloring cell, "N" for a neutral coloring cell, and "RC" stands for the cell having an interference coating, and "NRC" for a cell not having an interference coating. The samples where the Cell-ID is underlined this table had the same configuration as those used in Example 7 (Table 15).

TABLE 21

EC cell details made using front color substrates with and without reflective coating

| Cell ID | Description (all tungsten coated) | First Substrate* color | First substrate Reflective stack | Counter electrode, or type of second substrate | Dye type in electrolyte |
|---|---|---|---|---|---|
| S2-Clear-NRC-N | Clear non reflective | Clear | None | TEC ™15 | Dye-N |
| S2-Clear-RC1-N | Clear reflective | Clear | Stack1 | TEC ™15 | Dye-N |
| S2-Clear-RC1-B | Clear reflective | Clear | Stack1 | TEC ™15 | Dye-B |
| S2-Gold-RC2-N | Gold reflective | Clear | Stack2 | TEC ™15 | Dye-N |
| S2-Gold-RC2-B | Gold reflective | Clear | Stack2 | TEC ™15 | Dye-B |
| S2-Blue-NRC-N | Blue non reflective | Blue tinted | None | TEC ™15 | Dye-N |
| S2-Blue-RC1-N | Blue reflective | Blue tinted | Stack1 | TEC ™15 | Dye-N |
| S2-Bronze-NRC-N | Bronze non reflective | Bronze tinted | None | TEC ™15 | Dye-N |
| S2-Bronze-NRC-B | Bronze non reflective | Bronze tinted | None | TEC ™15 | Dye-B |
| S2-Gray-RC1-N | Gray reflective | Gray tinted | Stack1 | TEC ™15 | Dye-N |
| S2-Gray-RC1-B | Gray reflective | Gray tinted | Stack1 | TEC ™15 | Dye-B |

The above cells were used to measure color and spectra in transmission and in reflection at normal angle. All of these cells exhibited large change in transmitted color as desired and expected.

TABLE 22

Color measurement in transmission (Normal angle) of EC cells

| | Bleached | | | Colored | | | |
|---|---|---|---|---|---|---|---|
| Sample ID | L* | a* | b* | L* | a* | b* | $\Delta E_T^*$ |
| S2-Clear-NRC-N | 90.3 | −2.2 | 4.4 | 34.2 | 6.5 | 5.0 | 56.7 |
| S2-Clear-RC1-N | 87.3 | −3.1 | 4.3 | 28.8 | 7.0 | 4.1 | 59.3 |
| S2-Clear-RC1-B | 85.9 | −4.3 | 9.7 | 44.1 | −12.2 | −35.9 | 62.3 |
| S2-Gold-RC2-N | 73.5 | 3.4 | 31.4 | 21.2 | 5.8 | 16.7 | 54.3 |
| S2-Gold-RC2-B | 73.6 | 2.5 | 35.6 | 34.1 | −16.9 | −13.8 | 66.2 |
| S2-Blue-NRC-N | 72.9 | −10.7 | −6.6 | 21.0 | 3.0 | −0.4 | 54.0 |
| S2-Blue-RC1-N | 71.7 | −12.5 | −5.7 | 19.6 | 3.5 | 0.5 | 54.9 |
| S2-Bronze-NRC-N | 73.3 | 1.9 | 8.0 | 25.3 | 6.0 | 6.0 | 48.3 |
| S2-Bronze-NRC-B | 72.8 | 2.8 | 12.4 | 35.9 | −8.7 | −28.9 | 56.5 |
| S2-Gray-RC1-N | 64.4 | −0.6 | 2.0 | 18.5 | 5.1 | 2.7 | 46.3 |
| S2-Gray-RC1-B | 63.8 | −2.4 | 5.7 | 29.9 | −6.3 | −30.8 | 49.9 |

The change in $\Delta E_R^*$ in Table 23, shows that by depositing a clear interference stack on clear glass (samples S2-Clear-NRC-N compared to S2-Clear-RC1-N) reduces the color change in reflection, which is not different from the trend modeled for the half cells in Table 3. This shows that the presence of reflective stack decreases the change in reflection by a significant amount. This may also be seen in the pair S2-Blue-NRC-N and S2-Blue-RC1-N, both with the same dye and glass tint but without and with reflective stack, where the change in reflection decreases from 8.2 to 4.2.

TABLE 23

Color measurement in reflection (Normal Angle) of EC cells, glass side of the substrate with interference layers facing front

| | Reflectance Bleached | | | Reflectance Colored | | | |
|---|---|---|---|---|---|---|---|
| Sample ID | L* | a* | b* | L* | a* | b* | $\Delta E_R^*$ |
| S2-Clear-NRC-N | 41.9 | −4.9 | −3.7 | 28.7 | 4.6 | −5.4 | 16.3 |
| S2-Clear-RC1-N | 46.7 | −2.9 | 2.8 | 41.6 | −7.1 | 7.6 | 8.1 |
| S2-Clear-RC1-B | 47.5 | 1.1 | 1.5 | 42.5 | −0.5 | 0.8 | 5.4 |
| S2-Gold-RC2-N | 55.3 | 5.5 | 29.8 | 53.4 | −2.3 | 27.8 | 8.2 |
| S2-Gold-RC2-B | 53.9 | 7.2 | 27.3 | 53.7 | 4.8 | 29.1 | 3.0 |
| S2-Blue-NRC-N | 33.3 | −4.5 | −6.9 | 27.6 | 1.3 | −6.0 | 8.2 |
| S2-Blue-RC1-N | 34.6 | −3.0 | −4.4 | 31.3 | −5.3 | −3.1 | 4.2 |
| S2-Bronze-NRC-N | 32.5 | 0.2 | −1.2 | 27.2 | 1.7 | −2.9 | 5.7 |
| S2-Bronze-NRC-B | 31.7 | −1.1 | 0.9 | 26.0 | 0.2 | −5.6 | 8.8 |
| S2-Gray-RC1-N | 31.8 | −0.9 | 0.0 | 29.3 | −1.8 | 1.1 | 2.8 |
| S2-Gray-RC1-B | 31.3 | 1.5 | 0.9 | 29.3 | −0.5 | −0.1 | 3.0 |

Table 23 also shows other trends. Tinting of the substrate also reduces the reflectivity differences between the bleached and the colored states. This may be seen by comparing S2-Clear-NRC-N, S2-Blue-NRC-N, S2-Bronze-NRC-N and S2-Bronze-NRC-B, all of which have no reflective stack and the last three substrates are tinted. The $\Delta E_R^*$ for these are respectively 16.3 (not tinted), 8.2, 5.7 and 8.8. Comparing S2-Bronze-NRC-N and S2-Bronze-NRC-B, the $\Delta E_R^*$ for these are 8.8 and 5.7 respectively, showing that when the EC coloration and the front tint substrate are similar there is a higher reduction in reflectivity differences. This is because the neutral coloring cell has a slightly red/brown color which is closer to the Bronze in its color spectrum of the substrate.

Comparing Clear-N-NRC, Blue-N-NRC and Bronze-N-NRC where the $\Delta E_R^*$ are 16.3, 8.2 and 5.5 respectively for the same color dye but no-tint and different tints, shows the importance of both the substrate tint, and its combination with the coloration of the EC cell.

Given all of these conclusions, both the presence of the interference stack and the use of substrate tint are important to reduce $\Delta E_R^*$. In addition, these may be judiciously combined with the coloration of the EC cell to reduce the reflective differences even further.

Example 9: Impact of Glass Tint and Interference Stack on Light Reflectivity and Transmission for an EC Device in an IGU Unit EC cells listed in Table 21, were modelled for their thermal performance in an IGU unit. For this modelling "Window" program was used that is made available by Lawrence Berkeley National Laboratory (Berkeley, CA). The results are shown in Table 24. The IGU construction places the EC panel (or EC cell) on the outside, and the inner glass pane was either TEC10 Optiwhite™ (3 mm thick) or Suncool 70:40 ProT™ (6 mm thick) both from NSG. The inner panes are coated with a Low-e coating. These IGUs are assembled with a 12 mm gap between the EC panel and the Low-e coated panel. The Low-e side faced the gap (surface 3), as shown for an IGU assembly in FIGS. 3, 5 and 6. The gap was filled with Argon. Solar heat gain coefficients (SHGC) and the thermal conductivity (U) for these assemblies are shown in this table. The samples where the Cell-ID is underlined in this table had the same configuration as those used in Example 7 (Table 15)

TABLE 24

Modelled IGU configuration, SHCG and U value

| | IGU configuration | | | | | U value |
|---|---|---|---|---|---|---|
| ID | Cell | Gap | Low-E Glass | SHGC Bleached | SHGC Colored | Wm-2K-1 |
| TEC-Ar-S2-Clear-NRC-N | S2-Clear-NRC-N | 12 mm Ar gap | TEC10 Optiwhite, 3 mm | 0.51 | 0.11 | 0.48 |
| TEC-Ar-S2-Clear-RC1-N | S2-Clear-RC1-N | | | 0.45 | 0.10 | 0.48 |
| TEC-Ar-S2-Clear-RC1-B | S2-Clear-RC1-B | | | 0.45 | 0.15 | 0.48 |

TABLE 24-continued

Modelled IGU configuration, SHCG and U value

| ID | Cell | Gap | Low-E Glass | SHGC Bleached | SHGC Colored | U value Wm-2K-1 |
|---|---|---|---|---|---|---|
| TEC-Ar-S2-Gold-RC2-N | S2-Gold-RC2-N | | | 0.35 | 0.09 | 0.48 |
| TEC-Ar-S2-Gold-RC2-B | S2-Gold-RC2-B | | | 0.36 | 0.11 | 0.48 |
| TEC-Ar-S2-Blue-NRC-N | S2-Blue-NRC-N | | | 0.27 | 0.10 | 0.48 |
| TEC-Ar-S2-Blue-RC1-N | S2-Blue-RC1-N | | | 0.26 | 0.10 | 0.48 |
| TEC-Ar-S2-Bronze-NRC-N | S2-Bronze-NRC-N | | | 0.34 | 0.10 | 0.48 |
| TEC-Ar-S2-Bronze-NRC-B | S2-Bronze-NRC-B | | | 0.36 | 0.13 | 0.48 |
| TEC-Ar-S2-Gray-RC1-N | S2-Gray-RC1-N | | | 0.27 | 0.10 | 0.48 |
| TEC-Ar-S2-Gray-RC1-B | S2-Gray-RC1-B | | | 0.27 | 0.12 | 0.48 |
| SC-Ar-S2-Clear-NRC-N | S2-Clear-NRC-N | | Suncool 70:40 | 0.39 | 0.09 | 0.40 |
| SC-Ar-S2-Clear-RC1-N | S2-Clear-RC1-N | | ProT, 6 mm | 0.36 | 0.08 | 0.40 |
| SC-Ar-S2-Clear-RC1-B | S2-Clear-RC1-B | | | 0.35 | 0.12 | 0.40 |
| SC-Ar-S2-Gold-RC2-N | S2-Gold-RC2-N | | | 0.26 | 0.07 | 0.40 |
| SC-Ar-S2-Gold-RC2-B | S2-Gold-RC2-B | | | 0.26 | 0.09 | 0.40 |
| SC-Ar-S2-Blue-NRC-N | S2-Blue-NRC-N | | | 0.23 | 0.08 | 0.40 |
| SC-Ar-S2-Blue-RC1-N | S2-Blue-RC1-N | | | 0.22 | 0.08 | 0.40 |
| SC-Ar-S2-Bronze-NRC-N | S2-Bronze-NRC-N | | | 0.26 | 0.08 | 0.40 |
| SC-Ar-S2-Bronze-NRC-B | S2-Bronze-NRC-B | | | 0.27 | 0.11 | 0.40 |
| SC-Ar-S2-Gray-RC1-N | S2-Gray-RC1-N | | | 0.21 | 0.08 | 0.40 |
| SC-Ar-S2-Gray-RC1-B | S2-Gray-RC1-B | | | 0.21 | 0.10 | 0.40 |

Tables 25 and 26 show the color in transmission and in reflection for the modelled IGUs and also the change in color in transmission $\Delta E_T^*$ and in reflection $\Delta E_R^*$ respectively. As expected and desired, the change in transmission color is high when the EC panel changes from the clear state (bleached state) to the darker state (colored state). Table 26 shows that the change in reflectivity for the clear glass with no interference stack is the highest at 24.9.

TABLE 25

Optical properties (light transmission) of IGU with EC panels

| | Bleached | | | Colored | | | |
|---|---|---|---|---|---|---|---|
| IGU ID | L* | a* | b* | L* | a* | b* | $\Delta E_T$ |
| TEC-Ar-S2-Clear-NRC-N | 84.6 | −1.7 | 5.2 | 32.0 | 6.1 | 5.4 | 53.2 |
| TEC-Ar-S2-Clear-RC1-N | 82.0 | −2.5 | 5.2 | 27.0 | 6.6 | 4.5 | 55.7 |
| TEC-Ar-S2-Clear-RC1-B | 80.8 | −3.6 | 10.4 | 38.7 | −11.6 | −33.4 | 61.3 |
| TEC-Ar-S2-Gold-RC2-N | 69.8 | 4.0 | 30.9 | 20.0 | 5.6 | 16.2 | 51.9 |
| TEC-Ar-S2-Gold-RC2-B | 70.1 | 3.2 | 35.0 | 30.4 | −15.8 | −12.7 | 64.9 |
| TEC-Ar-S2-Blue-NRC-N | 67.7 | −9.9 | −5.4 | 19.2 | 2.8 | 0.1 | 50.4 |
| TEC-Ar-S2-Blue-RC1-N | 66.7 | −11.5 | −4.5 | 17.9 | 3.3 | 0.9 | 51.3 |
| TEC-Ar-S2-Bronze-NRC-N | 68.9 | 2.2 | 8.4 | 23.7 | 5.7 | 6.2 | 45.4 |
| TEC-Ar-S2-Bronze-NRC-B | 68.5 | 3.1 | 12.7 | 31.3 | −8.3 | −26.8 | 55.3 |

TABLE 25-continued

Optical properties (light transmission) of IGU with EC panels

| | Bleached | | | Colored | | | |
|---|---|---|---|---|---|---|---|
| IGU ID | L* | a* | b* | L* | a* | b* | $\Delta E_T$ |
| TEC-Ar-S2-Gray-RC1-N | 60.2 | −0.3 | 2.7 | 17.0 | 4.8 | 3.1 | 43.6 |
| TEC-Ar-S2-Gray-RC1-B | 59.8 | −1.9 | 6.3 | 25.6 | −6.1 | −28.7 | 49.1 |
| SC-Ar-S2-Clear-NRC-N | 83.3 | −5.4 | 3.5 | 31.6 | 5.1 | 4.5 | 52.8 |
| SC-Ar-S2-Clear-RC1-N | 80.6 | −6.2 | 3.5 | 26.4 | 5.7 | 3.7 | 55.5 |
| SC-Ar-S2-Clear-RC1-B | 79.5 | −7.2 | 8.6 | 38.4 | −12.9 | −33.6 | 59.2 |
| SC-Ar-S2-Gold-RC2-N | 68.3 | 0.2 | 28.7 | 19.2 | 4.7 | 15.4 | 51.1 |
| SC-Ar-S2-Gold-RC2-B | 68.6 | −0.3 | 32.7 | 29.9 | −17.2 | −13.1 | 62.3 |
| SC-Ar-S2-Blue-NRC-N | 66.8 | −12.5 | −6.5 | 18.8 | 2.2 | −0.4 | 50.6 |
| SC-Ar-S2-Blue-RC1-N | 65.8 | −14.1 | −5.6 | 17.5 | 2.7 | 0.4 | 51.5 |
| SC-Ar-S2-Bronze-NRC-N | 67.8 | −1.0 | 6.9 | 23.0 | 4.8 | 5.5 | 45.2 |
| SC-Ar-S2-Bronze-NRC-B | 67.4 | −0.2 | 11.1 | 31.1 | −9.5 | −27.0 | 53.4 |
| SC-Ar-S2-Gray-RC1-N | 59.3 | −3.1 | 1.5 | 16.5 | 4.1 | 2.5 | 43.4 |
| SC-Ar-S2-Gray-RC1-B | 58.8 | −4.7 | 4.9 | 25.6 | −7.0 | −28.8 | 47.4 |

TABLE 26

Optical properties (light reflection) of IGU with EC panels

| | Bleached | | | Colored | | | |
|---|---|---|---|---|---|---|---|
| IGU ID | L* | a* | b* | L* | a* | b* | ΔE$_R$ |
| TEC-Ar-S2-Clear-NRC-N | 50.7 | −6.1 | 0.5 | 28.9 | 4.6 | −5.2 | 24.9 |
| TEC-Ar-S2-Clear-RC1-N | 53.5 | −4.7 | 5.1 | 42.0 | −7.0 | 7.7 | 12.0 |
| TEC-Ar-S2-Clear-RC1-B | 53.7 | −1.3 | 5.1 | 42.8 | −0.8 | −1.3 | 12.7 |
| TEC-Ar-S2-Gold-RC2-N | 58.6 | 5.8 | 32.2 | 54.2 | −2.3 | 27.8 | 10.1 |
| TEC-Ar-S2-Gold-RC2-B | 57.3 | 7.2 | 30.3 | 54.6 | 4.6 | 28.7 | 4.1 |
| TEC-Ar-S2-Blue-NRC-N | 37.7 | −7.4 | −6.5 | 27.6 | 1.3 | −5.9 | 13.4 |
| TEC-Ar-S2-Blue-RC1-N | 38.4 | −6.2 | −4.1 | 31.3 | −5.3 | −3.1 | 7.2 |
| TEC-Ar-S2-Bronze-NRC-N | 37.3 | −0.1 | 1.9 | 27.3 | 1.7 | −2.8 | 11.2 |
| TEC-Ar-S2-Bronze-NRC-B | 36.7 | −0.7 | 4.6 | 26.2 | 0.0 | −6.8 | 15.5 |
| TEC-Ar-S2-Gray-RC1-N | 34.6 | −1.4 | 1.0 | 29.4 | −1.8 | 1.1 | 5.2 |
| TEC-Ar-S2-Gray-RC1-B | 34.0 | 0.5 | 2.3 | 29.4 | −0.5 | −0.9 | 5.7 |
| SC-Ar-S2-Clear-NRC-N | 45.6 | −4.9 | −3.1 | 28.6 | 4.6 | −5.3 | 19.6 |
| SC-Ar-S2-Clear-RC1-N | 49.6 | −3.3 | 2.8 | 42.0 | −7.1 | 7.6 | 9.8 |
| SC-Ar-S2-Clear-RC1-B | 50.1 | 0.4 | 2.3 | 42.6 | −0.5 | −0.4 | 8.0 |
| SC-Ar-S2-Gold-RC2-N | 57.1 | 5.6 | 30.6 | 54.2 | −2.3 | 27.8 | 8.8 |
| SC-Ar-S2-Gold-RC2-B | 55.7 | 7.3 | 28.4 | 54.6 | 4.7 | 28.9 | 2.8 |
| SC-Ar-S2-Blue-NRC-N | 35.0 | −5.4 | −7.5 | 27.6 | 1.3 | −6.0 | 10.2 |
| SC-Ar-S2-Blue-RC1-N | 36.0 | −4.1 | −4.9 | 31.3 | −5.3 | −3.1 | 5.1 |
| SC-Ar-S2-Bronze-NRC-N | 34.4 | 0.3 | −0.5 | 27.3 | 1.7 | −2.9 | 7.6 |
| SC-Ar-S2-Bronze-NRC-B | 34.0 | −0.7 | 1.9 | 26.2 | 0.3 | −6.3 | 11.3 |
| SC-Ar-S2-Gray-RC1-N | 32.9 | −0.9 | 0.0 | 29.4 | −1.8 | 1.1 | 3.8 |
| SC-Ar-S2-Gray-RC1-B | 32.5 | 1.2 | 1.1 | 29.4 | −0.4 | −0.5 | 3.8 |

Table 27 Shows a comparison of color changes in transmission and reflection changes for the EC panel, and the IGUs made by two different low-e coated glass. This table also includes change in hue both in transmission and reflection. A low hue change in transmission $\Delta E_{T-H}^*$ (from bleached to the colored state) will allow the quality of light to be unchanged as the EC device darkens. As seen in the tables, low hue change is obtained for those EC panels which darken to a neutral color. Furthermore, the substrate with a permanent gray tint and with the interference layer also keeps both of $\Delta E_R^*$ and $\Delta E_{R-H}^*$, low, which provides least visible change in reflection. This is seen for Low reflective changes ($\Delta E_R^*$ and $\Delta E_{R-H}^*$) and low transmissive hue changes ($\Delta E_{T-H}^*$) are also seen in both of the IGUs (e.g., see sample S2-Gray-RC1-N. For a sample where a blue coloring EC device is selected with everything else remaining the same (sample S2-Gray-RC1-B), excepting for a large hue change in transmission, these cells also perform well in keeping the reflective changes low. Low change in reflectivity and low change in hue are also seen for sample S2-Gold-RC2-B. This sample has no substrate tint, but the tint comes in from one of the layers in the interference coating. For a given EC panel, the choice of the low-e glass is important in the IGU, as this can exacerbate the reflectivity differences or even reduce them. As an Example, for sample S2-Clear-RC1-B, the $\Delta E_R^*$ is acceptable at 5.4, but this changes to 12.7 when TEC is used as a low-e panel showing this to be unacceptable, whereas with SC low-e glass, this IGU still has an acceptable value. In addition, the reflective hue also changed in the same fashion. This effect was opposite for S2-Bronze-NRC-N, where TEC had more favorable reflective properties as compared to SC in the IGU. As discussed earlier in Table 24, all of these choices even if the EC cell is the same will also influence SHGC and important parameter in the selection process.

TABLE 27

Comparison of color changes in EC cell and the IGUs in which the EC cell is incorporated into

| | Cell only | | | | IGU 1 (TEC-Ar) | | | | IGU 2 (SC-Ar) | | | |
|---|---|---|---|---|---|---|---|---|---|---|---|---|
| Cell ID | ΔE$_T$* | ΔE$_{T-H}$* | ΔE$_R$* | ΔE$_{R-H}$* | ΔE$_T$* | ΔE$_{T-H}$* | ΔE$_R$* | ΔE$_{R-H}$* | ΔE$_T$* | ΔE$_{T-H}$* | ΔE$_R$* | ΔE$_{R-H}$* |
| S2-Clear-NRC-N | 56.7 | 8.6 | 16.3 | 9.6 | 53.2 | 7.8 | 24.9 | 12.0 | 52.8 | 10.5 | 19.6 | 9.8 |
| S2-Clear-RC1-N | 59.3 | 10.1 | 8.1 | 6.4 | 55.7 | 9.1 | 12.0 | 3.4 | 55.5 | 11.9 | 9.8 | 6.1 |
| S2-Clear-RC1-B | 62.3 | 46.3 | 5.4 | 1.8 | 61.3 | 44.5 | 12.7 | 6.4 | 59.2 | 42.6 | 8.0 | 2.8 |
| S2-Gold-RC2-N | 54.3 | 14.8 | 8.2 | 8.0 | 51.9 | 14.8 | 10.1 | 9.2 | 51.1 | 14.0 | 8.8 | 8.4 |
| S2-Gold-RC2-B | 66.2 | 53.1 | 3.0 | 3.0 | 64.9 | 51.3 | 4.1 | 3.1 | 62.3 | 48.8 | 2.8 | 2.6 |
| S2-Blue-NRC-N | 54.0 | 15.0 | 8.2 | 6.0 | 50.4 | 13.8 | 13.4 | 8.7 | 50.6 | 15.9 | 10.2 | 6.9 |
| S2-Blue-RC1-N | 54.9 | 17.1 | 4.2 | 2.6 | 51.3 | 15.7 | 7.2 | 1.4 | 51.5 | 17.8 | 5.1 | 2.1 |
| S2-Bronze-NRC-N | 48.3 | 4.5 | 5.7 | 2.3 | 45.4 | 4.1 | 11.2 | 5.0 | 45.2 | 5.9 | 7.6 | 2.7 |
| S2-Bronze-NRC-B | 56.5 | 42.8 | 8.8 | 6.7 | 55.3 | 41.0 | 15.5 | 11.3 | 53.4 | 39.2 | 11.3 | 8.2 |
| S2-Gray-RC1-N | 46.3 | 5.7 | 2.8 | 1.4 | 43.6 | 5.1 | 5.2 | 0.4 | 43.4 | 7.3 | 3.8 | 1.4 |
| S2-Gray-RC1-B | 49.9 | 36.7 | 3.0 | 2.2 | 49.1 | 35.2 | 5.7 | 3.3 | 47.4 | 33.8 | 3.8 | 2.3 |

Example 10: Impact of Glass Tint and Interference Stack on Light Reflectivity and Transmission for an EC Device with an Electrolyte Having Electrochromic Properties EC cells were constructed using 6 mm thick front substrates, where some of these were tinted, and some of these had reflective layers as shown in Table 28. All of these were coated with ITO with a surface resistivity of about 12Ω/□. The counter electrode was 2.3 mm thick TEC™15 glass from NSG. These were assembled with a gap of 300 μm which was filled with an electrolyte composition comprising propylene carbonate along with a blue coloring dye (Dye-B) with anodic and cathodic elements bridged together which was 4,4'-Bipyridinium, 1-(4-ferrocenylbutyl)-1'-methyl cation with bis(trifluoromethanesulfonyl)imide anion. The electrolyte also contained polymethyl methacrylate to increase viscosity and UV stabilizers. The color of the colored EC cells in this dye is mainly dominated by the cathodic bipyridinium, and the anodic ferrocene component has only a little contribution the colored region. The cells in Table 28 and others which start with S3 do not have any EC coating, and all of the electrochromic properties are derived from the EC dye in the electrolyte between the two conductive coatings on the two substrates.

TABLE 28

EC cell details made using front color substrates with and without reflective coating and no EC coatings

| Cell ID | Description* | First Substrate* color | First substrate Reflective stack | Counter electrode, or type of second substrate | Dye type in electrolyte |
| --- | --- | --- | --- | --- | --- |
| S3-Clear-NRC-B | Clear, non-reflective | Clear | None | TEC™15 | Dye-B |
| S3-Clear-RC1-B | Clear, reflective clear | Clear | Stack1 | TEC™15 | Dye-B |
| S3-Gold-RC2-B | Clear reflective (gold) | Clear | Stack2 | TEC™15 | Dye-B |
| S3-Blue-RC1-B | Blue, non-reflective | Blue tinted | None | TEC™15 | Dye-B |
| S3-Blue-NRC-B | Blue, reflective clear | Blue tinted | Stack1 | TEC™15 | Dye-B |

*Description summarizes concisely the color of the first substrate and the reflective coating if present and its color which is also given in the next two columns Table 29 lists the color properties of the cells in transmission at normal angle, all of which show large changes in color and hue in going from bleach to the colored state.

TABLE 29

Color measurement in transmission (Normal angle) of EC cells

| | Bleached | | | Colored | | | | |
| --- | --- | --- | --- | --- | --- | --- | --- | --- |
| Sample ID | L* | a* | b* | L* | a* | b* | ΔE$_T$* | ΔE$_{T-H}$* |
| S3-Clear-NRC-B | 89.8 | −3.6 | 12.1 | 33.6 | 0.6 | −51.7 | 85.2 | 63.9 |
| S3-Clear-RC1-B | 84.4 | −0.8 | 7.5 | 32.2 | 2.2 | −51.1 | 78.6 | 58.7 |
| S3-Gold-RC2-B | 69.8 | 6.5 | 31.2 | 20.5 | −6.3 | −30.3 | 79.8 | 62.8 |
| S3-Blue-NRC-B | 72.6 | −11.8 | 2.8 | 26.4 | 1.1 | −46.9 | 69.0 | 51.3 |
| S3-Blue-RC1-B | 69.1 | −8.9 | −1.5 | 26.6 | 2.4 | −47.1 | 63.3 | 46.9 |

Table 30 lists the color properties of the cells in reflection at normal angle, all of which show large changes in color and hue in going from bleach to the colored state when the interference stack is not present. The results show that the substrate without tint and the reflective layer (S3-Clear-NRC-B) has a high change in color and hue in reflection. Sample S3-Blue-NRC-B does not have a reflective coating but the substrate is tinted. The other samples with the reflective layer have much lower reflective color and hue and is in the desired range. Even though, the sample S3-Clear-RC1-B has a ΔE$_R$* of 6.7, in the fully colored state, but it must be recognized that there is a large reduction as compared to the sample without the interference stack where the ΔE$_R$* is 14.0. Further we used a commercial glass with an interference stack and in these samples the thickness of the transparent conductor was not optimized. Therefore, this data should be viewed with the perspective of the incredible and surprising potential when interference stacks are used.

TABLE 30

Color measurement in reflection (Normal Angle) of EC cells, glass side of the substrate with interference layers facing front

| | Reflectance Bleached | | | Reflectance Colored | | | | |
| --- | --- | --- | --- | --- | --- | --- | --- | --- |
| Sample ID | L* | a* | b* | L* | a* | b* | ΔE$_R$* | ΔE$_{R-H}$* |
| S3-Clear-NRC-B | 41.9 | 2.1 | −2.1 | 28.7 | 7.1 | −15.2 | 19.2 | 14.0 |
| S3-Clear-RC1-B | 52.7 | −5.6 | 14.2 | 46.5 | −6.0 | 11.7 | 6.7 | 2.5 |
| S3-Gold-RC2-B | 59.5 | 2.0 | 31.9 | 57.7 | 0.8 | 29.8 | 3.0 | 2.5 |
| S3-Blue-NRC-B | 33.4 | −1.9 | −10.4 | 28.1 | 2.3 | −14.6 | 8.0 | 6.1 |
| S3-Blue-RC1-B | 38.5 | −9.1 | −0.4 | 35.4 | −7.8 | −1.8 | 3.7 | 2.0 |

Table 31 summarizes all color differences in transmission and reflection as well as the hue differences taken from Tables 29 and 30 for the dye only cells.

TABLE 31

Transmission vs Reflection color changes on dye only EC cells

| Sample ID | $\Delta E_T^*$ | $\Delta E_{T-H}^*$ | $\Delta E_R^*$ | $\Delta E_{R-H}^*$ |
|---|---|---|---|---|
| S3-Clear-NRC-B | 85.2 | 63.9 | 19.2 | 14.0 |
| S3-Clear-RC1-B | 78.6 | 58.7 | 6.7 | 2.5 |
| S3-Gold-RC2-B | 79.8 | 62.8 | 3.0 | 2.5 |

TABLE 31-continued

Transmission vs Reflection color changes on dye only EC cells

| Sample ID | $\Delta E_T^*$ | $\Delta E_{T-H}^*$ | $\Delta E_R^*$ | $\Delta E_{R-H}^*$ |
|---|---|---|---|---|
| S3-Blue-NRC-B | 69.0 | 51.3 | 8.0 | 6.1 |
| S3-Blue-RC1-B | 63.3 | 46.9 | 3.7 | 2.0 |

Table 32 lists the transmission properties of the cells at various wavelengths. This shows that the bleach/color ratio (transmission ratio) of all of the cells is high exceeding 25. For cells S3-Gold-RC2-B highest contrast ratios are observed, which also shows least color change in reflectivity in Tables 30 and 31.

TABLE 32

Transmission spectra for EC cells

| Cell ID | State of Sample | % T Wavelength, nm | | | | | | | Bleach/Color ratio at 55 nm |
|---|---|---|---|---|---|---|---|---|---|
| | | 400 | 450 | 500 | 550 | 600 | 650 | 700 | |
| S3-Clear-NRC-B | Bleached | 51.1 | 60.7 | 72.6 | 78.5 | 77.3 | 75.3 | 72.6 | 29.4 |
| | Colored | 0.6 | 37.7 | 20.6 | 2.7 | 0.7 | 4.9 | 23.4 | |
| S3-Clear-RC1-B | Bleached | 47.2 | 56.1 | 63.5 | 65.0 | 67.0 | 68.4 | 66.6 | 26.3 |
| | Colored | 0.6 | 35.3 | 18.7 | 2.5 | 0.7 | 4.8 | 22.2 | |
| S3-Gold-RC2-B | Bleached | 9.7 | 19.1 | 30.6 | 39.7 | 51.3 | 54.9 | 56.2 | 33.4 |
| | Colored | 0.2 | 11.6 | 8.3 | 1.2 | 0.4 | 3.2 | 17.3 | |
| S3-Blue-NRC-B | Bleached | 34.8 | 41.2 | 48.2 | 49.5 | 36.5 | 30.7 | 33.4 | 31.9 |
| | Colored | 0.4 | 25.2 | 13.3 | 1.6 | 0.3 | 1.9 | 10.5 | |
| S3-Blue-RC1-B | Bleached | 33.6 | 40.1 | 43.2 | 42.8 | 32.8 | 28.3 | 30.7 | 25.2 |
| | Colored | 0.5 | 25.4 | 13.0 | 1.7 | 0.4 | 2.1 | 10.4 | |

Table 33 lists the reflection properties of the cells at various wavelengths. This shows that the bleach/color ratio of all of the cells is lower at 550 nm for cells with reflective coatings for substrates with similar tints.

TABLE 33

Reflection spectra for cells

| Cell ID | State of Sample | % R Wavelength, nm | | | | | | | Bleach/Color ratio at 550 nm |
|---|---|---|---|---|---|---|---|---|---|
| | | 400 | 450 | 500 | 550 | 600 | 650 | 700 | |
| S3-Clear-NRC-B | Bleached | 17.4 | 13.0 | 12.1 | 12.4 | 12.9 | 12.2 | 11.3 | 2.4 |
| | Colored | 13.8 | 10.1 | 6.1 | 5.2 | 5.6 | 5.9 | 6.3 | |
| S3-Clear-RC1-B | Bleached | 15.4 | 13.5 | 18.3 | 23.0 | 20.8 | 17.4 | 16.0 | 1.3 |
| | Colored | 12.4 | 10.8 | 13.9 | 17.5 | 15.3 | 12.2 | 11.4 | |
| S3-Gold-RC2-B | Bleached | 9.0 | 10.9 | 19.1 | 29.6 | 34.2 | 28.8 | 24.0 | 1.1 |
| | Colored | 9.0 | 10.6 | 18.0 | 27.9 | 31.1 | 25.4 | 20.8 | |
| S3-Blue-NRC-B | Bleached | 10.5 | 11.2 | 9.1 | 7.9 | 6.2 | 5.7 | 5.8 | 1.6 |
| | Colored | 9.4 | 9.8 | 6.6 | 5.1 | 4.7 | 4.7 | 4.8 | |
| S3-Blue-RC1-B | Bleached | 9.0 | 10.5 | 11.9 | 11.6 | 8.0 | 6.6 | 6.6 | 1.2 |
| | Colored | 7.9 | 9.4 | 10.0 | 9.6 | 6.7 | 5.8 | 5.8 | |

Example 11: Dye Only Cells with Adhesively Bonded Films

Various films were bonded to the EC glass panels. Some of these films have a low-e surface, and while some others have UV blocking properties. A film with low emissivity surface was added to the second side of the dye only EC panel (that is the side which would face inside the building. In another instance UV blocking film is generally added to the first side of the EC panel that faces outside of the building for providing enhanced UV protection of the panel. Both the films may also be added on each of the respective surfaces.

This film SolarGard Ecolux™ 70 has a low emissivity surface and SX80 has UV blocking properties, both from Saint Gobain. The latter film is particularly designed for outdoor use, which is for bonding to the first surface. The dye only samples (without an EC coating) were prepared with these bonded films as shown in Table 34.

TABLE 34

Dye only EC cell details made using front color substrates with and without reflective coating with additional films on outside surfaces of panel

| Sample ID | Description (Dye only) | Film on Panel surface 1 | First Substrate* color | First substrate Reflective stack | Film on panel surface 2 |
|---|---|---|---|---|---|
| S3-Clear-NRC-Eco-B | Clear non reflective | None | Clear | None | SolarGard Ecolux ™ 70 |
| S3-Clear-RC1-Eco-B | Clear reflective | None | Clear | Stack1 | SolarGard Ecolux ™ 70 |
| S3-Blue-RC1-Eco-B | Blue reflective | None | Blue tinted | Stack1 | SolarGard Ecolux ™ 70 |
| S3-Clear-NRC-SX80-B | Clear non reflective | SX80 | Clear | None | None |
| S3-Clear-RC1-SX80-B | Clear reflective | SX80 | Clear | Stack1 | None |
| S3-Blue-RC1-SX80-B | Blue reflective | SX80 | Blue tinted | Stack1 | None |

All of these EC samples use Dye-B in the electrolyte and use TEC15 counter electrode as second substrate With films in place, color measurements were taken of the samples in bleached and fully colored state. As expected, the color values in transmission show a large change between the two states with the added films (Table 35).

TABLE 35

Color measurement in transmission (Normal angle) of dye only EC cells with films on outside panel surfaces

| | Bleached | | | Colored | | | | |
|---|---|---|---|---|---|---|---|---|
| Sample ID | L* | a* | b* | L* | a* | b* | $\Delta E_T^*$ | $\Delta E_{T\text{-}H}^*$ |
| S3-Clear-NRC-Eco-B | 81.1 | −2.1 | 20.4 | 27.7 | −2.6 | −42.4 | 82.4 | 62.8 |
| S3-Clear-RC1-Eco-B | 76.5 | 0.2 | 16.0 | 27.2 | −1.6 | −41.9 | 76.0 | 57.9 |
| S3-Blue-RC1-Eco-B | 62.2 | −8.1 | 6.0 | 22.1 | −1.2 | −39.0 | 60.7 | 45.6 |
| S3-Clear-NRC-SX80-B | 85.5 | −6.8 | 9.8 | 43.4 | −12.2 | −41.7 | 66.7 | 51.8 |
| S3-Clear-RC1-SX80-B | 80.2 | −4.1 | 5.3 | 36.6 | −5.2 | −45.9 | 67.2 | 51.2 |

TABLE 35-continued

Color measurement in transmission (Normal angle) of dye only EC cells with films on outside panel surfaces

| | Bleached | | | Colored | | | | |
|---|---|---|---|---|---|---|---|---|
| Sample ID | L* | a* | b* | L* | a* | b* | $\Delta E_T^*$ | $\Delta E_{T\text{-}H}^*$ |
| S3-Blue-RC1-SX80-B | 65.6 | −10.8 | −2.3 | 26.9 | −0.4 | −44.6 | 58.2 | 43.6 |

The color measurements of the cells in reflection (Table 36) show that the $\Delta E_R^*$ values remain low for those cells with a reflective coating and even lower for cells with both the reflective coating and a tint in the glass. The additional SX80 film which is added to the first side of the EC cell or the addition of Ecolux™ film that is added on the second side of the EC cell, both results in substantial reduction in reflectivity change when the EC cell transitions from clear to a darker optical state. The optical properties and the placement of these films has also an impact on the perceived color change which is lower for SX80 as compared to Ecolux™. The higher reflectivity from the Ecolux™ film and since it is placed after the light enters the EC cell, causes the $\Delta E_R^*$ to be higher.

TABLE 36

Color measurement in Reflection (Normal angle) of dye only EC cells with films on outside panel surfaces

| | Bleached | | | Colored | | | | |
|---|---|---|---|---|---|---|---|---|
| Sample ID | L* | a* | b* | L* | a* | b* | $\Delta E_T^*$ | $\Delta E_{T\text{-}H}^*$ |
| S3-Clear-NRC-Eco-B | 44.3 | −2.9 | −4.0 | 29.2 | 7.4 | −16.9 | 22.4 | 16.5 |
| S3-Clear-RC1-Eco-B | 53.5 | −8.2 | 11.7 | 47.8 | −7.3 | 7.0 | 7.5 | 4.8 |
| S3-Blue-RC1-Eco-B | 39.0 | −10.6 | −1.0 | 35.0 | −7.8 | −1.6 | 4.9 | 2.8 |
| S3-Clear-NRC-SX80-B | 38.9 | −0.3 | −2.9 | 28.4 | 5.0 | −13.0 | 15.5 | 11.4 |
| S3-Clear-RC1-SX80-B | 47.8 | −8.1 | 12.1 | 42.6 | −7.8 | 9.8 | 5.7 | 2.3 |

TABLE 36-continued

Color measurement in Reflection (Normal angle) of dye
only EC cells with films on outside panel surfaces

| Sample ID | Bleached | | | Colored | | | $\Delta E_T^*$ | $\Delta E_{T-H}^*$ |
|---|---|---|---|---|---|---|---|---|
| | L* | a* | b* | L* | a* | b* | | |
| S3-Blue-RC1-SX80-B | 36.1 | −9.1 | −1.4 | 33.5 | −7.6 | −2.4 | 3.2 | 1.8 |

The color change data from the above two tables are summarized below in Table 37.

TABLE 37

Transmission vs Reflection color changes for dye only
EC cells with films on panel outside surfaces

| Sample ID | $\Delta E_T^*$ | $\Delta E_{T-H}^*$ | $\Delta E_R^*$ | $\Delta E_{R-H}^*$ |
|---|---|---|---|---|
| S3-Clear-NRC-Eco-B | 82.4 | 62.8 | 22.4 | 16.5 |
| S3-Clear-RC1-Eco-B | 35.2 | 29.3 | 7.5 | 4.8 |
| S3-Blue-RC1-Eco-B | 60.7 | 45.6 | 4.9 | 2.8 |
| S3-Clear-NRC-SX80-B | 66.7 | 51.8 | 15.5 | 11.4 |
| S3-Clear-RC1-SX80-B | 67.2 | 51.2 | 5.7 | 2.3 |
| S3-Blue-RC1-SX80-B | 58.2 | 43.6 | 3.2 | 1.8 |

Figure 9:
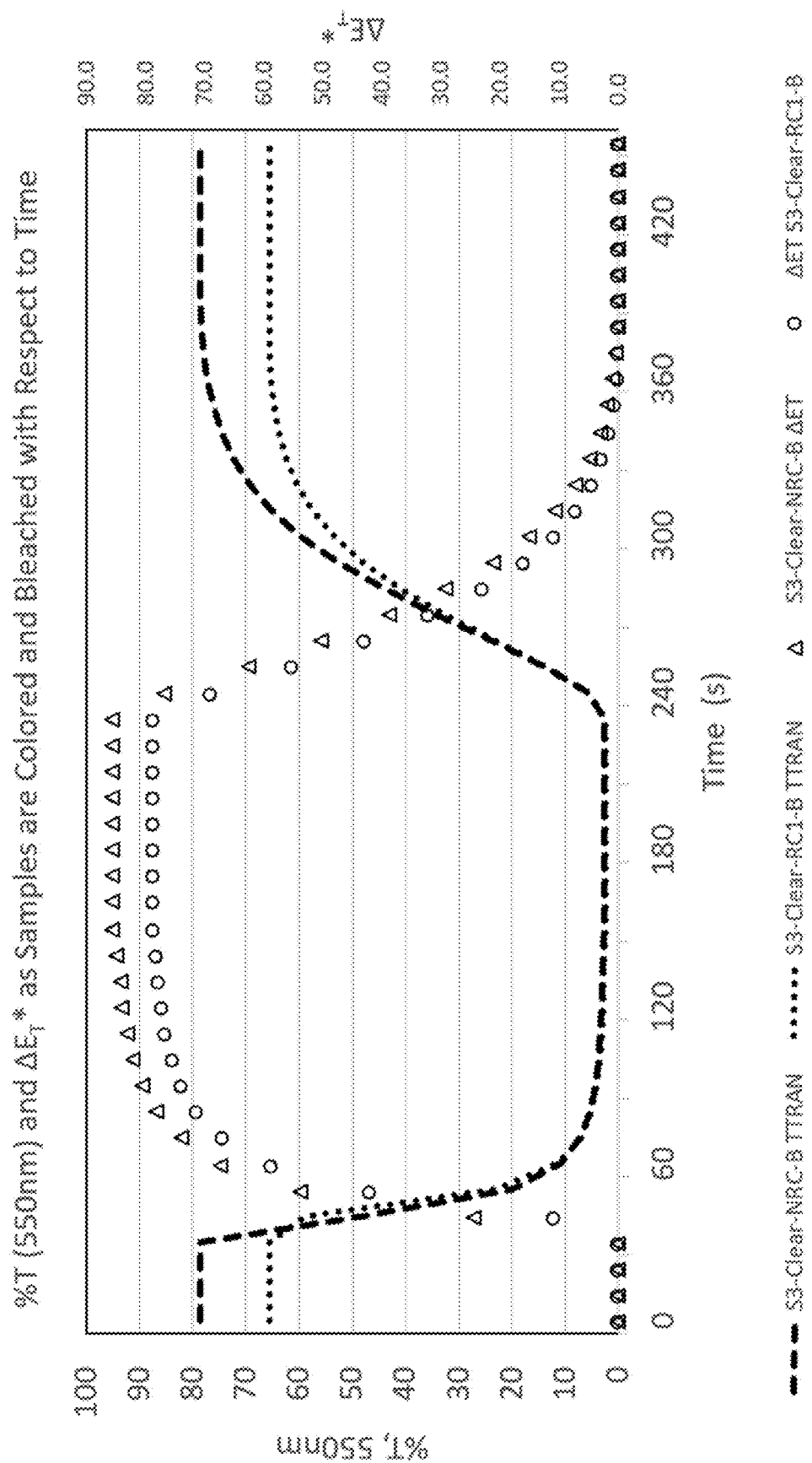
FIG. 9: Change in $\Delta E_T^*$ and % transmission at 550 nm for EC panels with and without interference stacks, as these panels color and bleach over a period of time.

Example 13: Transmissive and Reflective Color Changes in an EC Panel with Depth of Coloration Two EC cells from the above table, S3-Clear-NRC-B and S3-Clear-RC1-B (see Table 28 for detailed description) were colored from the bleached state to completely colored state and then bleached. The first sample does not have a reflective stack, and the second sample does, both use clear substrates and a blue coring dye in the electrolyte. As shown from the traces in the figure the coloring voltage to the samples was applied at about 30 seconds for the samples to start coloring from the bleached state. The samples reached the fully colored state at about 180s. A bleach potential was applied at about 240 seconds and the sample returned to the bleached state in about 400 seconds from the start. FIG. 9 shows the data for these two samples as they are colored and bleached. This shows $\Delta E_T^*$ vs time and compares to the change in transmission change at 550 nm with time. The change appears to be proportional to $\Delta E_T^*$ during this change in transmission. The L*, a* and b* values were measured continuously with time using Ultrascan® Pro instrument from Hunterlab (Reston, VA) both in reflection and in transmission.

Figure 10:
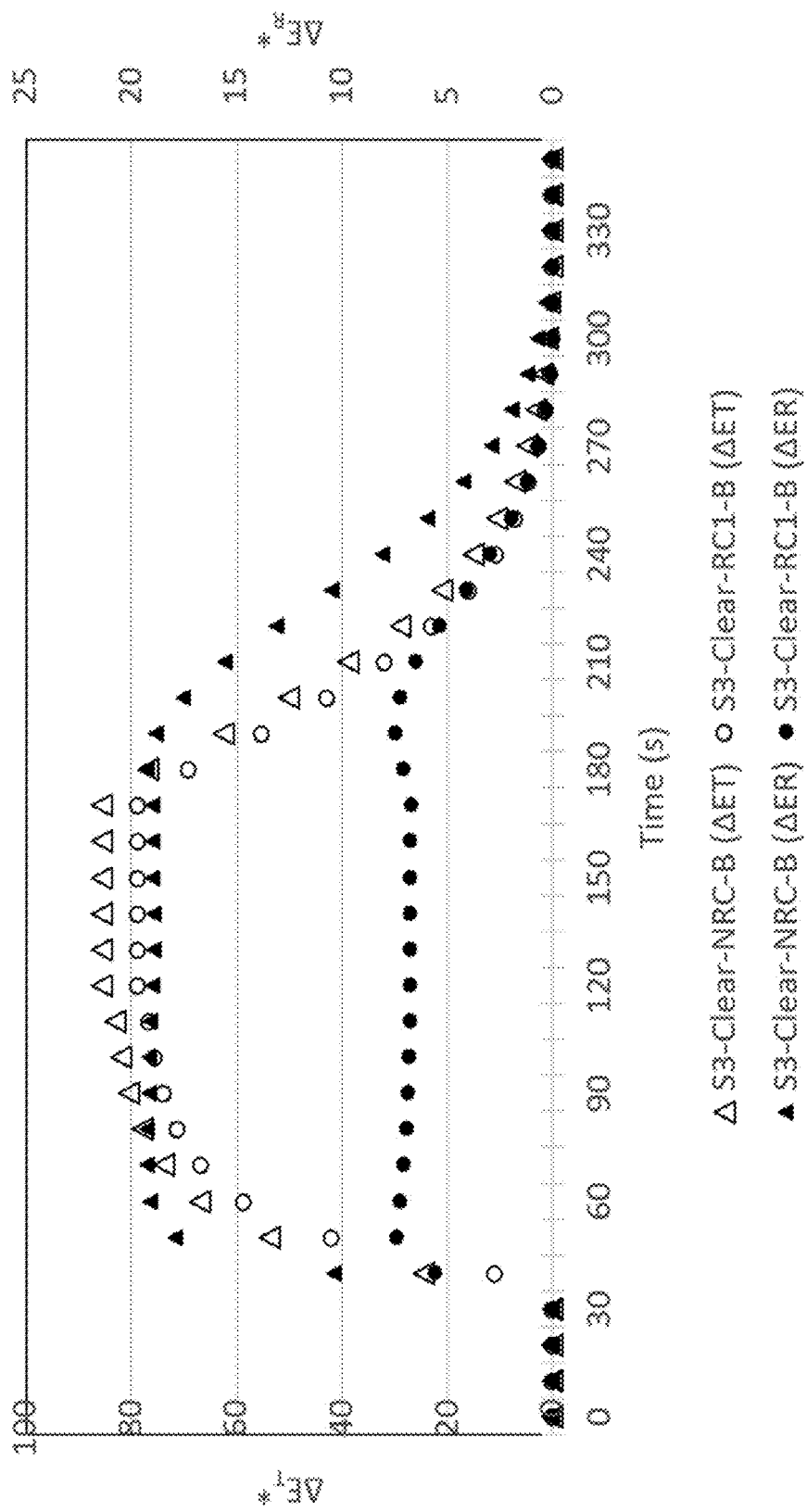
FIG. 10: Change in $\Delta E_T^*$ and $\Delta E_R^*$ for EC panels with and without interference stacks, as these panels color and bleach over a period of time.

FIG. 10 shows the change in $\Delta E_T^*$ and $\Delta E_R^*$ with time as the above samples color and bleach. This shows that although $\Delta E_T^*$ continues to change until the sample saturates (as was also seen in FIG. 9), the $\Delta E_R^*$ saturates out and reaches a plateau approximately when $\Delta E_T^*$ reaches about 40. Therefore, this magnitude of $\Delta E_T^*$ is used in the claims, since the change in $\Delta E_R^*$ is small beyond this value of $\Delta E_T^*$.

Figure 11:
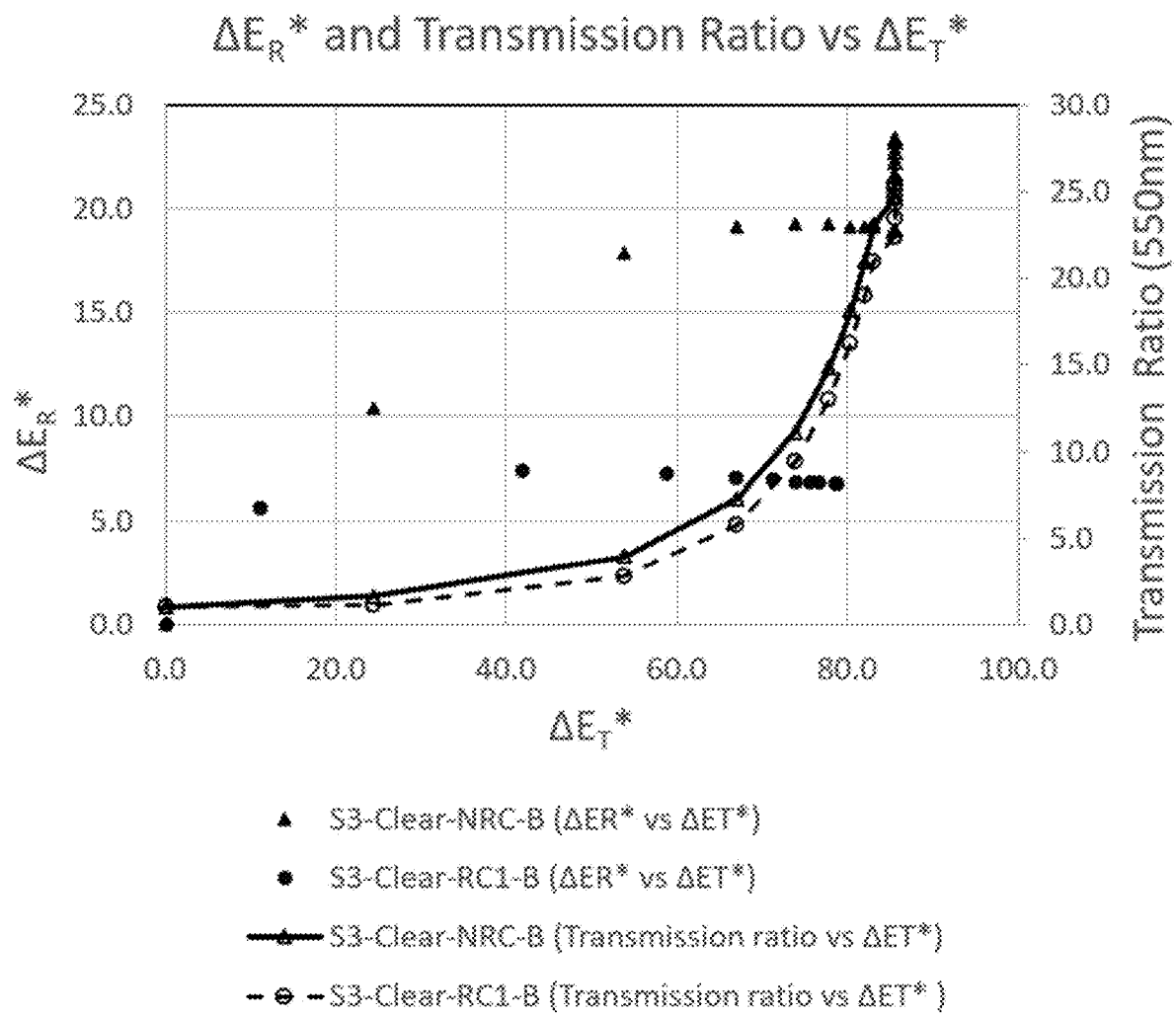
FIG. 11: correlation between the change in $\Delta E_R^*$ versus $\Delta E_T^*$ and Transmission ratio (at 550 nm) vs $\Delta E_T^*$ for EC panels with and without interference stacks, as these transition from a bleached state to a colored state.

FIG. 11 shows change in $\Delta E_R^*$ vs. $\Delta E_T^*$ and Transmission Ratio (at 550 nm) vs. $\Delta E_T^*$ as the samples are colored. This also shows in a different graphical representation where $\Delta E_R^*$ also initially increases with an increase in $\Delta E_T^*$, until $\Delta E_T^*$ reaches about 40, then there is a sharp inflexion and $\Delta E_R^*$ stops changing. This inflexion is particularly sharp for the sample with the interference stack. $\Delta E_R^*$ also initially changes with the change in Transmission Ratio (at 550 nm) and then stops changing much beyond a transmission ratio of about 2.5. Thus, this magnitude of transmission ratio is used in the claims for correlating to $\Delta E_R^*$ changes. In embodiments where no interference stack is used, the change in $\Delta E_R^*$ shown by triangles increases beyond 10 and continues to increase even when the transmission ratio at 550 nm reaches a modest number of about 2. This means that using this disclosure, when this transmission ratio is greater than 2.5, e.g., even if it is 5 or 7 or 10 or greater, will still result in $\Delta E_R^*$ of less than 10 when reflection is viewed from the first side of the first substrate for the device containing the interference stack. This means that it is possible to lower the reflectivity changes for a VLTP panel substantially even though the transmission continues to change.

When these EC panels are integrated in IGUs, the same is observed. This is because in an IGU the only part that changes its optical properties is the EC panel (or the VLTP), all of the other components are static. This means that in an IGU with a VLTP panel when the transmission ratio (bleached to the colored state) at 550 nm changes by the above amounts (i.e., a ratio of 2.5, or 5, or 7 or 10 or greater), the $\Delta E_R^*$ change is less than 10 and in many cases less than 10 when the reflection is observed from the outside of the building or when looking during the day from Surface 1 of the IGU. Surface 1 is shown for IGUs for example in FIGS. 3, 5 and 6. These IGUs may also have panels (substrates) with low-e coatings or some of these may be tempered or even laminated, whether these form the VLTP panel or form other static panels in the IGU. Since all of these are static components, this means that this does not change the reflective characteristics as defined above when the transmission of the IGU changes at 550 nm. The use of 550 nm as a wavelength to measure the transmission changes is important as it is the peak of the eye's photopic response, but other methods of visible transmission measurement may also be used.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. Furthermore, such an interpretation should apply regardless of the breadth of the range or the characteristics being described. Additionally, it is noted that all percentages are in weight, unless specified otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein. For example, in one aspect, the degree of flexibility can be within about ±10% of the numerical value. In another aspect, the degree of flexibility can be within about ±5% of the numerical value. In a further aspect, the degree of flexibility can be within about ±2%, ±1%, or ±0.05%, of the numerical value. Numerical quantities given are approximate, meaning that the term "around," "about" or "approximately" can be inferred if not expressly stated.

The discussion, description, examples and embodiments presented within this disclosure are provided for clarity and understanding. A variety of materials and configurations are presented, but there are a variety of methods, configurations and materials that may be used to produce the same results. While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

We claim:

1. An insulated glass unit (IGU) comprising an assembly of a transmissive substrate assembled in parallel with a variable light transmission panel (VLTP), wherein
    (a) said VLTP comprises two substrates, wherein a first substrate of the two substrates comprises a first surface and a second surface thereof and a second substrate of the two substrates comprises a first surface and a second surface thereof, wherein an electrochromic medium is located between the second surface of the first substrate and the first surface of the second substrate,
    (b) said assembly comprises a first surface of the transmissive substrate bonded at its perimeter in a spaced apart relationship with the second surface of the second substrate of said VLTP forming a space therebetween, wherein the VLTP is configured to provide at least two optical states comprising a bleached optical state and a colored optical state, wherein the VLTP is configured in the IGU to have a first surface facing outwardly and a second surface facing the space, wherein the bleached optical state of the IGU is characterized by having higher light transmission than in the colored optical state; and the IGU shows a transmission ratio of greater than 2.5 at 550 nm when measured in the bleached and the colored states, and, in these optical states, the IGU shows $\Delta E_R^*$ of less than 6 when reflection is viewed from the first surface; wherein $\Delta E_R^*$ is the color difference according to CIELAB in reflection, wherein the color differences are calculated as the Sqrt$\{(L_2^*-L_1^*)^2+(a_2^*-a_1^*)^2+(b_2^*-b_1^*)^2\}$, wherein $L_1^*$, $a_1^*$, $b_1^*$, $L_2^*$, $a_2^*$, and $b_2^*$ are values as defined by CIELAB to represent lightness and color of the reflected light in the two optical states.

2. The IGU of claim 1, further comprising a low-emissivity coating deposited or a film providing a low-emissivity surface adhered to at least one of (a) a second surface of the VLTP, (b) a first surface of the transmissive substrate, and (c) a second surface of the transmissive substrate.

3. The IGU of claim 1, wherein at least one substrate selected from: the first substrate; the second substrate; and the transmissive substrate, is tempered glass.

4. The IGU of claim 1, wherein a second transparent substrate comprising a first surface and a second surface thereof is laminated to the first substrate forming the VLTP by a polymeric film, wherein the polymeric film contacts the second surface of the second transparent substrate and the first surface of the first substrate forming the VLTP.

5. The IGU of claim 4, wherein the polymeric film is colored.

6. The IGU of claim 1, wherein the second surface of the first substrate is coated with a stack of coatings comprising at least two layers, followed by a coating of a transparent conductor.

7. The IGU of claim 4, further comprising a stack of coatings providing reflective properties when viewed from a first side of the second transparent substrate either on the second surface of the second transparent substrate or on the first surface of the first substrate forming the VLTP.

8. The IGU of claim 1, wherein the space between the VLTP and the transmissive substrate is further partitioned in two spaces on either side of a partition by a transparent middle panel having a thickness less than or equal to 1.7 mm.

9. An insulated glass unit (IGU) comprising an assembly of a transmissive substrate assembled in parallel with a variable light transmission panel (VLTP), wherein
    (a) said VLTP comprises two substrates, wherein a first substrate of the two substrates comprises a first surface and a second surface and a second substrate of the two substrates comprises a first surface and a second surface, wherein an electrochromic medium is located between the second surface of the first substrate and the first surface of the second substrate,
    (b) said assembly comprises the transmissive substrate bonded at its perimeter in a spaced apart relationship with at least one of (i) the second surface of the second substrate and (ii) the first surface of the first substrate of said VLTP forming a space therebetween, wherein the VLTP is configured to provide at least two optical states comprising a bleached optical state and a colored optical state, wherein the VLTP is configured in the IGU to have a first surface facing outwardly and a second surface facing the space, wherein the bleached optical state of the IGU is characterized by having higher light transmission than in the colored optical state; and the IGU shows a transmission ratio of greater than 10 at 550 nm when measured in the bleached and the colored states, and, in these optical states, the IGU shows $\Delta E_R^*$ of less than 10 when reflection is viewed from the first surface; wherein $\Delta E_R^*$ is the color difference according to CIELAB in reflection, wherein the color differences are calculated as the Sqrt$\{(L_2^*-L_1^*)^2+(a_2^*-a_1^*)^2+(b_2^*-b_1^*)^2\}$, wherein $L_1^*$, $a_1^*$, $b_1^*$, $L_2^*$, $a_2^*$, and $b_2^*$ are values as defined by CIELAB to represent lightness and color of the reflected light in the two optical states.

10. The IGU of claim 9, further comprising either a low-emissivity coating deposited on or a film providing a low-emissivity surface adhered to at least one of (a) a second surface of the VLTP, (b) a first surface of the transmissive substrate, and (c) a second surface of the transmissive substrate.

11. The IGU of claim 9, wherein at least one substrate selected from: the first substrate; the second substrate; and the transmissive substrate is tempered glass.

12. The IGU of claim 9, wherein a second transparent substrate comprising a first surface and a second surface is laminated to the first substrate forming the VLTP by a polymeric film wherein the polymeric film contacts the second surface of the second transparent substrate and the first surface of the first substrate forming the VLTP.

13. The IGU of claim 12, further comprising a stack of coatings providing reflective properties when viewed from a first side of the second transparent substrate either on a second surface of the second transparent substrate or on the first surface of the first substrate forming the VLTP.

14. The IGU of claim 12, wherein the polymeric film is colored.

15. The IGU of claim 9, wherein the space is filled with a gas or the space is evacuated.

16. An insulated glass unit (IGU) comprising an assembly of a transmissive substrate assembled in parallel with a variable light transmission panel (VLTP), wherein
   (a) the VLTP comprises two substrates, wherein a first substrate of the two substrates comprises a first surface and a second surface and a second substrate of the two substrates comprises a first surface and a second surface, wherein an electrochromic medium is located between the second surface of the first substrate and the first surface of the second substrate, and
   (b) the assembly comprises the transmissive substrate bonded at its perimeter in a spaced apart relationship with at least one of (i) the second surface of the second substrate (ii) and the first surface of the first substrate of the VLTP forming a space therebetween, wherein the VLTP is configured to provide at least two optical states comprising a bleached optical state and a colored optical state, wherein the VLTP is configured in the IGU to have a first surface facing outwardly and a second surface facing the space, wherein the bleached optical state of the IGU is characterized by having higher light transmission than in the colored optical state; and the IGU shows a transmission ratio of greater than 40 at 550 nm when measured in the bleached and the colored states, and, in these optical states, the IGU shows $\Delta E_R^*$ of less than 8 when reflection is viewed from the first surface; wherein $\Delta E_R^*$ is the color difference according to CIELAB in reflection, wherein the color differences are calculated as the $\text{Sqrt}\{(L_2^*-L_1^*)^2+(a_2^*-a_1^*)^2+(b_2^*-b_1^*)^2\}$, wherein $L_1^*$, $a_1^*$, $b_1^*$, $L_2^*$, $a_2^*$, and $b_2^*$ are values as defined by CIELAB to represent lightness and color of the reflected light in the two optical states.

17. The IGU of claim 16, wherein said VLTP further comprises at least one electrochromic coating or an electrochromic dye.

18. The IGU of claim 16, wherein the space between the VLTP and the transmissive substrate is further partitioned in two spaces on either side of a partition by presence of a transparent middle panel having a thickness less than 1.7 mm between the VLTP and the transmissive substrate.

19. The IGU of claim 18, wherein at least one side of the transparent middle panel comprises a low-e coating.

* * * * *